(12) United States Patent
Mima

(10) Patent No.: US 7,349,638 B2
(45) Date of Patent: Mar. 25, 2008

(54) IMAGE FORMING SYSTEM AND IMAGE FORMING APPARATUS

(75) Inventor: Tsuyoshi Mima, Kawasaki (JP)

(73) Assignee: Canon Kabushiki Kaisha (JP)

( * ) Notice: Subject to any disclaimer, the term of this patent is extended or adjusted under 35 U.S.C. 154(b) by 345 days.

(21) Appl. No.: 11/205,957

(22) Filed: Aug. 17, 2005

(65) Prior Publication Data

US 2006/0039707 A1 Feb. 23, 2006

(30) Foreign Application Priority Data

Aug. 17, 2004 (JP) ............................. 2004-237248

(51) Int. Cl.
*G03G 15/00* (2006.01)
(52) U.S. Cl. .................. 399/24; 399/10; 399/81
(58) Field of Classification Search .................. 399/10, 399/81, 24, 27
See application file for complete search history.

(56) References Cited

U.S. PATENT DOCUMENTS

| 5,802,420 A | 9/1998 | Garr et al. |
| 6,152,629 A | 11/2000 | Yoneyama et al. |
| 6,989,907 B1 | 1/2006 | Jeyachandran et al. |
| 2005/0008378 A1* | 1/2005 | Okamura .................. 399/27 |

FOREIGN PATENT DOCUMENTS

| CN | 1199185 A | 11/1998 |
| JP | 09-006117 A | 1/1997 |
| JP | 10-166694 A | 6/1998 |
| JP | 10-315590 A | 12/1998 |
| JP | 2000-86079 A | 3/2000 |
| JP | 2001-063188 A | 3/2001 |
| JP | 2003-122535 A | 4/2003 |

OTHER PUBLICATIONS

Search Report issued in corresponding Chinese application No: 2005100906093, mailed Nov. 2, 2007.

* cited by examiner

*Primary Examiner*—Susan Lee
(74) *Attorney, Agent, or Firm*—Rossi, Kimms & McDowell, LLP

(57) ABSTRACT

Provided is an image forming system and an image forming apparatus capable of reliably reporting information relating to a remaining amount of consumables to an operator without increasing the number of operations of the operator of the image forming system. The image forming system connects a variety of kinds of managers such as a process control manager, an order receiving/original receiving manager, and a message manager, and post-treatment devices such as MFPs, a cutting machine, and a saddle stitch bookbinding device, via a network. The message manager reads the remaining amount of paper sheets of an applicable printer device from a consumption degree table which is stored in an HDD; computes an expected amount of consumption of the paper sheet of the applicable printer device to be consumed due to execution of a job; and when the remaining amount of the paper sheet is below 0 as a result of subtraction of the expected consumption amount of the paper sheet from the remaining amount of the paper sheet, displays on a UI a warning message indicating that an operator maintenance is necessary.

32 Claims, 74 Drawing Sheets

UI SCREEN

WHEN POWER SOURCE IS ON

| ☐ PAPER REPLENISHMENT (REMAINING AMOUNT IS 0) | ☐ TONER REPLENISHMENT (REMAINING AMOUNT IS 0) | ☐ STAPLE REPLENISHMENT (REMAINING AMOUNT IS 0) |
| ☐ ROLLER EXCHANGE | ☐ OIL EXCHANGE | ☐ |
| ☒ PAPER REPLENISHMENT (REMAINING AMOUNT IS SMALL) | ☒ TONER REPLENISHMENT (REMAINING AMOUNT IS SMALL) | ☒ STAPLE REPLENISHMENT (REMAINING AMOUNT IS SMALL) |
| ☐ JAM ERROR | ☐ VOLTAGE CONTROL ERROR | ☐ TEMPERATURE CONTROL ERROR |

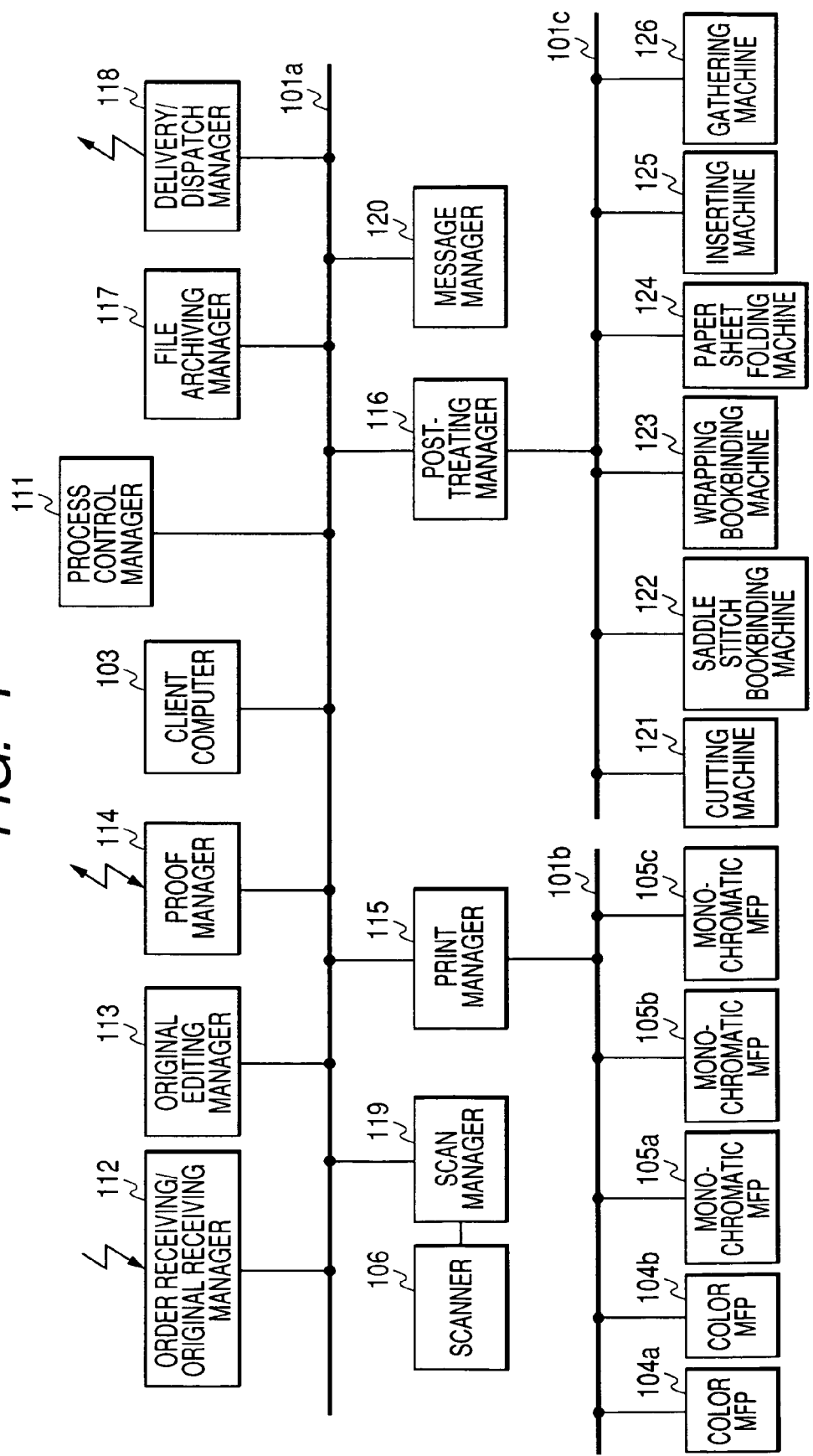

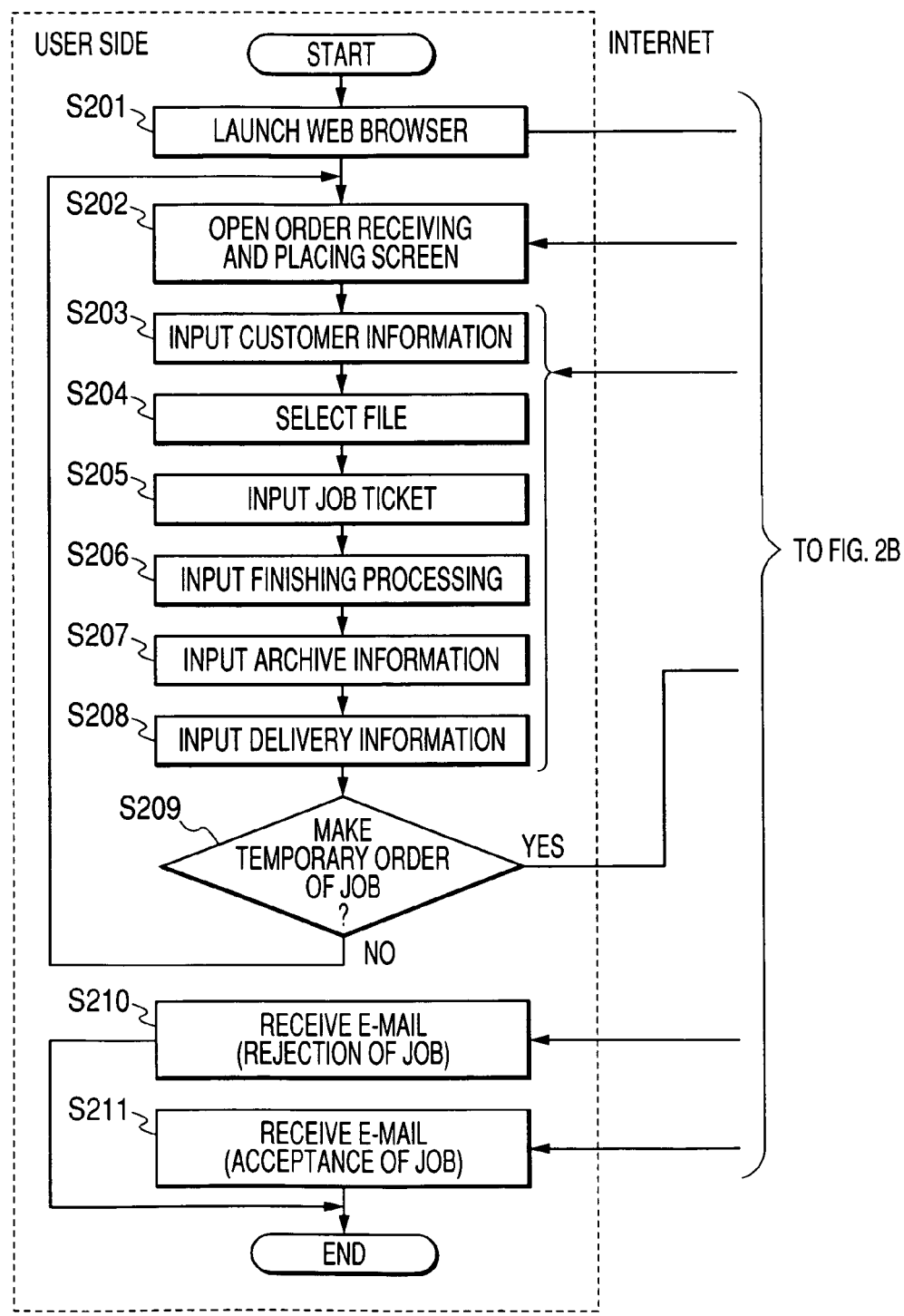

[DESCRIPTION OF R901]
char_color = {0.0, 0.0, 0.0, 1.0};  ← L911
string1 = "ABC";  ← L912
put_char (0.0, 0.0, 0.2, 0.3, string1);  ← L913

[DESCRIPTION OF R902]
line_color = {1.0, 0.0, 0.0, 0.0};  ← L921
put_line = (0.9, 0.0, 0.9, 1.0, 0.1);  ← L922

[DESCRIPTION OF R903]
image1 = {CMYK, 8, 5, 5, C0, M0, Y0, K0,  ← L931
            C1, M1, Y1, K1
            ......
            C24, M24, Y24, K24};
put_image (0.0, 0.5, 0.5, 0.5, image1);  ← L932

LINEAR GAMMA TABLE G0

PRINTER OUTPUT CHARACTERISTIC Gp OF MFP 104a

GAMMA TABLE Ga FOR MFP 104a (WHERE Ga * Gp = G0)

GAMMA TABLE Gb FOR MFP 104a

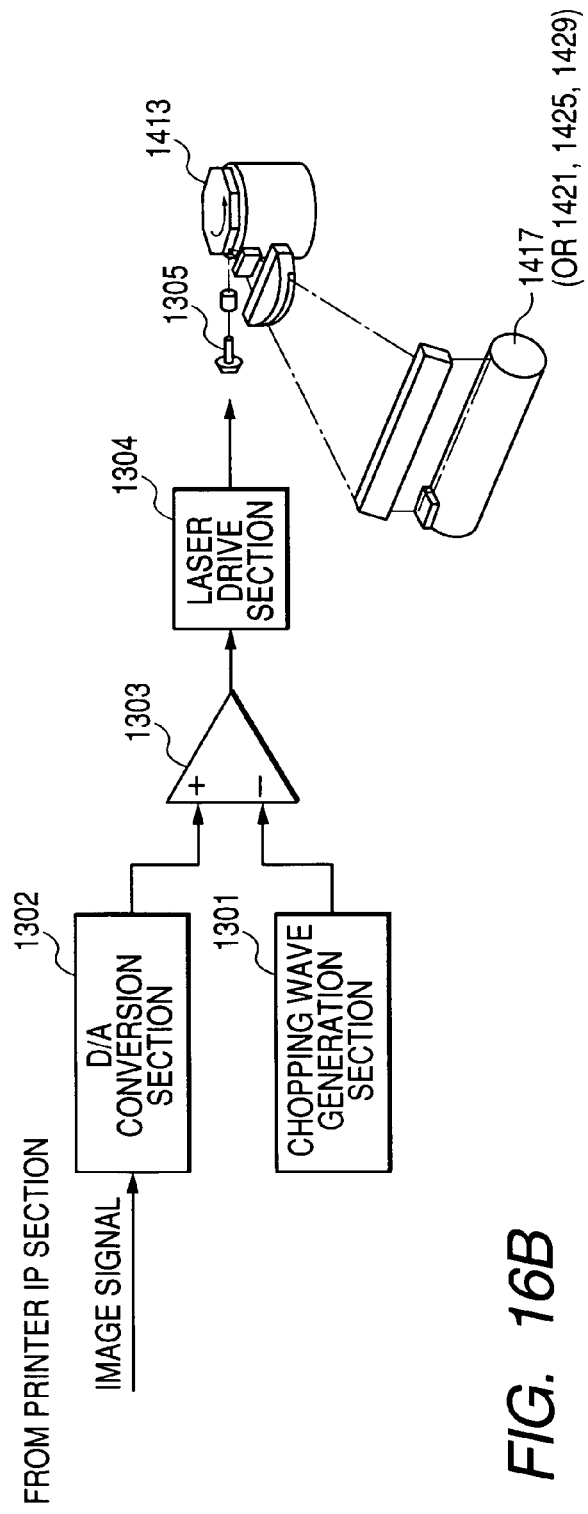
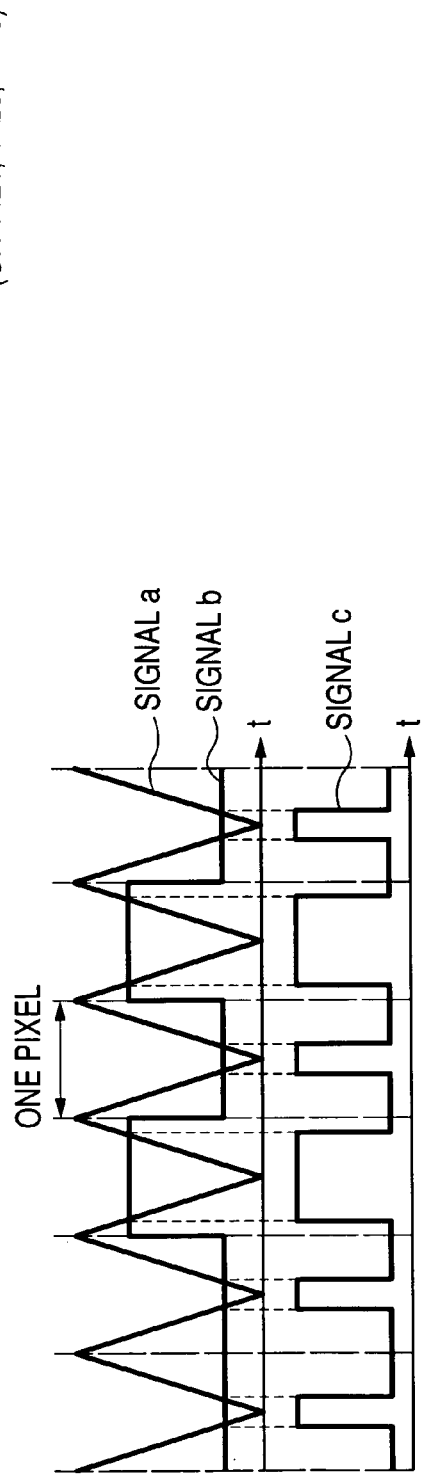
FIG. 16A
FIG. 16B

IN A CASE OF COLOR SCANNER

IN A CASE OF MONOCHROME SCANNER

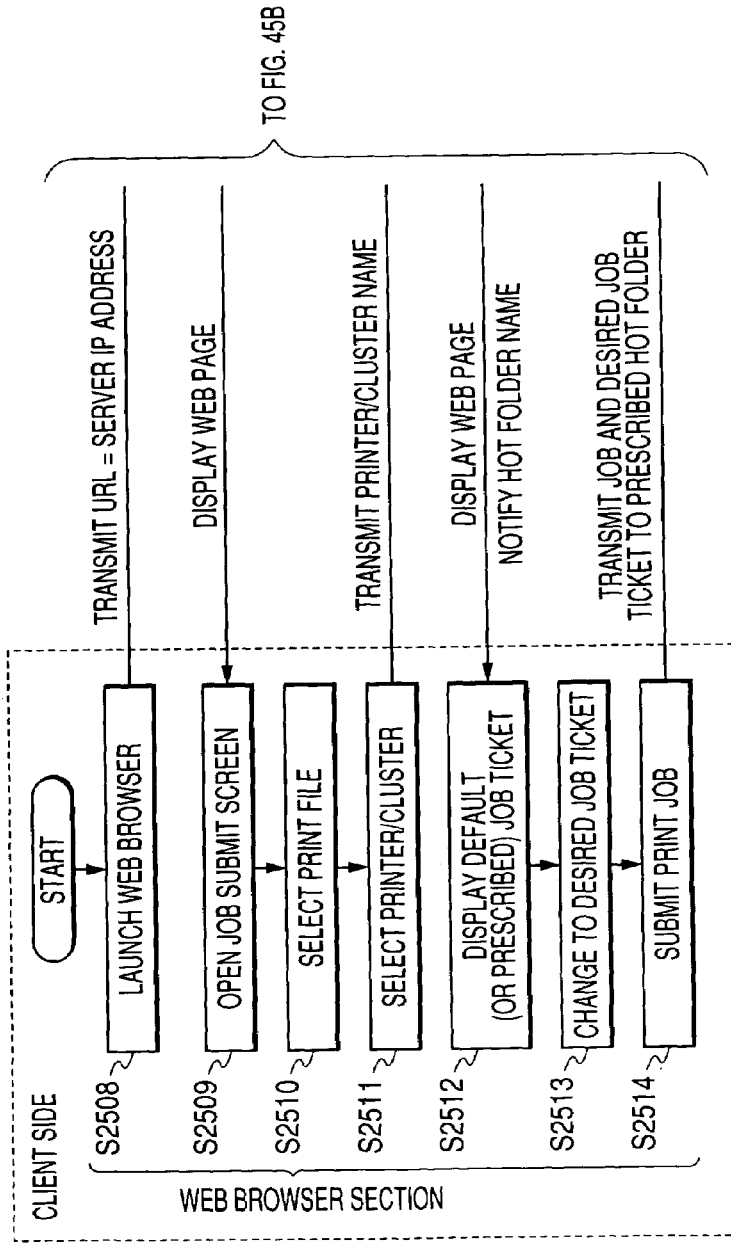

FIG. 49

UI SCREEN

SET MESSAGE NOTIFICATION TIMING

WHEN POWER SOURCE IS ON
WHEN POWER SOURCE IS OFF
BEFORE JOB IS STARTED
WHEN JOB IS ENDED
REAL TIME

FIG. 50

UI SCREEN

WHEN POWER SOURCE IS ON

| ☐ PAPER REPLENISHMENT (REMAINING AMOUNT IS 0) | ☐ TONER REPLENISHMENT (REMAINING AMOUNT IS 0) | ☐ STAPLE REPLENISHMENT (REMAINING AMOUNT IS 0) |
| ☐ ROLLER EXCHANGE | ☐ OIL EXCHANGE | ☐ |
| ☒ PAPER REPLENISHMENT (REMAINING AMOUNT IS SMALL) | ☒ TONER REPLENISHMENT (REMAINING AMOUNT IS SMALL) | ☒ STAPLE REPLENISHMENT (REMAINING AMOUNT IS SMALL) |
| ☐ JAM ERROR | ☐ VOLTAGE CONTROL ERROR | ☐ TEMPERATURE CONTROL ERROR |

FIG. 51

UI SCREEN

WHEN POWER SOURCE IS OFF

- ☐ PAPER REPLENISHMENT (REMAINING AMOUNT IS 0)
- ☒ ROLLER EXCHANGE
- ☐ PAPER REPLENISHMENT (REMAINING AMOUNT IS SMALL)
- ☐ JAM ERROR

- ☐ TONER REPLENISHMENT (REMAINING AMOUNT IS 0)
- ☒ OIL EXCHANGE
- ☐ TONER REPLENISHMENT (REMAINING AMOUNT IS SMALL)
- ☐ VOLTAGE CONTROL ERROR

- ☐ STAPLE REPLENISHMENT (REMAINING AMOUNT IS 0)
- ☐ 
- ☐ STAPLE REPLENISHMENT (REMAINING AMOUNT IS SMALL)
- ☒ TEMPERATURE CONTROL ERROR

FIG. 52

UI SCREEN

BEFORE JOB IS STARTED

| | | |
|---|---|---|
| ☒ PAPER REPLENISHMENT (REMAINING AMOUNT IS 0) | ☒ TONER REPLENISHMENT (REMAINING AMOUNT IS 0) | ☒ STAPLE REPLENISHMENT (REMAINING AMOUNT IS 0) |
| ☐ ROLLER EXCHANGE | ☐ OIL EXCHANGE | ☐ |
| ☐ PAPER REPLENISHMENT (REMAINING AMOUNT IS SMALL) | ☐ TONER REPLENISHMENT (REMAINING AMOUNT IS SMALL) | ☐ STAPLE REPLENISHMENT (REMAINING AMOUNT IS SMALL) |
| ☐ JAM ERROR | ☒ VOLTAGE CONTROL ERROR | ☐ TEMPERATURE CONTROL ERROR |

FIG. 53

UI SCREEN

WHEN JOB IS ENDED

| | | | |
|---|---|---|---|
| ☒ PAPER REPLENISHMENT (REMAINING AMOUNT IS 0) | ☒ TONER REPLENISHMENT (REMAINING AMOUNT IS 0) | ☒ STAPLE REPLENISHMENT (REMAINING AMOUNT IS 0) |
| ☐ ROLLER EXCHANGE | ☐ OIL EXCHANGE | ☐ |
| ☐ PAPER REPLENISHMENT (REMAINING AMOUNT IS SMALL) | ☐ TONER REPLENISHMENT (REMAINING AMOUNT IS SMALL) | ☐ STAPLE REPLENISHMENT (REMAINING AMOUNT IS SMALL) |
| ☒ JAM ERROR | ☐ VOLTAGE CONTROL ERROR | ☐ TEMPERATURE CONTROL ERROR |

FIG. 54

UI SCREEN

| REAL TIME | | |
|---|---|---|
| ☒ PAPER REPLENISHMENT (REMAINING AMOUNT IS 0) | ☒ TONER REPLENISHMENT (REMAINING AMOUNT IS 0) | ☒ STAPLE REPLENISHMENT (REMAINING AMOUNT IS 0) |
| ☐ ROLLER EXCHANGE | ☐ OIL EXCHANGE | ☐ |
| ☐ PAPER REPLENISHMENT (REMAINING AMOUNT IS SMALL) | ☐ TONER REPLENISHMENT (REMAINING AMOUNT IS SMALL) | ☐ STAPLE REPLENISHMENT (REMAINING AMOUNT IS SMALL) |
| ☐ JAM ERROR | ☐ VOLTAGE CONTROL ERROR | ☒ TEMPERATURE CONTROL ERROR |

FIG. 55A

FLAG TABLE

| NO | MAINTENANCE/ERROR NAME | FLAG |
|---|---|---|
| 1 | PAPER REPLENISHMENT (REMAINING AMOUNT IS 0) | 20 |
| 2 | TONER REPLENISHMENT (REMAINING AMOUNT IS 0) | 20 |
| 3 | STAPLE REPLENISHMENT (REMAINING AMOUNT IS 0) | 20 |
| 4 | ROLLER EXCHANGE | 2 |
| 5 | OIL EXCHANGE | 2 |
| 6 | PAPER REPLENISHMENT (REMAINING AMOUNT IS SMALL) | 1 |
| 7 | TONER REPLENISHMENT (REMAINING AMOUNT IS SMALL) | 1 |
| 8 | STAPLE REPLENISHMENT (REMAINING AMOUNT IS SMALL) | 1 |
| 9 | JAM | 4 |
| 11 | ATR | 3 |
| 12 | VOLTAGE CONTROL | 5 |

NOTIFICATION EVENT LIST

FIG. 55B

UI SCREEN

EVENT INFORMATION TO BE NOTIFIED WHEN POWER SOURCE IS ON

6. PAPER REPLENISHMENT (REMAINING AMOUNT IS SMALL)
7. TONER REPLENISHMENT (REMAINING AMOUNT IS SMALL)
8. STAPLE REPLENISHMENT (REMAINING AMOUNT IS SMALL)
...

IMAGE FORMING SYSTEM AND IMAGE FORMING APPARATUS

BACKGROUND OF THE INVENTION

1. Field of the Invention

The present invention relates to an image forming system and an image forming apparatus.

2. Related Background Art

In a conventional image forming apparatus, printing performed by developing a latent image formed on a photosensitive member with a developer and by transferring and fixing the developed image to and on a paper sheet. Some image forming apparatuses of this kind display a warning message via a display device (UI: user interface) when time to replace a consumable such as the paper sheet and toner is near. Some are capable of notifying an operator of a timing of replacement of the consumable (for example, Japanese Patent Application Laid-Open No. H10-315590).

However, in a market of print on demand (POD) where a large amount of printing jobs are simultaneously handled, there is a case where during execution of one printing job, another printing job is inputted to occupy the image forming apparatus for a long time and consume a large amount of consumables. In addition, a state of inventory of the consumables and the maintenance parts, time to delivery of a supplier, and the like change constantly. Therefore, it is preferable, in the image forming apparatus (a POD machine) installed in a POD center, to dynamically schedule the replacement timing of the consumables to be notified to the operator considering the factors mentioned above.

Further, in the world of POD where it is demanded to output a large number of printing products in a short time period, the time is lost if the replacement of the maintenance parts for the image forming apparatus depends on a service person in every occasion. Therefore, with regard to specific kinds of maintenance parts (consumables), reduction of downtime is intended by having the operator himself, not the service person, perform a replacement operation.

In recent years, the demand for so-called operator maintenance, in which the operator himself manages the replaceable consumables (ORC: operator replaceable components) and places an order thereof, has been further increased.

Under these circumstances, a mechanism for notifying the operator of maintenance time for replenishment of the consumables and the maintenance parts and time for placing the order of the consumables and the maintenance parts to the supplier at a timing convenient for the operator is being demanded right now.

SUMMARY OF THE INVENTION

The present invention has been made in consideration of the above. Therefore, an object of the present invention is to provide an improved image forming system and an improved image forming apparatus.

Another object of the present invention is to provide an image forming system and an image forming apparatus that are capable of reliably reporting information related to a remaining amount of a consumable to an operator without increasing the number of operations of the operator of the image forming system.

According to an aspect of the present invention, there is provided an image forming system for forming an image by using a plurality of consumables, including: an image forming apparatus; a receiving unit configured to receive information related to a remaining amount of the plurality of consumables from the image forming apparatus; a reporting unit configured to make a report in relation to a remaining amount of at least one of the plurality of consumables; and a setting unit configured to set a prescribed timing for performing the report by the reporting unit, wherein the reporting unit, in a case where the receiving unit receives the information indicating that the remaining amount of a first consumable related to the plurality of consumables reaches a first prescribed amount, makes a report in relation to the remaining amount of the first consumable and a second consumable, in accordance with occurrence of the prescribed timing set by the setting unit.

According to another aspect of the present invention, there is provided an image forming apparatus for forming an image by using a plurality of consumables, the apparatus including: a detecting unit configured to detect information related to a remaining amount of the plurality of consumables; a reporting unit configured to make a report in relation to a remaining amount of at least one of the plurality of consumables; and a setting unit configured to set a prescribed timing for performing the report by the reporting unit, wherein the reporting unit, in a case where the detecting unit detects that the remaining amount of a first consumable related to the plurality of consumables reaches a first prescribed amount, makes a report in relation to the remaining amount of the first consumable and a second consumable, in accordance with occurrence of the prescribed timing set by the setting unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an example of a configuration of an image forming system according to a first embodiment of the present invention;

FIG. 16A is a block diagram showing a configuration in which a PWM processing is performed in the screening section;

FIG. 16B shows a signal waveform;

FIG. 49 shows a screen on a UI displayed when the message notification timing setting is performed;

FIG. 50 shows an example of a display maintenance cause selection screen when the power source is on;

FIG. 51 shows an example of the display maintenance cause selection screen when the power source is off;

FIG. 52 shows an example of the display maintenance cause selection screen before a job is started;

FIG. 53 shows an example of the display maintenance cause selection screen when the job is ended;

FIG. 54 shows an example of the display maintenance cause selection screen at the time of real time;

FIG. 55A shows an example of a flag table created by the message controller;

FIG. 55B shows event information to be notified which is displayed on the UI screen when the power source is on;

FIG. 57 is a flow chart showing a warning message display processing when the power source is on;

DESCRIPTION OF THE PREFERRED EMBODIMENTS

Figure 2B:
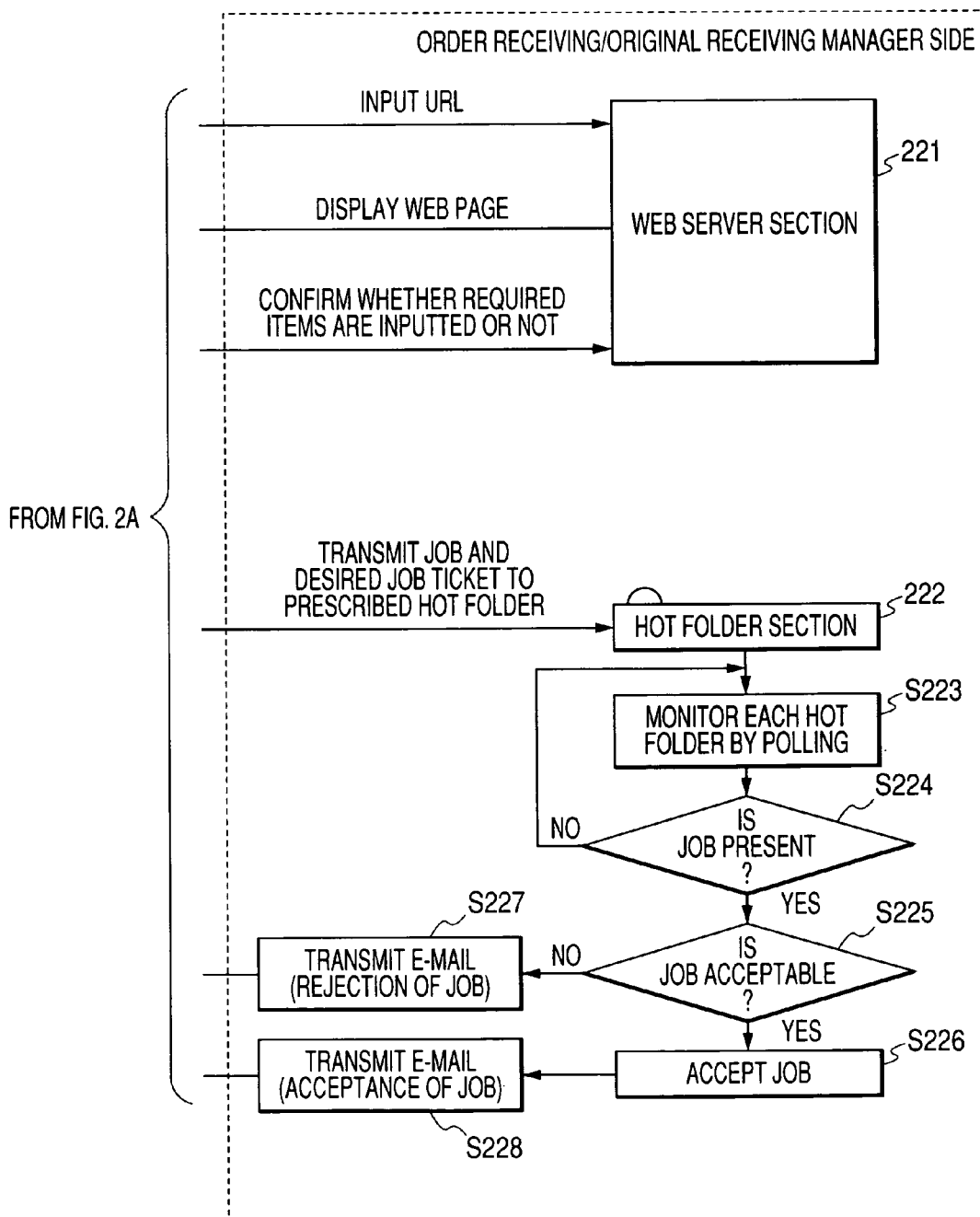
FIG. 2, which is composed of FIGS. 2A and 2B, is a flow chart showing a communication between an order receiving/original receiving manager and a computer on the side of a user and an order receiving processing performed by the order receiving/original receiving manager.

The present invention will now be described in detail with reference to the drawings showing preferred embodiments thereof. In the drawings, elements and parts which are identical throughout the views are designated by identical reference numerals, and duplicate description thereof is omitted.

Hereafter, embodiments of the present invention is explained on the basis of the drawings.

First Embodiment

<Outline of System>

FIG. 1 is a block diagram showing an example of a configuration of an image forming system according to this embodiment.

In FIG. 1, the image forming system is provided with a process control manager 111; an order receiving and original receiving manager 112; an original editing manager 113; a proof manager 114; a client computer 103; a file archiving manager 117; a delivery and dispatch manager 118; a scanner 106; a scan manager 119; a print manager 115; a post-treating manager 116; and a message manager 120. In addition, the image forming system is provided with Multi Function Peripherals (MFPs) 104 and 105; a cutting machine 121; a saddle stitch bookbinding machine 122; a wrapping bookbinding machine 123; a paper sheet folding machine 124; an inserting machine 125; and a gathering machine 126.

Respective portions which configure the image forming system is connected to each other via a network 101. The network 101 may be configured either by a plurality of systems (101a, 101b, and 10c) as shown in FIG. 1 or by one system.

The process control manager 111 controls a process of all jobs flowing in a computer, a device, or the image forming system. The order receiving and original receiving manager 112 accepts the job received via the Internet. The original editing manager 113 processes the job which has been received and the job based on image data read from an original by the scanner 106 (or either one of the jobs) into an order of pages and a disposition as desired by a user.

The proof manager 114 is communicably connected to the Internet and allows the user to confirm whether the job whose original has been edited or an output sample thereof is just as desired by the user (in other words, performs a proof processing), via the Internet and the like. The print manager 115 performs a rasterization processing to the job which has been subjected to a print preprocessing (original editing processing and proof processing) and allows the MFP (color MFPs 104a and 104b and monochromatic MFPs 105a, 105b, and 105c) which are connected to the print manager 115 to perform printing output (printing processing).

The post-treating manager 116 controls the cutting machine 121, the saddle stitch bookbinding machine 122, the wrapping bookbinding machine 123, the paper sheet folding machine 124, the inserting machine 125, and the gathering machine 126 so that the post-treating (finishing processing) process (a cutting processing process, a saddle stitch bookbinding processing process, a wrapping bookbinding processing process, a paper sheet folding processing process, an inserting processing process, a gathering processing process, and the like) is performed. The file archiving manager 117 is a file server which archives the job of the user and responds to a request for reprinting.

The delivery and dispatch manager 118 is communicably connected to the Internet and instructs an operator to deliver the finished document. In addition, the delivery and dispatch manager 118 serves as a controller for controlling (performing delivery processing of) a delivery slip of a delivered product, a dispatch history, and the like. The scan manager 119 is capable of converting the image of the original into electronic data by reading the original by the scanner 106, when the original is received in the form of paper and the like.

The message manager 120 receives maintenance information and error information of the MFP which is connected to the network 101, and also receives inventory information and delivery time information stored in a network server (not shown) of a supplier of each of maintenance parts. In addition, the message manager 120 displays a warning message to the effect that the maintenance by the operator is necessary such as replenishment of consumables including paper sheets, toners, staples, and the like and exchange of the maintenance parts (maintenance-target parts) such as a photosensitive drum, an electrifying device, a motor, and the like, via a display device (UI) at a timing demanded by the operator.

Note that the managers 111 through 120 may be configured respectively by a separate information processing device. Or otherwise, the configuration may be applicable in which a plurality of functions of the managers 111 through 120 or all the functions thereof are implemented by one single information processing device. In this embodiment, the managers 111 through 120 are configured as a computer including a CPU, a ROM, a RAM, an HD, and the like. In each of the managers 111 through 120, the CPU thereof implements each function thereof on the basis of a program stored in the ROM, the HD, or another storage medium.

Hereafter, the role of each manager of the image forming system as shown in FIG. 1 will be explained in detail.

<Process Control Manager 111>

In general, in a central management system called a management information system (MIS), a management plan and an administrative operation are supported through collection of data related to production, processing of such data, and reporting thereof to accumulate the information, and in addition, it is possible to provide the information to departments or sections that are in need of the information.

The process control manager 111 is the computer which is the center of the management information system. The process control manager 111 serves as a controller for central control of information, by making a data base of the information performed by the computer, of what cannot conventionally be subjected to the central control due to restriction of human capability.

The data stored in the process control manager 111 is utilized for improving a production capacity planning, by instructing and controlling the operation process so that the operator can efficiently carry out an operation, especially by carrying out a scheduling of a product by means of an application for decision making (application for scheduling).

<Order Receiving and Original Receiving Manager 112>

The order receiving and original receiving manager 112 is an intermediator of so-called electronic commerce (EC), and is the computer for order placing and order receiving via the Internet. In addition, the order receiving and original receiving manager 112 is, according to the point of view of the user, provided with an electronic shop which utilizes a web page called a digital store front, and after the user authentication has been performed there, a desired file is transmitted to the order receiving and original receiving manager 112 as electronic data together with a desired setting, to place an order of the job.

FIG. 2, which is composed of FIGS. 2A and 2B, is a flow chart showing a communication between the order receiving and original receiving manager 112 and the computer on the side of the user and also showing an order receiving processing performed by the order receiving and original receiving manager 112.

In FIG. 2, steps S201 through S211 denote operation steps on a web browser on the side of the user, and steps S223 through S226 denote control processing steps on the side of the order receiving and original receiving manager 112.

The user launches the web browser on the computer (step S201), inputs a Uniform Resource Locator (URL) address on the web browser to access to a web server section 221 which is provided in the order receiving and original receiving manager 112.

The web server section 221 is a web server program that is, typically, Internet Information Server (IIS) of Microsoft Corporation. In the web server section 221, when the user inputs the URL address via the web browser using hyper text transfer protocol (http), service screens (web pages: the screens as shown in FIGS. 24 through 31) are provided on the web browser.

On the side of the user, the web browser opens the service screen (the screen shown in FIG. 24) provided by the web server section 221 and the registered user inputs a user ID (for example, an electronic mail address), a password, and the like on the screen. Note that in a case of a new user who has not been registered, the user selects a non-registered user on the screen. The user opens order placing and receiving screens (the screens shown in FIGS. 25 through 30) provided by the web server section 221 (step S202).

The user inputs various types of printing instructions, by the order placing and receiving screens (the screens shown in FIGS. 25 through 30) provided one after another by the web server section 221, such as customer information (in a case of the new user or in a case of the registered user changing the information); document information (a file name of the image data (multiple selection is available)); job information (such as a job ticket); post-treating information (such as finishing processing); proof and archive information; and delivery information (steps S203 through S208).

Figure 30:
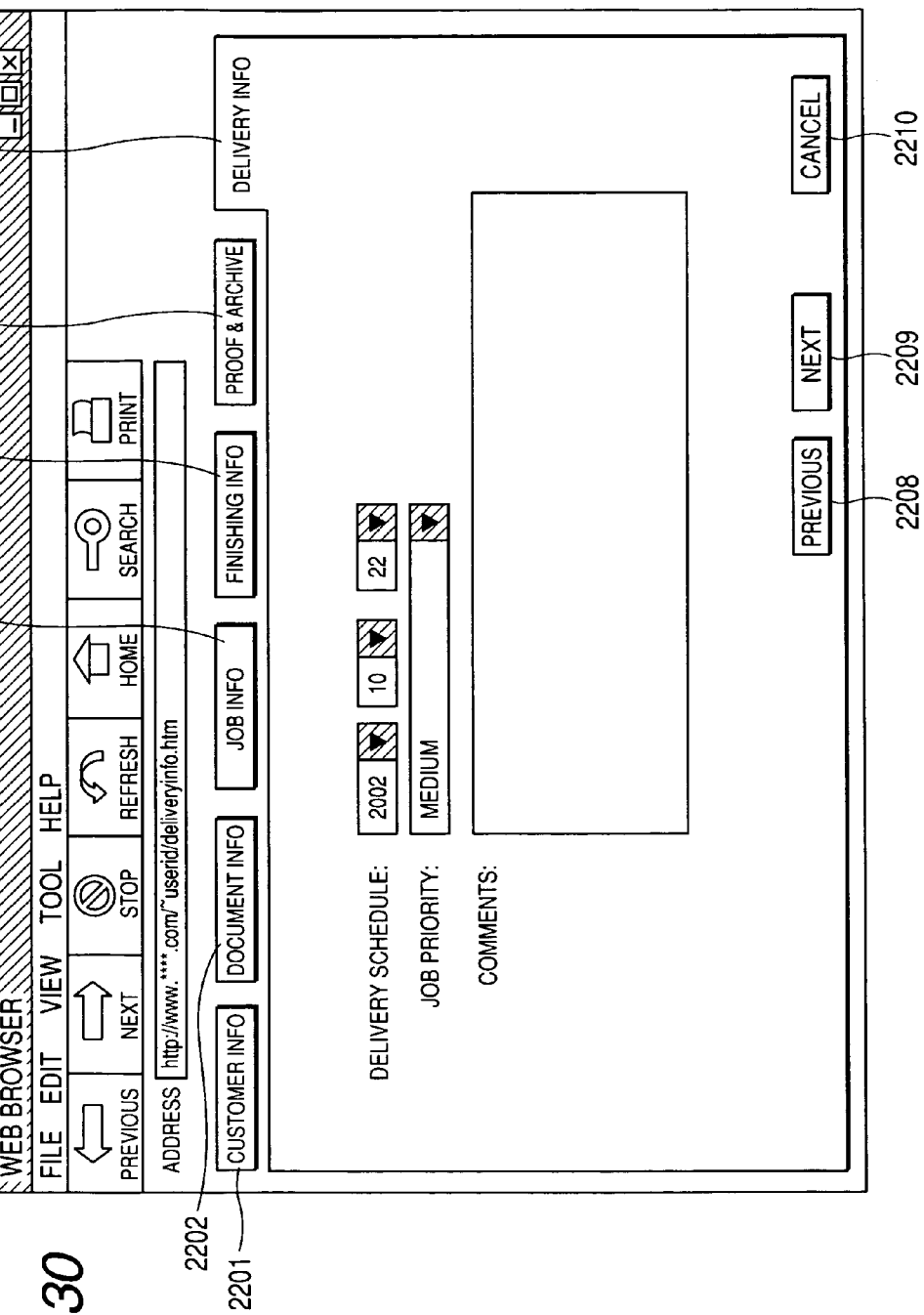
FIG. 30 shows an example of the job order receiving screen.
Figure 31:
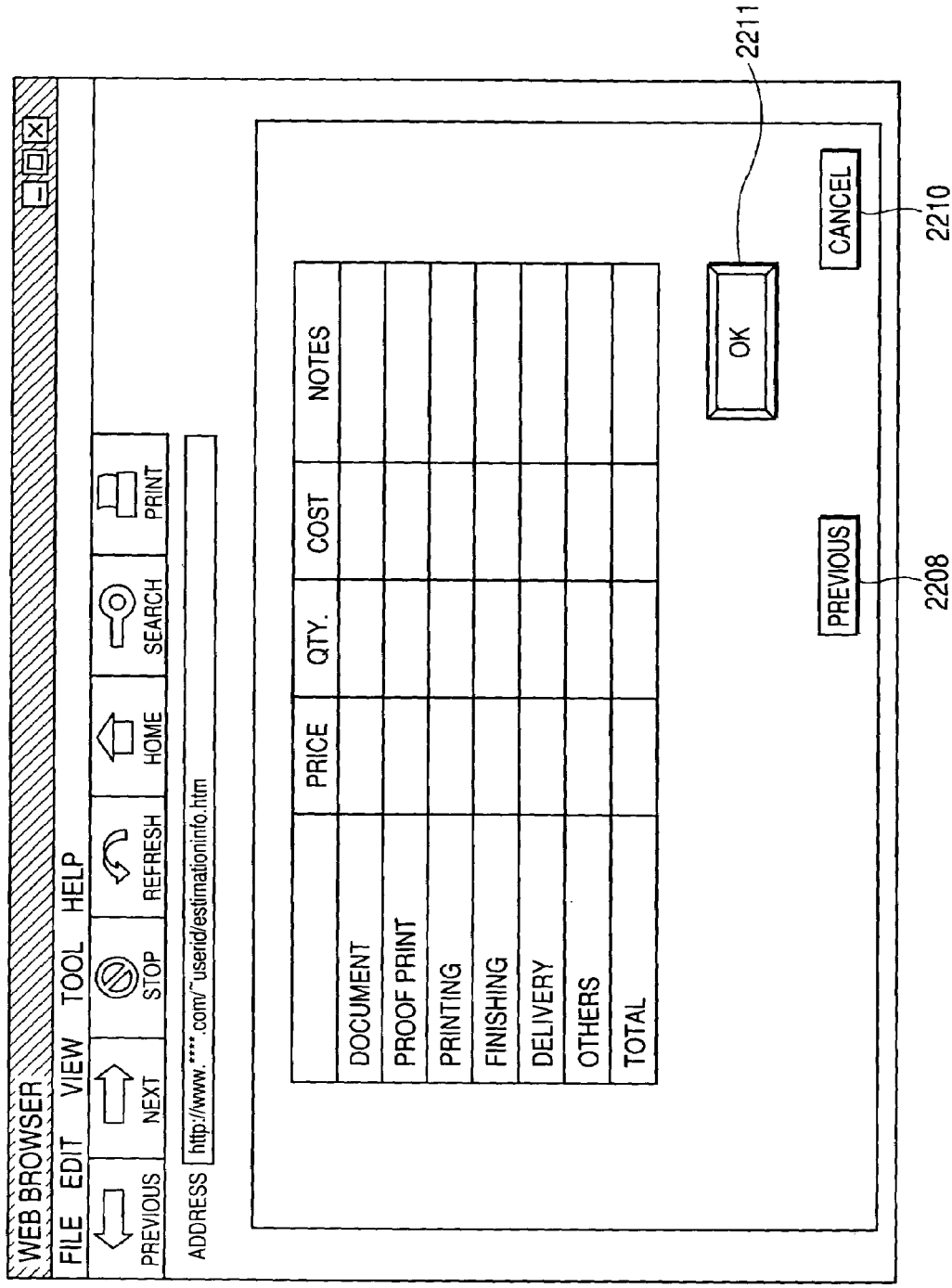
FIG. 31 shows an example of the job order receiving screen.

At this time, in the web server section 221, whether or not there are omissions or typing errors in input items of the user on each of the order placing and receiving screens (the screens shown in FIGS. 25 through 30) is briefly confirmed one by one and transfers to (provides) a temporary job order screen (the screen shown in FIG. 31). If there is any problem in the input items on each of the order placing and receiving screens (each of the screens shown in FIG. 25 through FIG. 30), a warning is always reported to the user such that there occurs no mistake in ordering the job. Note that to the web server section 221, each service screen shown in FIGS. 24 through 31, a check program of the input items mentioned above, and the like are uploaded in advance.

Next, the input operation mentioned above is repeated until a temporary order is approved by the user on the temporary job order screen (the screen shown in FIG. 31) which is provided by the web server section 221 and is sequentially displayed on the web browser (step S209). When the user approves the temporary order (Yes in step S209) on the temporary job order screen (the screen shown in FIG. 31), the web browser transmits the job including the file (the image data) selected by the user and each of the print instructions, from the side of the user to a hot folder section 222 of the order receiving and original receiving manager 112. The hot folder section 222 may be provided per user.

In addition, on the side of the order receiving and original receiving manager 112, the presence or absence of the job within the hot folder section 222 is continuously monitored by polling (step S223 and step S224), and if it is determined that the job is present, it is confirmed whether the job is acceptable or not (step S225). If the acceptance of the job is permitted (if the job is acceptable), the order receiving and original receiving manager 112 accepts the job (step S226). Then, the order receiving and original receiving manager 112 transmits the accepted job to the process control manager 111 and also transmits to the user a message "accepted" via the web page (step S228). On the other hand, if the acceptance of the job is not permitted (if the job is not acceptable), the order receiving and original receiving manager 112 transmits a message "rejected" via the web page (step S227).

In addition, in the computer on the side of the user, a message window showing the message "accepted" or "rejected" (step S210 and step S211) provided on the web browser by the web server section 221, and then the processing is ended.

<Original Editing Manager 113>

The original editing manager 113 is intended, with regard to the job controlled in the original editing process by the process control manager 111, to merge a plurality of files sent from the user, to insert and delete pages, to lay out as instructed by the user, or to visualize a requested post-treatment process in advance so that the post-treatment process of the request can be visually confirmed.

Figure 3:
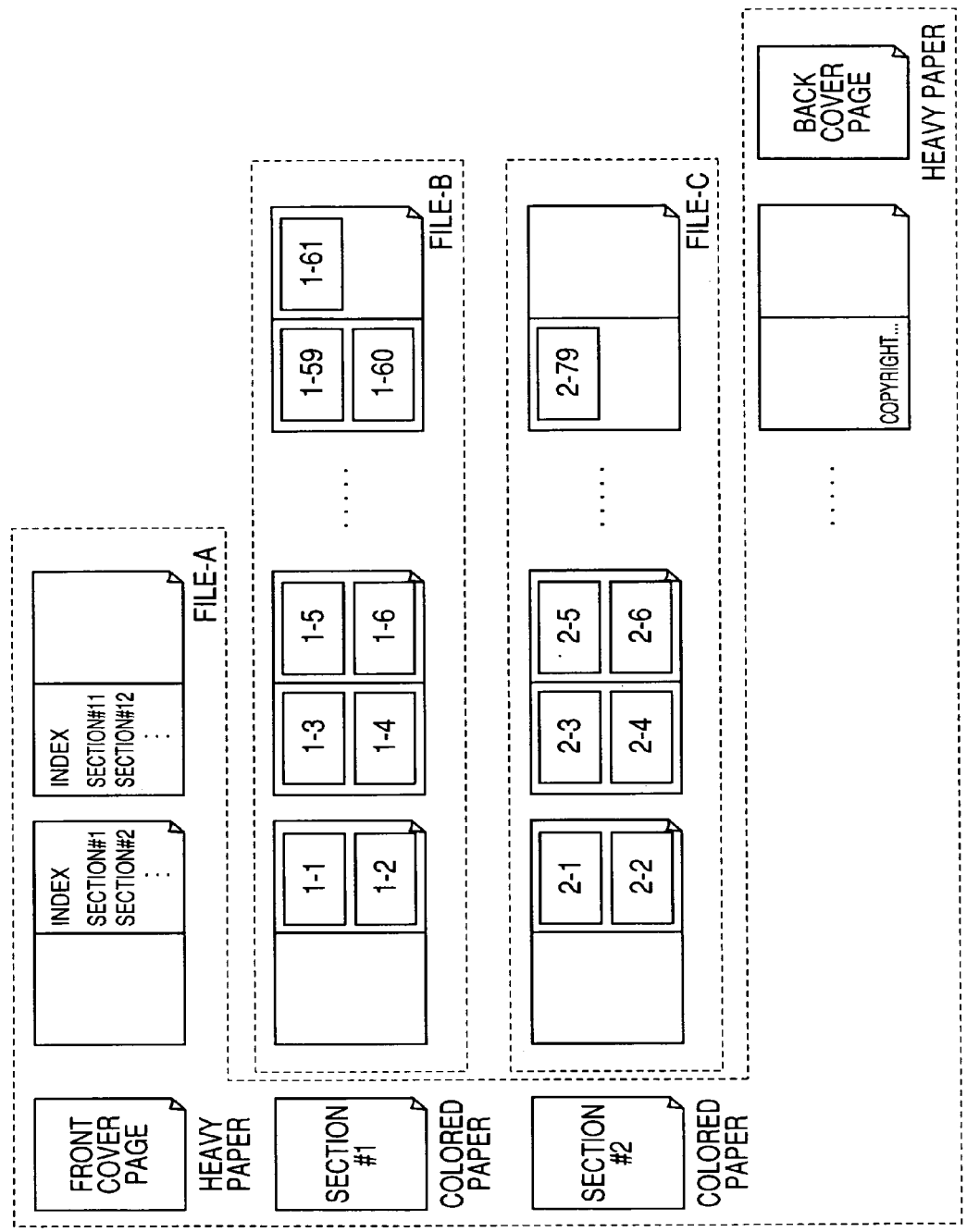
FIG. 3 shows an example of a file transmitted by the user and a finished (edited) image of the file.
Figure 4:
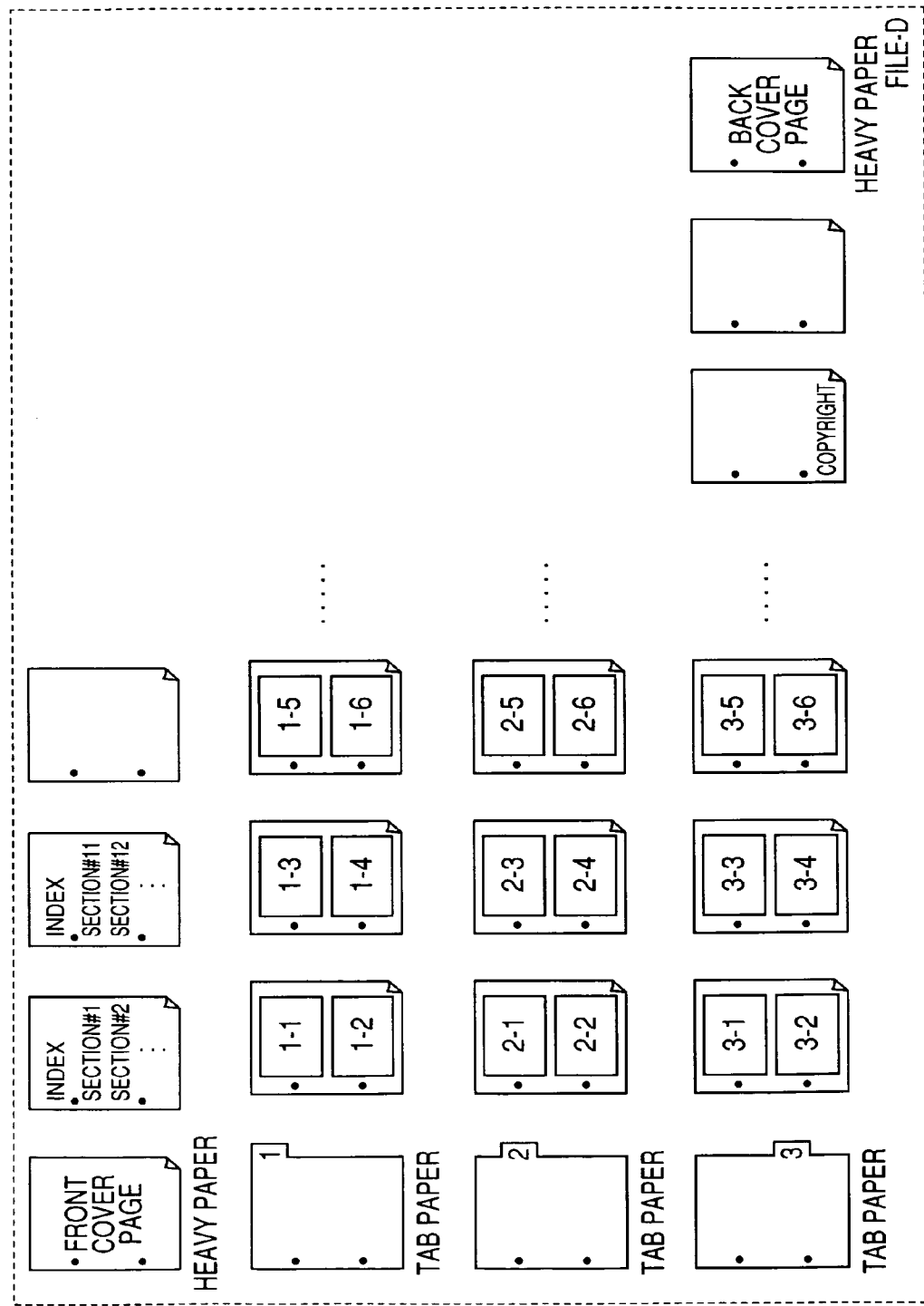
FIG. 4 shows an example of a file transmitted by the user and the finished (edited) image of the file.
Figure 5:
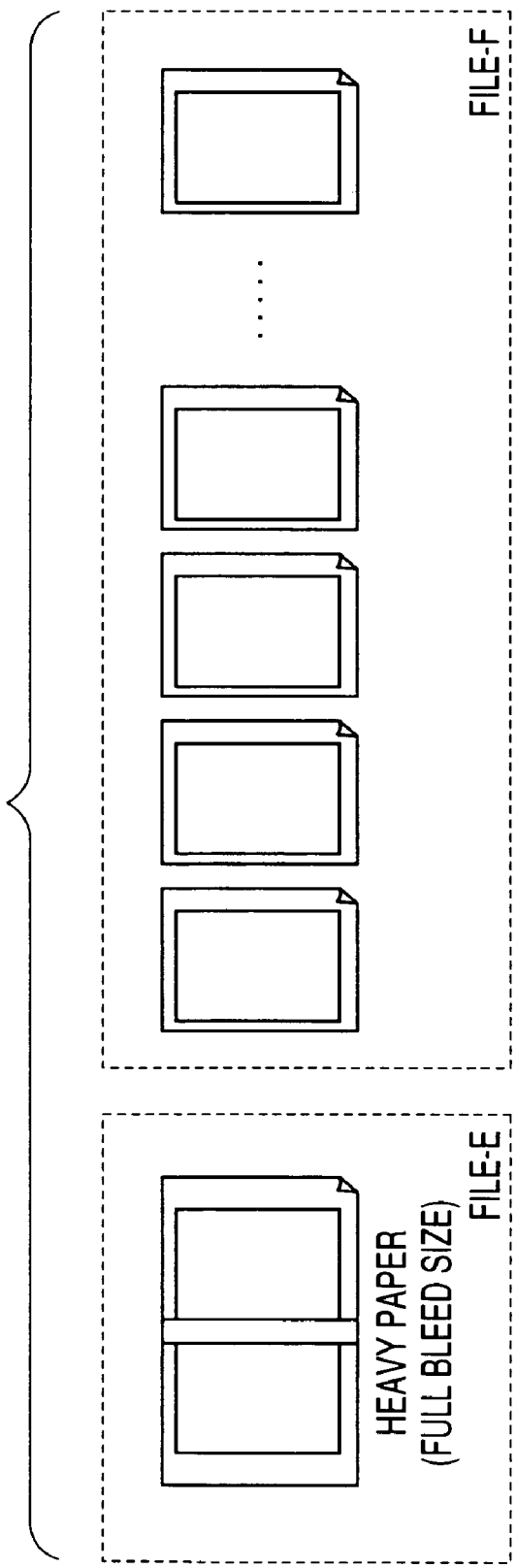
FIG. 5 shows an example of a file transmitted by the user and the finished (edited) image of the file.

FIGS. 3 through 5 are diagrams showing an example of files A through F transmitted from the user and a finished image of them (after being edited).

In an example shown in FIG. 3, the job received from the user is configured by the files A (File-A) through C (File-C). Besides, the file A is desired by the user, to be outputted in a size as is, and the files B and C are desired by the user, to be outputted in a layout of "2 in 1" (the layout in which two images are disposed in one paper sheet). In this case, an output size and the like are necessary in editing the original, and accordingly, it is necessary for the user to instruct the sizes. In addition, in a case where an outputting order must be considered or in other similar cases, it is necessary for the user to instruct the order at the time when the original is received and the like.

In an example shown in FIG. 4, the job received from the user is one single file of a file D (File-D). In addition, the file D is desired by the user, to be outputted on a specific medium such as a tab sheet and to be post-treated with the processing such as punching or stapling. Thus, even when the job is received in one single file, in a case where it is desired to output the file on a specific medium such as the tab sheet and to perform post-treatments such as punching or stapling, information on the tab itself and medium information on the tab sheet and the like are necessary, and also the information on the post-treatment such as punching or stapling are necessary; and accordingly, these pieces of information needs to be instructed by the user at the time of reception of the original, and the like.

Further, in an example shown in FIG. 5, the job received from the user is configured by files E (File-E) and F (File-F). In addition, the files E and F are desired by the user, to be wrapped to be bound in a book (bookbinding of paper sheets of different sizes), that is, the sizes of the paper sheets are different. Thus, also in a case where the paper sheets of different sizes are desired to be outputted, the information on the paper size is necessary in editing the original; and accordingly, these pieces of information needs to be instructed by the user at the time of reception of the original, and the like.

Note that the instruction of the various types of information by the user as mentioned above is conducted via the order placing and receiving screens shown in FIG. 27, FIG. 29, and the like to be described later, in the step S205 and the step S206 of FIG. 2 mentioned above.

As described above, the file received from the user does not always agree with the finished image of the user, and accordingly, it is necessary to perform the editing on the side of the image forming system, in accordance with the instruction by the user. The original editing manager 113 also performs the editing processing.

Further, because a plurality of files sent from the user are not always the files for the same application or of the same type, it is necessary to create one single file from them. The original editing manager 113 also performs the processing for creating one single file.

The editing processing by the original editing manager 113 as described above is performed by means of a program within the original editing manager 113 (without any editing processing by the operator) on the basis of the editing information instructed by the user at the time of reception of the original; and by the editing operation (or otherwise, by means of the program mentioned above or by the editing operation mentioned above) performed via the client computer 103 by the operator, using various types of application software programs.

<Proof Manager 114>

The proof manager 114 is, in general, often utilized for both of two purposes, that is, to confirm layout and to confirm color tone. In a case of a monochrome original, the purpose is to confirm the layout only. On the other hand, in a case of a color original, it is necessary to confirm both the layout and the color tone.

In the printing industry, there is a form of a colored output called "color comprehensive layout". The purpose of the color comprehensive layout is to make a presentation to an advertising client before entering the processes of making a plate and printing. In recent years, a color hard copy of a digital color image which is processed by desk top publishing (DTP) or by corporate electronic publishing systems (CEPS: an in-house printing and automatic editing system) and outputted by a color printer or by a color plotter has been used for the color comprehensive layout.

In addition, in an on-demand print (a print system in which a necessary number of copies are provided when necessary) utilizing the printer, it is possible to carry out the confirmation of the layout equivalent to the comprehensive layout, the brief confirmation of the color tone, and the detailed confirmation of the color tone equivalent to the proof, by the same color printer (or by a black and white printer). Accordingly, the confirmation operations are collectively processed by the proof manager 114.

Figures 6, 6A:
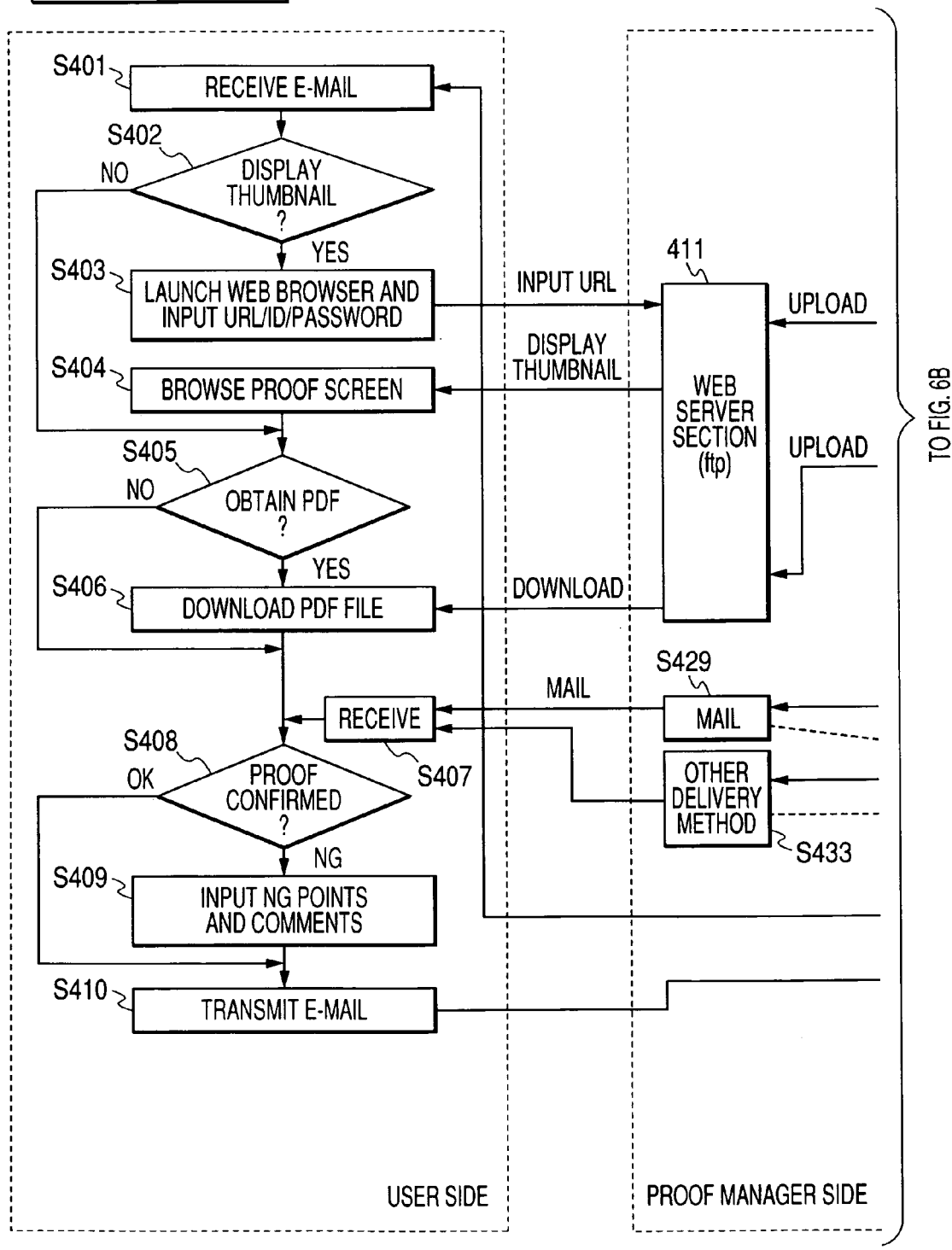
FIG. 6, which is composed of FIGS. 6A and 6B, is a flow chart showing a communication between a proof manager and a computer on the side of the user and a proof creation processing performed by the proof manager.
Figure 6B:
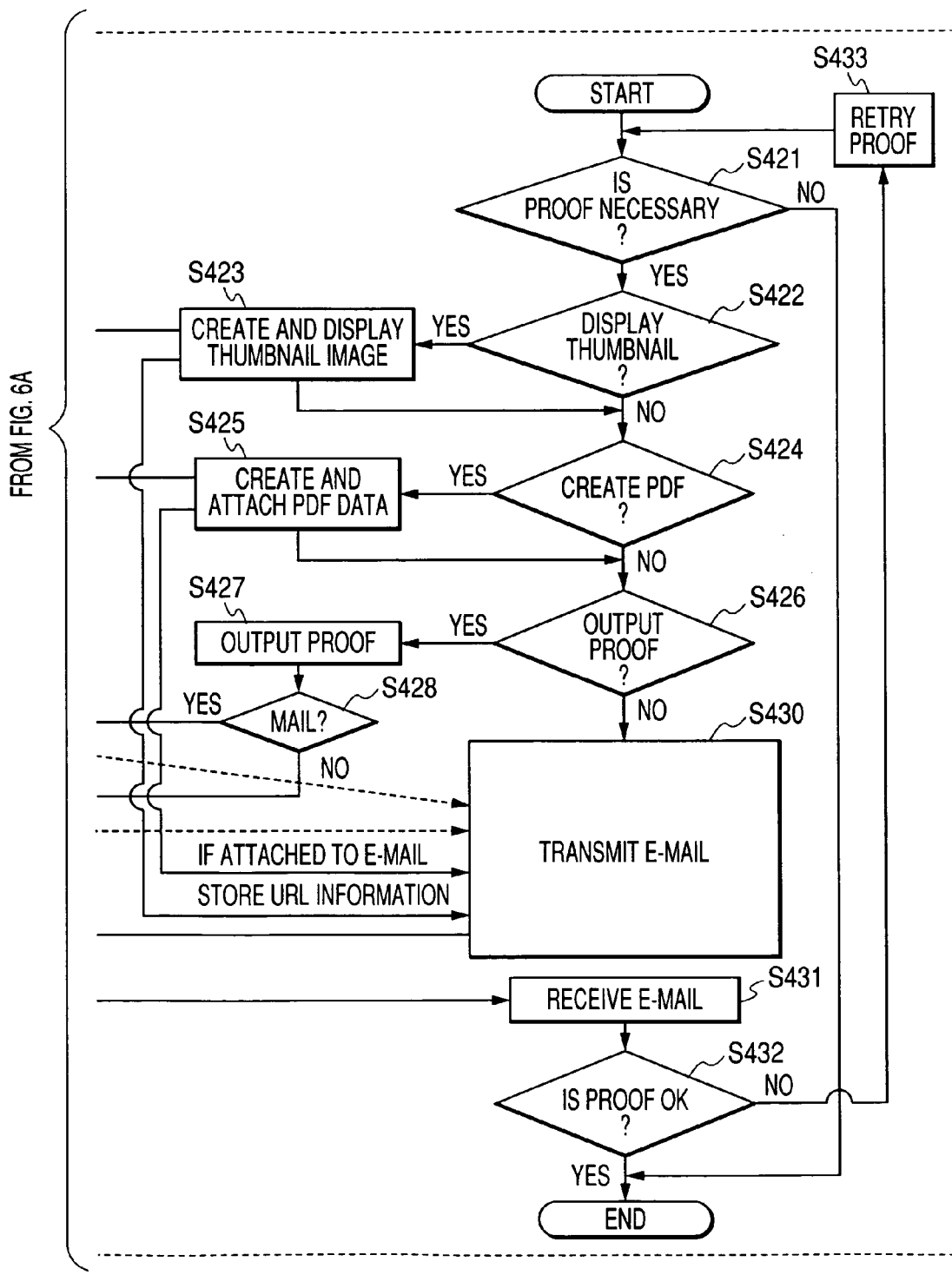

FIG. 6, which is composed of FIGS. 6A and 6B, is a flow chart showing communications between the proof manager 114 and the computer on the side of the user; and a proof creation processing by the proof manager 114.

In FIG. 6, steps S401 through S409 denote operation steps on the side of the user, and steps S421 through S429 denote control processing steps on the side of the proof manager 114.

The proof manager 114, as well as the order receiving and original receiving manager 112, is provided with a web server section 441 (note that the proof manager 114 may share the web server section 221 of the order receiving and original receiving manager 112 shown in FIG. 2). First, the proof manager 114 determines, with regard to the job managed in the proof process by the process control manager 111, whether or not the user demands the proof (in other words, whether or not the user demands the proof in the setting (the setting via the screen shown in FIG. 29) of the proof of the step S207 in FIG. 2) (step S421).

The proof manager 114, in a case where it is determined that the proof is not demanded, ends the processing as it is. On the other hand, in the proof manager 114, in a case where it is determined that the proof is demanded, the processing proceeds to the step S422 and the steps after the step S422. In the step S422 and the steps after the step S422, a service is provided (a proofreading expression is performed) to the side of the user by a demanded method of proof (proofreading expression method).

That is, the proof manager 114 determines whether or not a web display of thumbnail images as the proofreading expression method is demanded (step S422). If it is determined that the web display of the thumbnail image is demanded, the proof manager 114 creates a thumbnail image by means of the original editing manager 113, uploads the created thumbnail image to the web server section 441, and performs the setting so that a permitted user only can display them (step S423). Thus, the user can confirm the finished image on the web browser (the user can confirm the finished image via confirmation screens shown in FIGS. 32 through 36, as described later).

On the other hand, in a case where it is determined that the web display of the thumbnail images is not demanded in the step S422, or after the step S423, the proof manager 114, determines whether or not a portable document format (PDF) file is demanded as the proofreading expression method (step S424). If it is determined that the PDF file is demanded, the proof manager 114 creates the PDF file (step S425) by utilizing "Acrobat Distiller" of Adobe Systems Incorporated, and presents the PDF file to the user by a method demanded by the user. For example, it is possible to perform the setting in which the PDF file is browsed on the web browser, uploaded to an ftp site, or attached to an electronic mail to the user if a file size is small.

On the other hand, in a case where it is determined that the PDF file is not demanded in the step S424, or in the steps after the step S425, the proof manager 114 transmits to the user the thumbnail image, the description of the URL of the web site to which the PDF file is uploaded, and the electronic mail to which the PDF file is attached (step S430).

On the other hand, the user who receives the electronic mail (step S401), in a case where the thumbnail image is demanded (Yes in step S402), launches the web browser on the computer, inputs the URL, inputs the user ID and the password in the screen provided by the web server section 441 (step S403), and obtains the thumbnail image from the web server section 441. Then, the thumbnail images (FIGS. 32 through 36 as described later) obtained by the web server section 441 are displayed on the computer and are browsed (step S404), and then the processing proceeds to a step S405. On the other hand, if the thumbnail display is not performed in the step S402, the processing proceeds to the step S405.

Next, if the user obtains the PDF file (Yes in step S405), the PDF file is downloaded to the user side computer from the web server section 441 (step S406) and then the processing proceeds to a step S407. On the other hand, if the user does not obtain the PDF file (No in step S405), the processing proceeds to the step S407.

Next, the user confirms the proof (step S408). If it is determined by the user that the proof is confirmed to be OK (if shift to a printing process is instructed), the processing proceeds to a step S410. On the other hand, if it is determined by the user that the proof is confirmed not to be OK (NG) (if the processing is not shifted to the printing process and revision of proofing is instructed), the user inputs an NG point of the proof and comments on the computer (step S409), and the processing proceeds to the step S410.

Next, the user creates an electronic mail showing the result of the confirmation of the proof on the computer (the instruction to shift to the printing process, or the instruction not to shift to the printing process and to revise the proofreading) and transmits the electronic mail to the proof manager 114 (step S410). Note that if the proof is NG, the user either attaches to the electronic mail the data on the NG points and the comments inputted in the step S409 or makes a description to that effect in the text of the electronic mail. Besides, the information indicating whether the proof is OK or NG may be configured so that it is described in the text of the electronic mail or that character strings showing OK or NG are described in the title part of the electronic mail.

Upon reception of the electronic mail (step S431), the proof manager 114 determines whether or not the result of confirmation of the proof is OK (step S432). If the result of confirmation of the proof is OK (if the shift to the printing process is instructed), the processing is ended, and JDF data shown in FIG. 23 to be described later is rewritten so that the processing proceeds to the printing process. Note that the determination made in the step S432 may be configured so that the program makes the determination from the title and the like of the received electronic mail or may be configured so that the reception of the electronic mail is notified to a person in charge and the person in charge makes the determination from a content of the received electronic mail and inputs whether the confirmation is performed or not.

On the other hand, in the proof manager 114, if it is determined that the result of confirmation of the proof is not OK (NG) (if the processing is not shifted to the printing process and the revision of the proofreading is instructed) in the step S432, the operator on the side of the image forming system retries the processing such as the original editing processing, document processing, and proof printing (step S433), and then the processing returns to the step S421.

Note that in the step S410 shown in FIG. 6, the user sends the result of confirmation of the proof to the proof manager 114 via the electronic mail, however, the configuration may be such that the user notifies the person in charge on the side of the image forming system the result of confirmation of the proof by telephone or by facsimile and that the person in charge who receives the notification makes the determination as to whether the proof is OK or NG and inputs OK or NG.

<Print Manager 115>

Next, a data flow within the print manager 115 is explained with reference to FIG. 7.

Figure 7:
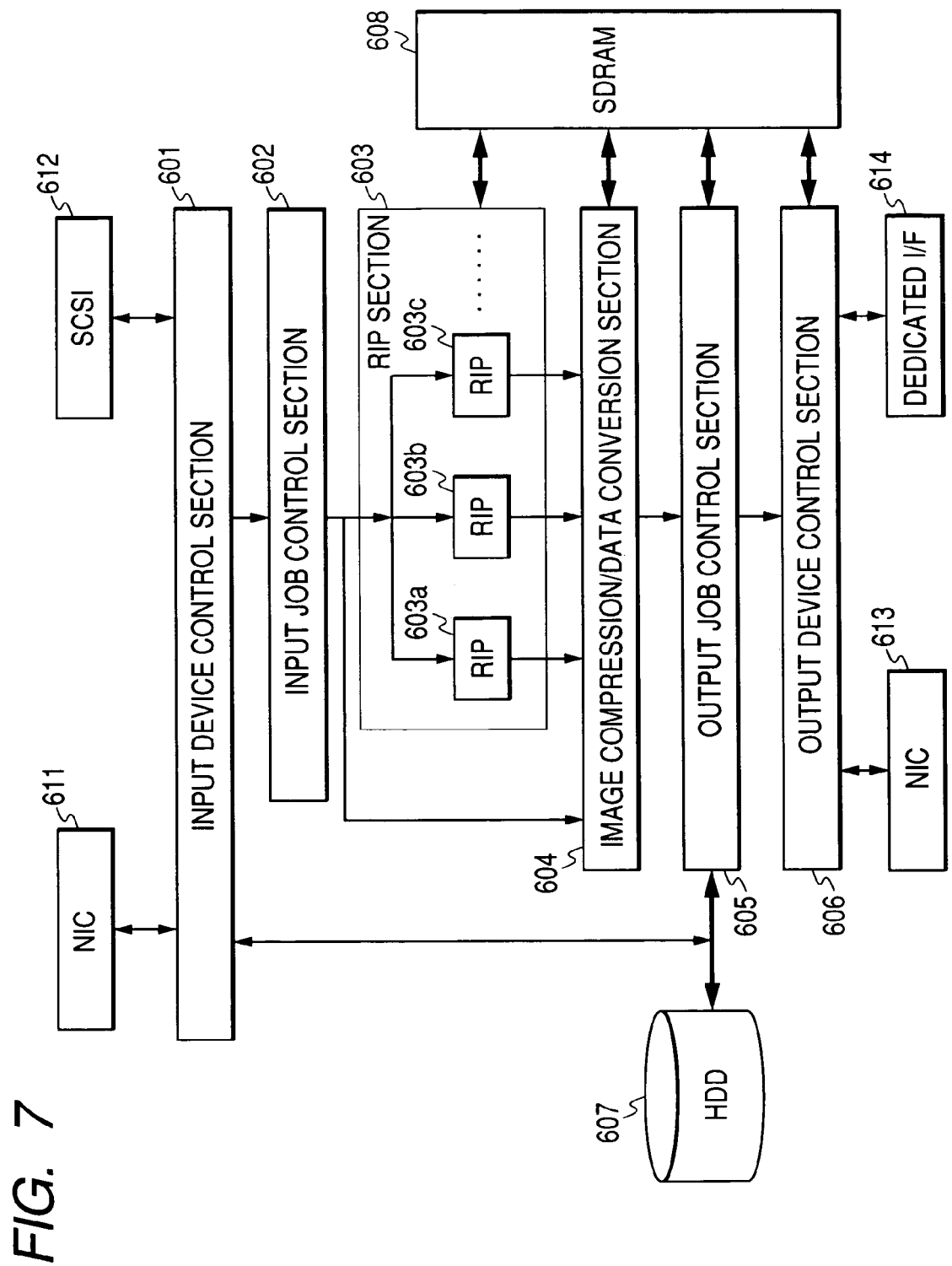
FIG. 7 is a block diagram showing a data flow in a print manager.

FIG. 7 is a block diagram showing the data flow within the print manager 115.

In FIG. 7, first, the job shifted to the printing process by the process control manager 111, inputted through a network interface card (NIC) 611 or a small computer system interface (SCSI) 612 is inputted in a server (the print manager 115) from an input device control section 601. Note that the job shifted to the printing process indicates the job whose printing is instructed via a job submit screen in the printing process shown in FIG. 39 and FIG. 40 to be described later.

The input device control section 601 accepts page description language (PDL) data and job control language (JCL) data as the input. They are information on the state of the printer and the server and correspond to various types of clients. The output of this module (the input device control section 601) has a role of connecting all constituent elements of the appropriate PDL and JCL.

Next, an input job control section 602 controls a list of demanded jobs and creates a job list for accessing each of the job submitted to the server. Further, in this module (the input job control section 602), there are three functions, namely, a job routing function for determining a route of the job; a job split function for controlling as to whether or not a raster image processor (RIP) processing is performed by splitting the job; and a job scheduling function for determining the order of the job.

There are a plurality of RIP sections 603. The RIP section 603 is configured by an RIP 603a, an RIP 603b, and an RIP 603c. It is possible to further increase the number thereof, however, here, they are collectively referred to as the RIP section 603. The RIP module (the RIP section 603) performs an RIP processing on the PDL of various jobs and creates a bit map image of an appropriate size and resolution. With regard to the RIP processing, a rasterization processing by various formats such as Post Script (registered trademark of Adobe Systems Incorporated), Printer Command Language (PCL), Tagged Image File Format (TIFF), Joint Photographic Experts Group (JPEG), PDF, and the like is available.

An image compression and data conversion section 604 compresses the bit map image created by the RIP section 603 and performs conversion of the format of the image. The image compression and data conversion section 604 also selects an image type suitable for each of printer devices. When the job is handled on the basis of pages, for example, the image compression and data conversion section 604 performs the editing processing and the like to the bit map data after rasterizing the TIFF, JPEG, and the like by the RIP section 603, as PDF data, by appending a PDF header.

An output job control section 605 obtains page images of the job and performs a control as to how the page images are handled on the basis of a command setting. The page is printed by the printer device or is saved in a hard disk 607. With regard to the job after being printed, it is possible to select as to whether it is saved in the hard disk 607 or not. If the job after being printed is saved in the hard disk 607, it is also possible to recall the job. Further, this module (the output job control section 605) performs the control with interaction of the hard disk 607 and a memory (SDRAM) 608.

An output device control section 606 performs control as to which print data is outputted to which printer device and as to which printer devices are clustered (combination of the printer devices in performing printing simultaneously by connecting a plurality of printer devices). The output device control section 606 transmits print data to an interface of the selected printer device. In addition, this module (the output device control section 606) achieves a function to monitor the state of the MFP 104 (or the MFP 105) and to transfer the state of the device to the print manager 115.

Note that in FIG. 7, the print manager 115 is described in a form as having the RIP section 603, however, in actuality, there is a case where the RIP section 603 is installed in the MFP 104 (or the MFP 105) or where the RIP section 603 exists as a unit separate from the print manager 115. In any cases, the function of the print manager 115, including the MFP 104 (or the MFP 105) and the RIP section 603, is to take charge of the processes from the process in which the RIP processing is performed to the inputted PDL information to the processing of printing.

<Printer Driver>

Data received from the user includes various types of data such as PDL data, PDF data, application data, and data read from the original. In a case where the data received from the user is the PDL data (such as PS data and PCL data), the PDF data, or the like, it is possible to perform the RIP processing to the data even if the data is transmitted to the print manager 115 as it is at the shift to the printing process. On the other hand, if the data received from the user is the application data, it is necessary for the operator to perform, from the client computer 103, an operation of converting the application data into the data for printing by using the printer driver and to transmit the converted data to the print manager 115.

Now, an explanation will be made hereinbelow as to the printer driver.

Figure 8:
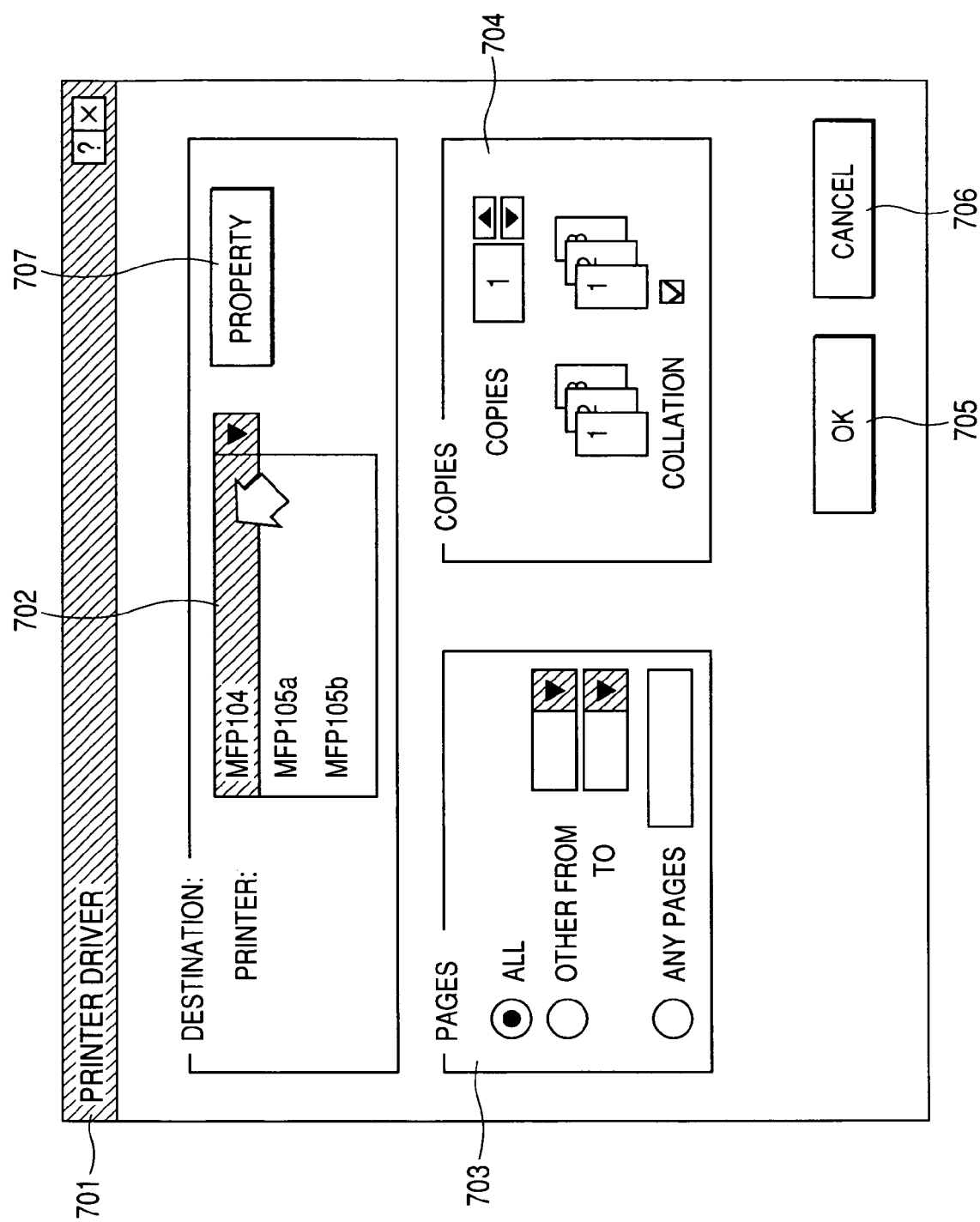
FIG. 8 shows an example of a printer driver screen on a client computer.
Figure 9:
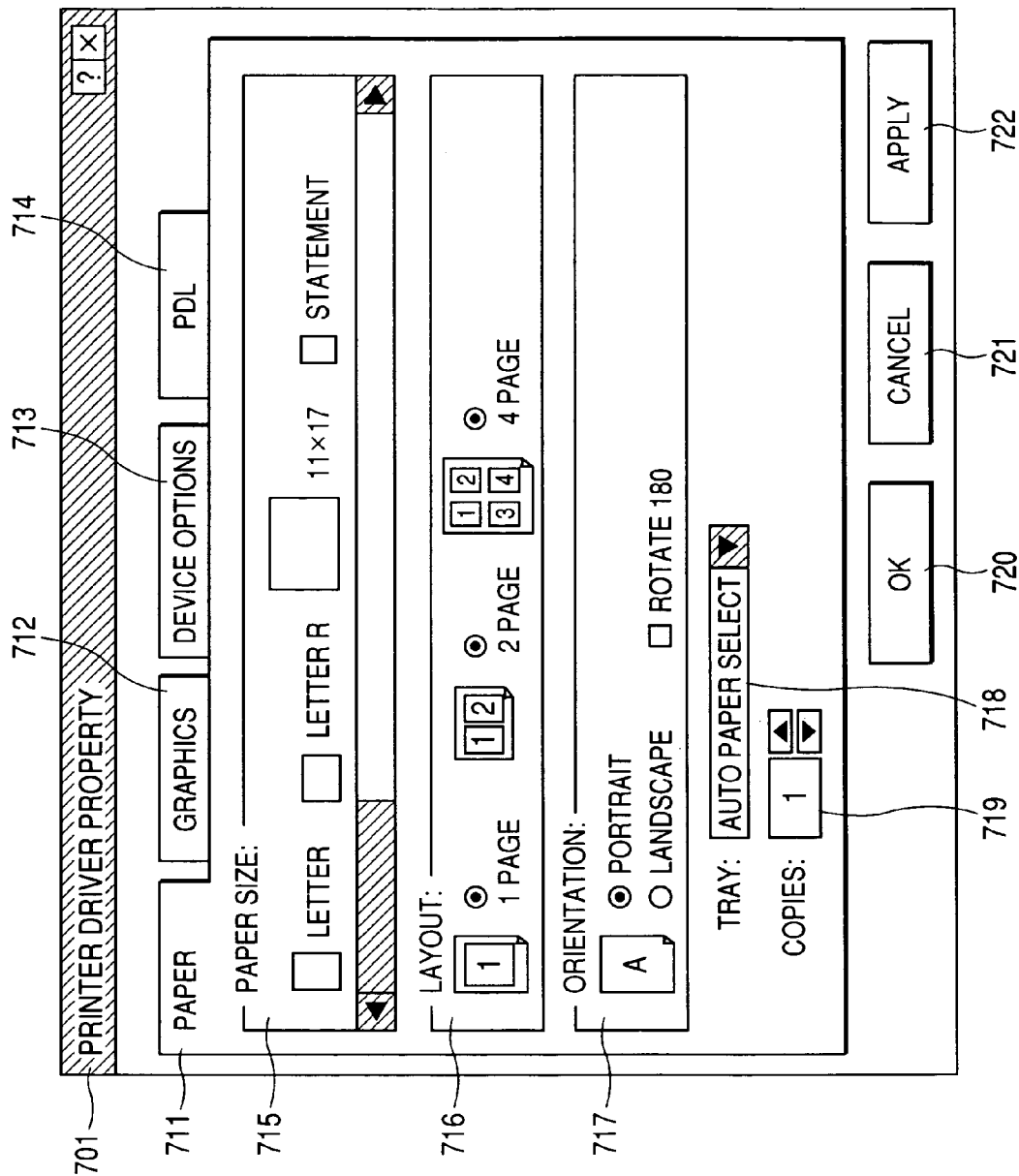
FIG. 9 shows an example of the printer driver screen on the client computer.
Figure 10:
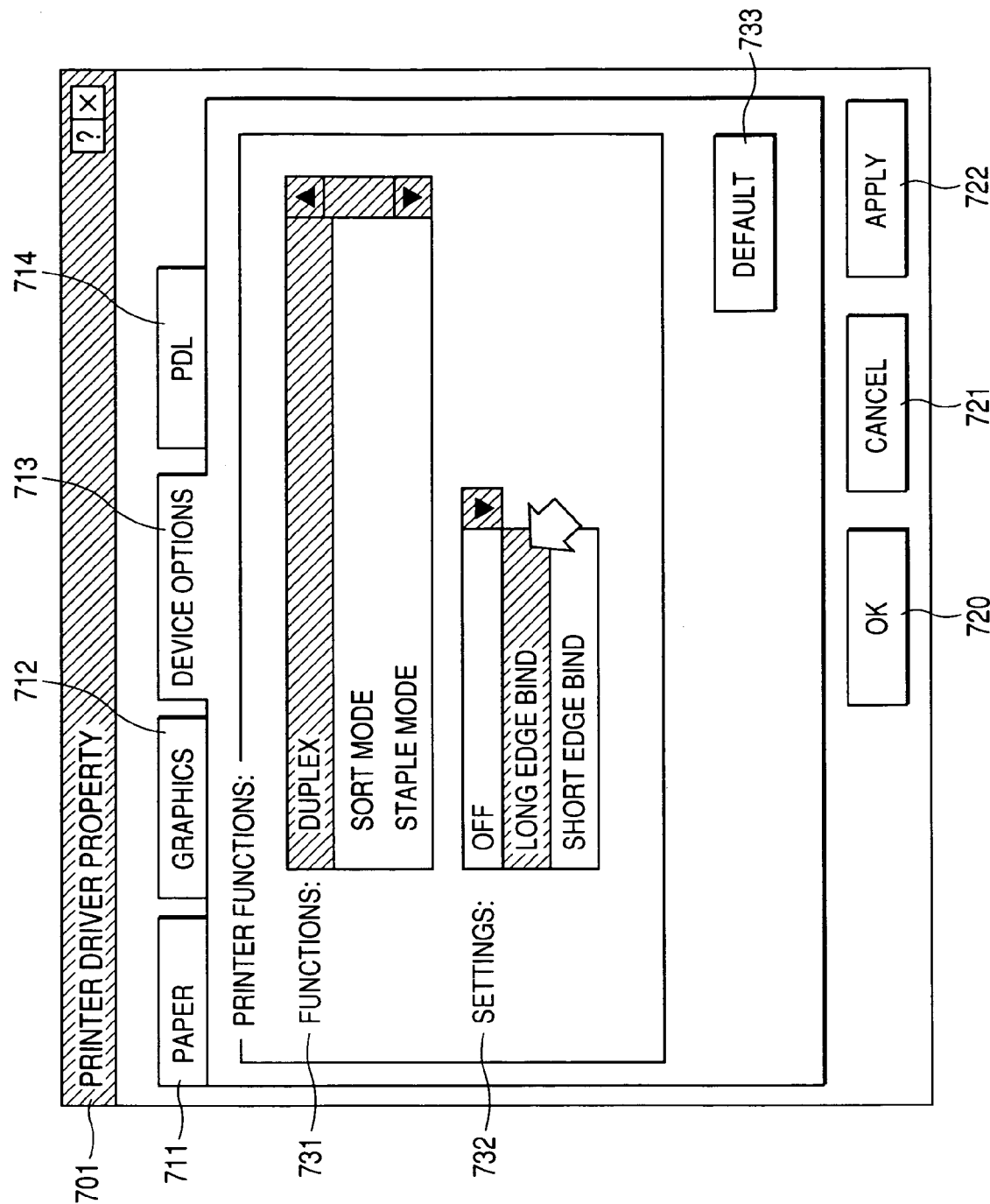
FIG. 10 shows an example of the printer driver screen on the client computer.

FIGS. 8 through 10 show examples of a printer driver screen on the client computer 103.

The printer driver is instructed by a graphic user interface (GUI) (the GUI displayed in a case where displaying instruction of a property related to the "printer" is made on the GUI for print setting displayed when print instruction is made by means of the application). The user can transmit a desired image to a destination of transmission such as the printer device by instructing a desired setting parameter to the printer driver.

In FIG. 8, reference numeral 701 denotes an window of the printer driver. In setting items of the window 701 of the printer driver, reference numeral 702 denotes a transmission destination selection column for selecting output destination which is a target. In this embodiment, the above-mentioned MFP 104 or the MFP 105 is the object of the selection. Reference numeral 703 denotes a page setting column for selecting an output page from the job. The page setting column 703 determines which page of the image created by application software which operates on the client computer 103 is to be outputted.

Reference numeral 704 is a copy number setting column for designating the number of copies. By moving a cursor at a position of the copy number setting column 704 and clicking an arrow shown in FIG. 8 (the arrow of a scroll bar), the number of copies can be set by increasing or decreasing the number of copies. Reference numeral 707 denotes a property key for performing a detailed setting as to a transmission destination device selected by the transmission destination selection column 702. By pointing the property key 707, the screens as shown in FIGS. 9 and 10 are displayed.

Then, when the desired setting is finished, the printing is started by pushing an OK key 705 (the print data is transmitted to the print manager 115 (refer to FIG. 46 to be described later)). To cancel the printing, a cancel key 706 is operated.

FIGS. 9 and 10 are display screens (GUI) displayed when the property key 707 is clicked.

In FIGS. 9 and 10, in the display screen, a "Paper" tab 711, a "Graphics" tab 712, a "Device Options" tab 713, and a "PDL" tab 714 are provided, for example. By clicking the tabs 711 through 714 (by pointing with a pointing device (not shown) and the like), the setting of different setting contents including "Paper", "Graphics", "Device Options", and "PDL" can be conducted.

In FIG. 9, the "Paper" tab 711 is shown as an example. In FIG. 9, the setting such as a paper size 715, a layout 716, an orientation 717, a paper feed tray 718, and a number of copies 719 can be performed. In addition, if the "Device Options" tab 713 is selected, it is possible to adjust the setting, in a more detailed manner, of setting information unique to the device, such as the setting of finishing including stapling and the setting related to image processing for changing the parameter of color tone and the like by the printer.

As shown in FIG. 10, when selecting, a function 731 and a setting value 732 are set at a desired value, respectively. Reference numeral 733 denotes a default key for returning each of the setting values to the initial value.

In addition, although not shown in FIG. 10, in the same way as described above, in the "Graphics" tab 712, the setting as to the resolution and half tone can be selected. In the "PDL" tab 714, the selection of an output format of the PDL can be conducted.

Further, when an OK key 720 is pushed down (pointed), the property setting is made effective and the processing returns to the screen shown in FIG. 8. When a cancel key 721 is pushed down (pointed), the property setting is made invalid and the processing returns to the screen shown in FIG. 8. Further, when an apply key 722 is pushed down (pointed), the property setting is made effective while the property screen is displayed as it is.

<RIP Section 603>

Next, the configuration of the RIP section 603 of the print manager 115 is explained with reference to FIGS. 11, 12A, 12B, 13, 14A, 14B, 14C, and 14D.

Figure 11:
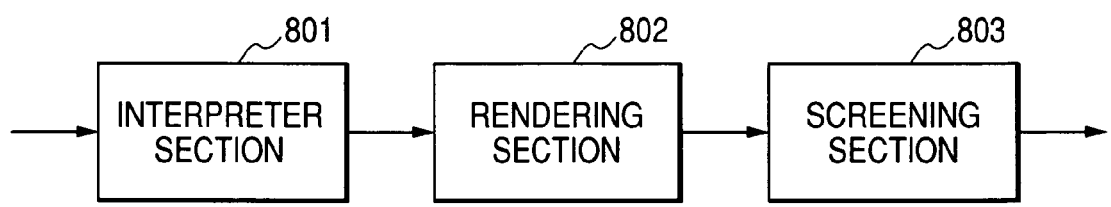
FIG. 11 is a block diagram showing an example of a configuration of an RIP section.

FIG. 11 is a block diagram showing an example of a configuration of the RIP section 603.

In FIG. 11, the RIP section 603 is, in general, configured by three sections, namely, an interpreter section 801, a rendering section 802, and a screening section 803.

The interpreter section 801 performs bit map development by translating the PDL. The rendering section 802 performs color rendition of the PDL. In addition, the screening section 803 performs binarization processing and creation of the screen with a predetermined period and angle in a case of the output to the monochromatic MFP 105, and performs the creation including a gamma table for calibration, in a case of the output to the color MFP 104.

Hereafter, each part of the RIP section 603 is explained in detail.

First, the interpreter section 801 is explained with reference to FIG. 12A and FIG. 12B.

The interpreter section 801 is a section for analyzing the PDL data. The PDL data, which is typically the Post Script (registered trademark) language of Adobe Systems Incorporated, is classified into three elements, namely, elements (a) through (c), as described below.

(a) Image description by character code
(b) Image description by graphic code
(c) Image description by raster image data That is, the PDL is the language which describes the image constituted by the combination of the above elements, and the described data is called the PDL data.

Figures 12A, 12B:
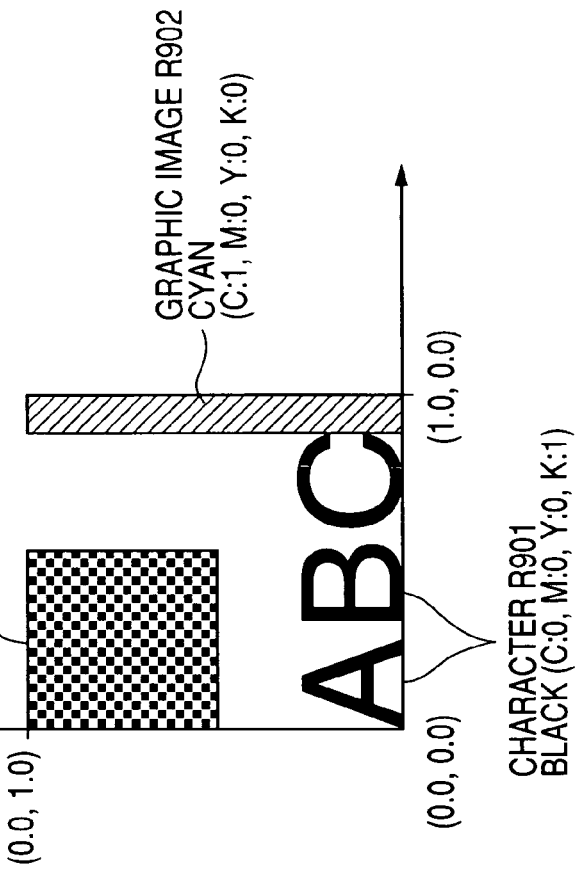
FIG. 12A shows an example of a description of PDL data inputted to an interpreter section.
FIG. 12B shows a result of plotting by the interpreter section.

FIG. 12A shows an example of description of the PDL data inputted to the interpreter section 801. FIG. 12B shows a result of plotting by the interpreter section 801.

FIG. 12A corresponds to the example of the description of the PDL data according to the result of plotting shown in FIG. 12B. The example of character information "description of R901" is indicated by lines L911 through L913 and is constituted by a color of the character, a character string, and a coordinate position. The description within the parentheses of the color of the character expresses densities of cyan, magenta, yellow, and black, respectively, arranged successively from the left side. The minimum description is "0.0", and the maximum description is "1.0". In the line L911, an example for designating the color of the character as black is shown. Next, in the line L912, it is shown that the character string "ABC" is assigned to a variable string 1.

Next, in the line L913, a first parameter and a second parameter indicate an x coordinate and a y coordinate, respectively, of a starting position coordinate on the paper sheet on which the character string is laid out; a third parameter indicates a size of the character; a fourth parameter indicates a character interval; and a fifth parameter indicates the character string to be laid out. To be brief, the line L913 is the instruction of the layout such that the character string "ABC" is laid out with the character size of "0.2" and the character interval of "0.3" from the coordinate (0.0, 0.0).

Next, in the example of graphic information "Description of R902", a line L921 designates the color of the line in the same description method as the line L911 which designates the color of the character, and here, cyan is designated. Next, a line L922 is the description for designation of drawing a line. In the line L922, a first and a second parameters indicate the x and y coordinates of a start-point coordinate of the line, respectively; a third and a fourth parameters indicate the x and y coordinates of an end-point coordinate of the line, respectively; and a fifth parameter indicates thickness of the line.

Further, in an example of the raster image information "Description of R903", a line L931 indicates that the raster image is assigned to a variable image 1. Here, a first parameter indicates an image type and a number of color components of the raster image; a second parameter indicates a number of bits per one color component; a third and a fourth parameters indicate the image size of the raster image in the directions of x and y respectively; and a fifth parameter and parameters thereafter indicate the raster image data. The number of the raster image data is obtained by multiplying the number of color components constituting one pixel by the image size in the directions of x and y. In the line L931, a CMYK image is constituted by the four color components, namely, cyan, magenta, yellow, and black, and accordingly, the number of the raster image data is 100 (=4×5×5)

Next, a line L932 indicates that the image 1 is laid out with the size of "0.5×0.5" from the coordinates (0.0, 0.5).

FIG. 12B shows a state in which the three image descriptions ("Description of R901", "Description of R902", and "Description of R903") in one page shown in FIG. 12A are construed and are developed into the raster image data.

In FIG. 12B, reference symbols R901, R902, and R903 denote results of development of each of the PDL data ("Description of R901", "Description of R902", and "Description of R903") shown in FIG. 12A.

The raster image data is, in actuality, developed in the memory 608 (or in the hard disk 607) of the print manager 115 per each of the color components of C, M, Y, and K. For example, in the part of R901, descriptions such as C=0, M=0, Y=0, and K=255 are written in each memory of C, M, Y, and K. As for the description of R902, descriptions such as C=255, M=0, Y=0, and K=0 are written in each memory of C, M, Y, and K.

In the print manager 115, the PDL data sent from the client computer 103 (or from other computers) is written in the memory 608 (or in the hard disk 607) in the form of the PDL data as it is or in a form of a developed raster image, as described above, and is archived as necessary.

Next, the rendering section 802 is explained with reference to FIG. 13.

The image data outputted from the interpreter section 801 includes data on gray scale, an RGB, CMYK, and in addition thereto, the data on various kinds of color spaces. In a case where the data is on the other color spaces, the image data is once converted in the CMYK color space by a color rendering dictionary (CRD) and after that, color matching is conducted.

Figure 13:
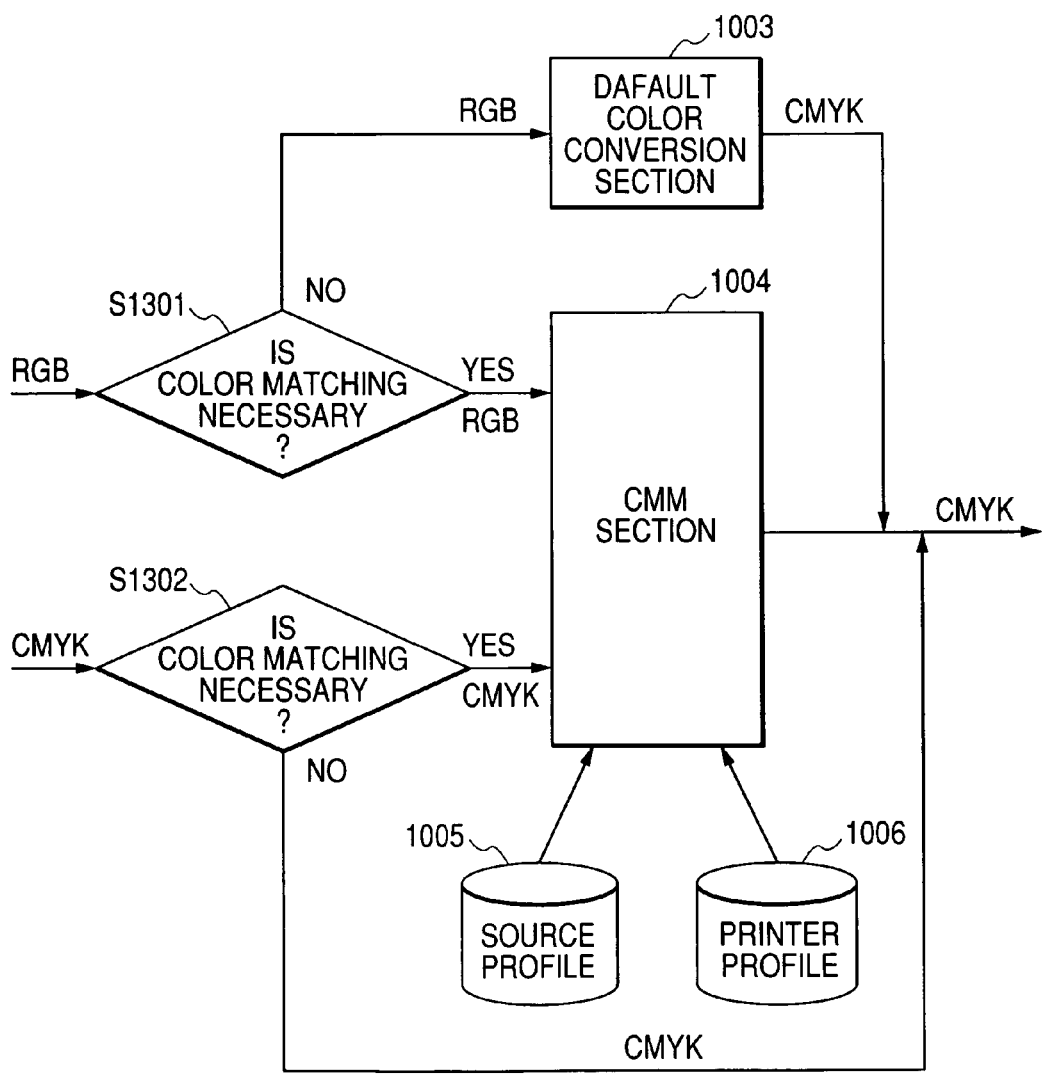
FIG. 13 shows an example of a color matching in a rendering section.

FIG. 13 shows an example of the color matching in the rendering section 802.

In FIG. 13, the color matching is performed in such a manner that color adjustment is carried out with an ICC profile in a color matching manager (CMM) section 1004, in a case where the color matching of the data inputted in RGB or CMYK is necessary ("Yes" in the determination in a step S1301 or "Yes" in the determination in a step S1302). The ICC profile is constituted by a source profile 1005 and a printer profile 1006.

The source profile 1005 once converts RGB (or CMYK) data into the color space of standardized L*a*b*, and the L*a*b* data is again converted into the CMYK color space suitable for the printer device which is the target. In addition, the source profile 1005 is constituted by an RGB profile (not shown) and a CMYK profile (not shown). If the inputted image is the image in RGB (i.e., the image for the application software of Microsoft Corporation, a JPEG image, a TIFF image, and the like), the RGB profile is selected. On the other hand, if the inputted image is the image in CMYK (i.e., a part of the data on the image for Photoshop and Illustrator of Adobe Systems Incorporated, and the like), the CMYK profile is selected.

The printer profile 1006 is created in accordance with color characteristics of each of the printer devices. It is preferable to select perceptual (color tone prioritized mode) or saturation (clearness prioritized mode) for the image in RGB; and in a case of the image in CMYK, calorimetric (minimum color difference) is often selected to output the optimum image.

The ICC profile is generally created in a form of a look-up table. In the source profile 1005, when the RGB (or CMYK) data is inputted, the RGB (or CMYK) data is uniquely converted into the L*a*b* data, and in the printer profile 1006, the data is converted from the L*a*b* data into CMYK data which is suitable for the printer device.

Note that if the color matching is not necessary for the data inputted in RGB, the data is converted in a default color conversion section 1003 from the RGB data into the CMYK data which is suitable for the printer device. On the other hand, if the color matching is not necessary for the data inputted in CMYK, the data is outputted as it is.

Next, gamma correction in the screening section 803 is explained with reference to FIGS. 14A, 14B, 14C and 14D.

FIGS. 14A, 14B, 14C and 14D are characteristic diagrams explaining the gamma correction in the screening section 803.

Figure 14A:
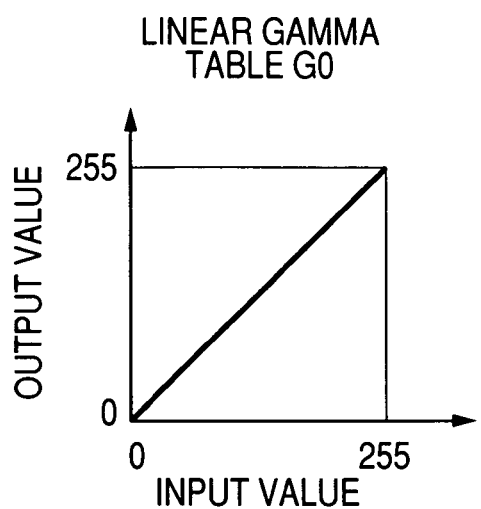
FIGS. 14A, 14B, 14C and 14D are each a characteristic feature view explaining gamma correction in a screening section
Figure 14B:
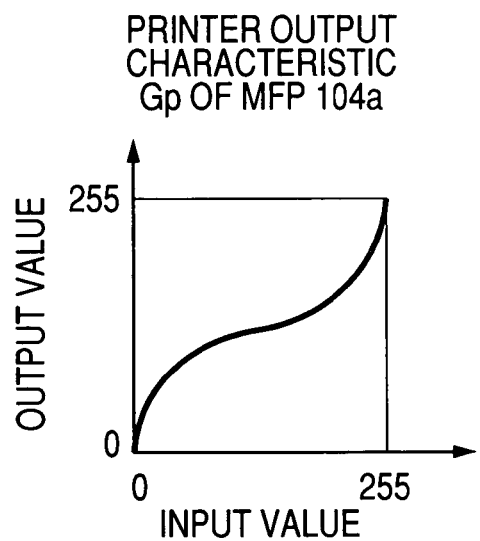
Figure 14C:
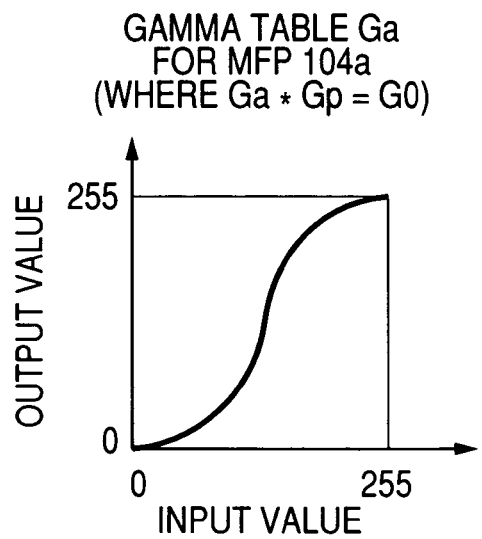

FIG. 14A corresponds to a linear gamma table; FIG. 14B corresponds to an output characteristic of the printer device; FIG. 14C corresponds to the gamma table which is calibrated; and FIG. 14D corresponds to the gamma table with the output characteristic taken into account.

In FIGS. 14A, 14B, 14C and 14D, the linear gamma curve as shown in FIG. 14A is prepared for the gamma table, and the gamma table is prepared in accordance with the output characteristic of the printer device.

For example, in a case where the output characteristic Gp of the MFP 104a is of the value as shown in FIG. 14B, by multiplying the output characteristic Gp by the value as shown in FIG. 14C which is an inverse function Ga thereof, the output characteristic is modified to a linear value, as is shown in FIG. 14A (Ga×Gp=G0).

Figure 14D:
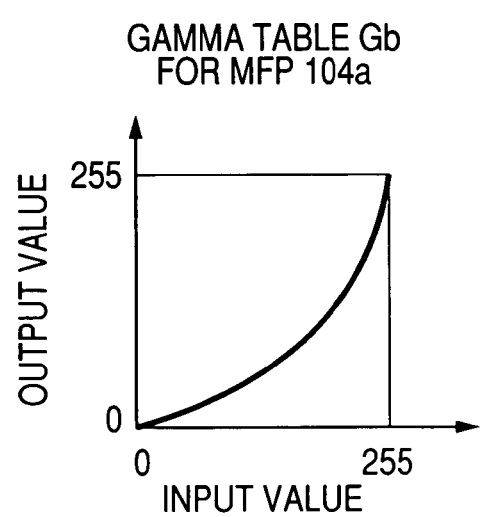

In addition, if it is desired to select the characteristic as shown in FIG. 14D for a print-like output characteristic Gb (that is, the characteristic by which change in brightness becomes smooth in accordance with a visual characteristic of human when the printing is performed), the output characteristic may be obtained by multiplication with the table of the value Ga×Gb.

In addition, to create the gamma tables, a calibration function utilizing a scanner section of the MFP 104*a*, a densitometer, and the like is commonly known.

<Configuration of the MFP 104*a* and the MFP 105*a*>

Next, configurations of the MFP 104*a* and the MFP 105*a* are explained with reference to FIGS. 15 through 19. Here, it is to be noted that the difference between the MFP 104*a* and the MFP 105*a* is the difference between a full-color configuration and a monochrome configuration; and because the configuration of a full-color equipment except for a section for color processing often inclusive of the configuration of a monochrome equipment, the explanation will be made focusing on the configuration of the full-color equipment, and the explanation as to the monochrome equipment is added as needed.

Figure 15:
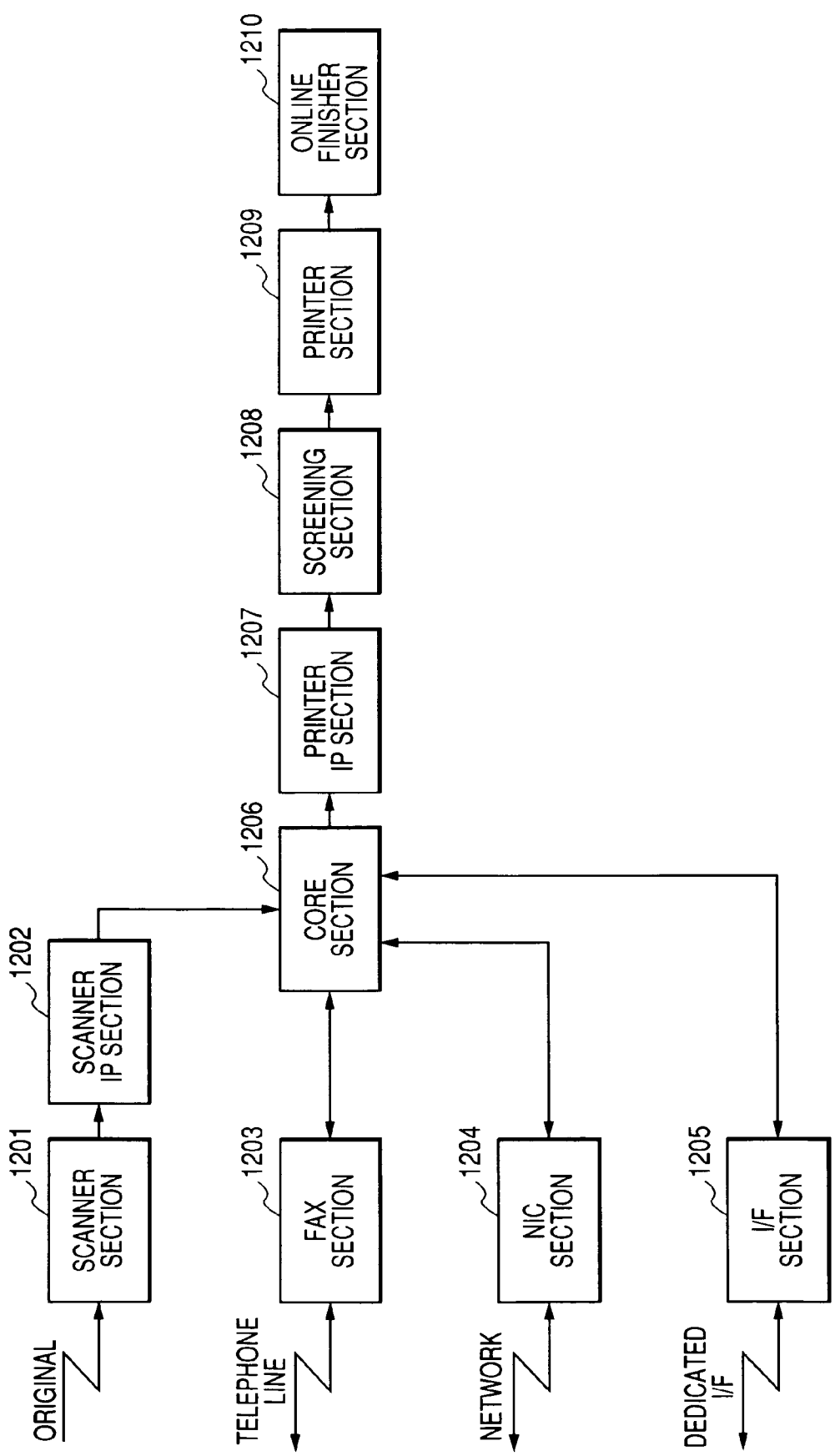
FIG. 15 is a block diagram showing a configuration of an MFP.

FIG. 15 is a block diagram showing the configuration of the MFP 104*a* or the MFP 105*a*.

In FIG. 15, the MFP 104*a* and the MFP 105*a* are each provided with a scanner section 1201; a scanner IP section 1202; a FAX section 1203; an NIC section 1204; a dedicated I/F section 1205; a core section 1206; a printer IP section 1207; a screening section 1208; a printer section 1209; and an online finisher section 1210.

The scanner section 1201 reads an image from the original. The scanner IP section 1202 performs image processing to the image data read from the original. The FAX section 1203 sends and receives the image utilizing a telephone line, which is typically performed by a facsimile. The NIC section 1204 exchanges the image data and device information by utilizing a network. The dedicated I/F section 1205 exchanges the information with a full-color MFP 104, and performs control of temporarily storing an image signal and determining the path thereof through the core section 1206 in accordance with how the MFP 104*a* and the MFP 105*a* are used.

Next, the image data outputted from the core section 1206 is sent to the printer section 1209, where forming of the image is performed, via the printer IP section 1207 and the screening section 1208. The paper sheet which is printed out by the printer section 1209 is sent into the online finisher section 1210. In the online finisher section 1210, the processings such as sorting of the paper sheet and finishing of the paper sheet are performed.

The core section 1206 performs traffic control of buses. The core section 1206 selects one of the paths described in items (1) through (5) below, in accordance with how the MFP is used. In addition, it is commonly known that compressed data such as the JPEG, joint bi-level image experts group (JBIG), and ZIP, are used when the data is exchanged via the network; and after the data enters the MFP, the core section 1206 decompresses the data.

(1) Copying function: the scanner section 1201→the core section 1206→the printer section 1209.

(2) Network scanner: the scanner section 1201→the core section 1206→the NIC section 1204.

(3) Network printer: the NIC section 1204→the core section 1206→the printer section 1209.

(4) Facsimile transmission function: the scanner section 1201→the core section 1206→the FAX section 1203.

(5) Facsimile receiving function: the FAX section 1203→the core section 1206→the printer section 1209.

The printer IP section 1207 is configured with an output masking/UCR section for matrix-computing the signal into Y, M, C, K signals, which are toner colors of the image forming apparatus; a gamma correction section for converting the signal into C, M, Y, K data for outputting the image by using an LUT (look-up table) RAM which takes into consideration the color tone characteristics of the toner; a spatial filter for providing sharpness and smoothing; and the like.

The screening section 1208 is the section for performing the processing such as error distribution, dither, or pulse width modulation (PWM).

FIG. 16A is a block diagram showing a configuration in which PWM processing is performed by the screening section, and FIG. 16B shows a signal waveform.

In FIG. 16A, reference numeral 1301 denotes a chopping wave generation section, and reference numeral 1302 denotes a D/A conversion section for converting a digital image signal to be inputted into an analog signal. The signal from the chopping wave generation section 1301 (a signal "a" as shown in FIG. 16B) and the signal from the D/A conversion section 1302 (a signal "b" as shown in FIG. 16B) are compared with regard to the level, and then the compared signal becomes a pulse width signal depending on a density such as a signal "c" as shown in FIG. 16B and is sent to a laser drive section 1304.

Note that in a case of a color printing, four configurations of the configuration as shown in FIG. 16A are necessary (for C, M, Y, and K), and each of C, M, Y, and K is converted into a laser beam by a semiconductor laser 1305 of each of them. In addition, the laser beams are scanned by a polygonal mirror 1413, and are applied to photosensitive drums 1417, 1421, 1425, and 1429.

Figure 17:
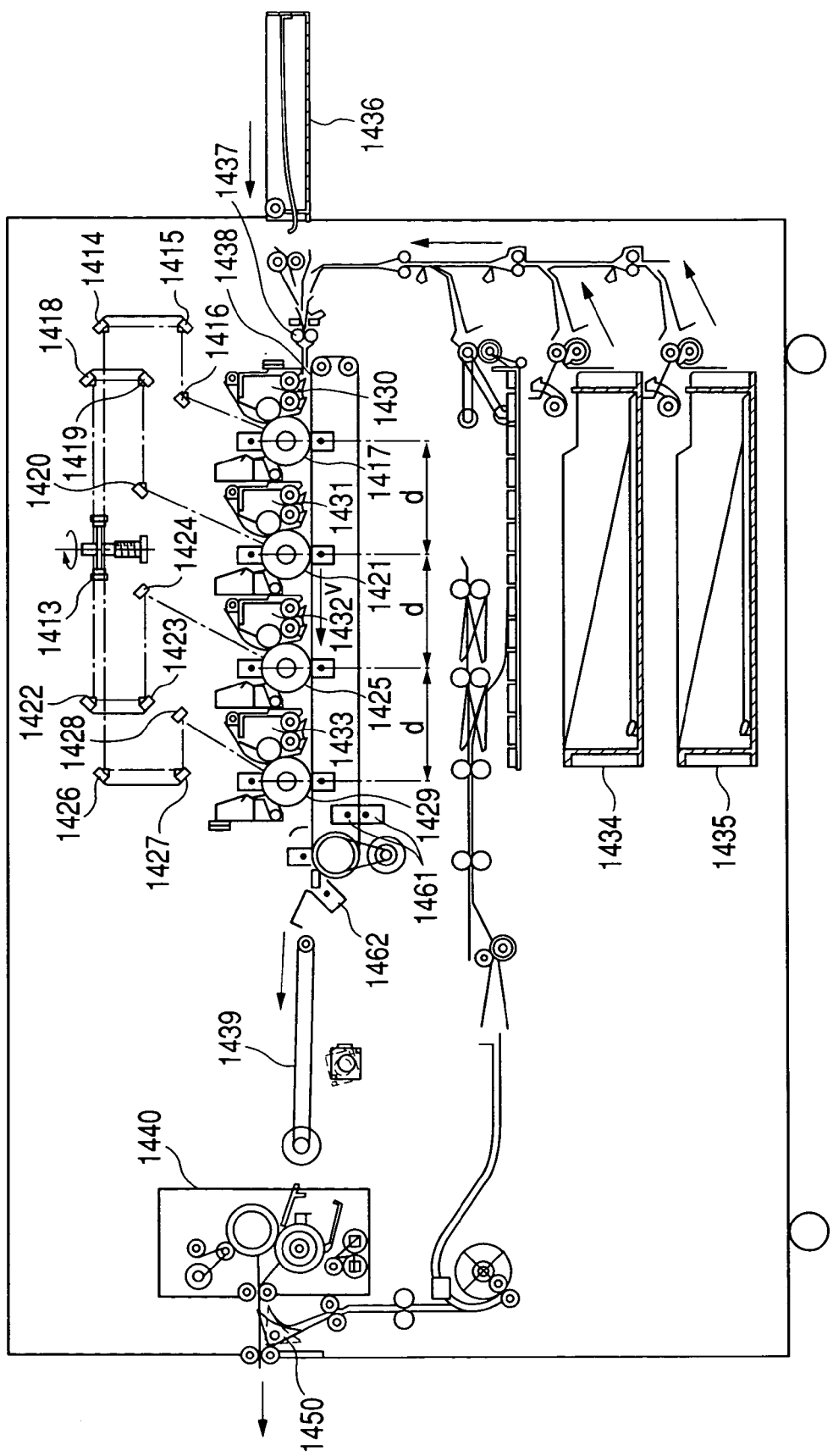
FIG. 17 shows a configuration of a printer ection (color printer section)

FIG. 17 is a configuration diagram showing a structure of the printer section (a color printer section) 1209. In FIG. 17, the same constituent components as those of FIG. 16A are provided with the same reference numerals.

In FIG. 17, the polygonal mirror 1413 receives four laser beams emitted from four semiconductor lasers 1305. One of the laser beams scans and exposes the photosensitive drum 1417 via mirrors 1414, 1415, and 1416, the next one laser beam scans and exposes the photosensitive drum 1421 via mirrors 1418, 1419, and 1420, the next one laser beam scans and exposes the photosensitive drum 1425 via mirrors 1422, 1423, and 1424, and the last of the four laser beams scans and exposes the photosensitive drum 1429 via mirrors 1426, 1427, and 1428.

In addition, reference numeral 1430 denotes a development device for supplying a toner of yellow (Y). The development device 1430 forms a yellow toner image on the photosensitive drum 1417 in accordance with the laser beam. Reference numeral 1431 denotes the development device for supplying the toner of magenta (M). The development device 1431 forms a magenta toner image on the photosensitive drum 1421 in accordance with the laser beam. Reference numeral 1432 denotes the development device for supplying the toner of cyan (C). The development device 1432 forms a cyan toner image on the photosensitive drum 1425 in accordance with the laser beam. Reference numeral 1433 denotes the development device for supplying the toner of black (K). The development device 1433 forms a black toner image on the photosensitive drum 1429 in accordance with the laser beam. The toner images of the four colors (Y, M, C, and K) mentioned above are transferred to a paper sheet from the photosensitive drums 1417, 1421, 1425, and 1429, respectively. As a result, the full-color output image can be obtained.

The paper sheet fed from either one of paper cassettes 1434 and 1435 or a manual insertion tray 1436 is, via a registration roller 1437, absorbed onto a transfer belt 1438 and is conveyed. Here, the toner of each color is developed in advance on the photosensitive drums 1417, 1421, 1425, and 1429, in synchronization with a timing of feeding of the paper sheet, and the toner is transferred to the paper sheet along with the conveyance of the paper sheet.

The paper sheet to which the toner of each color is transferred is separated from the transfer belt 1438, conveyed by a conveyance belt 1439, and the toner is fixed by a fixing device 1440. The paper sheet which has passed the fixing device 1440 is once guided downward by a flapper 1450, and after the trailing edge of the paper sheet has passed the flapper 1450, the paper sheet is switched back and is discharged. Thus the paper sheet is discharged in a face-down state, and accordingly, the paper sheet is arranged in a correct page order when the printing is conducted in order from a top page.

Note that the four photosensitive drums 1417, 1421, 1425, and 1429 are disposed at equal intervals d. The paper sheet is conveyed at a constant speed v by the conveyance belt 1439, and the four semiconductor lasers 1305 (FIG. 16A) are driven in synchronization with the timing of conveyance of the paper sheet.

Figure 18:
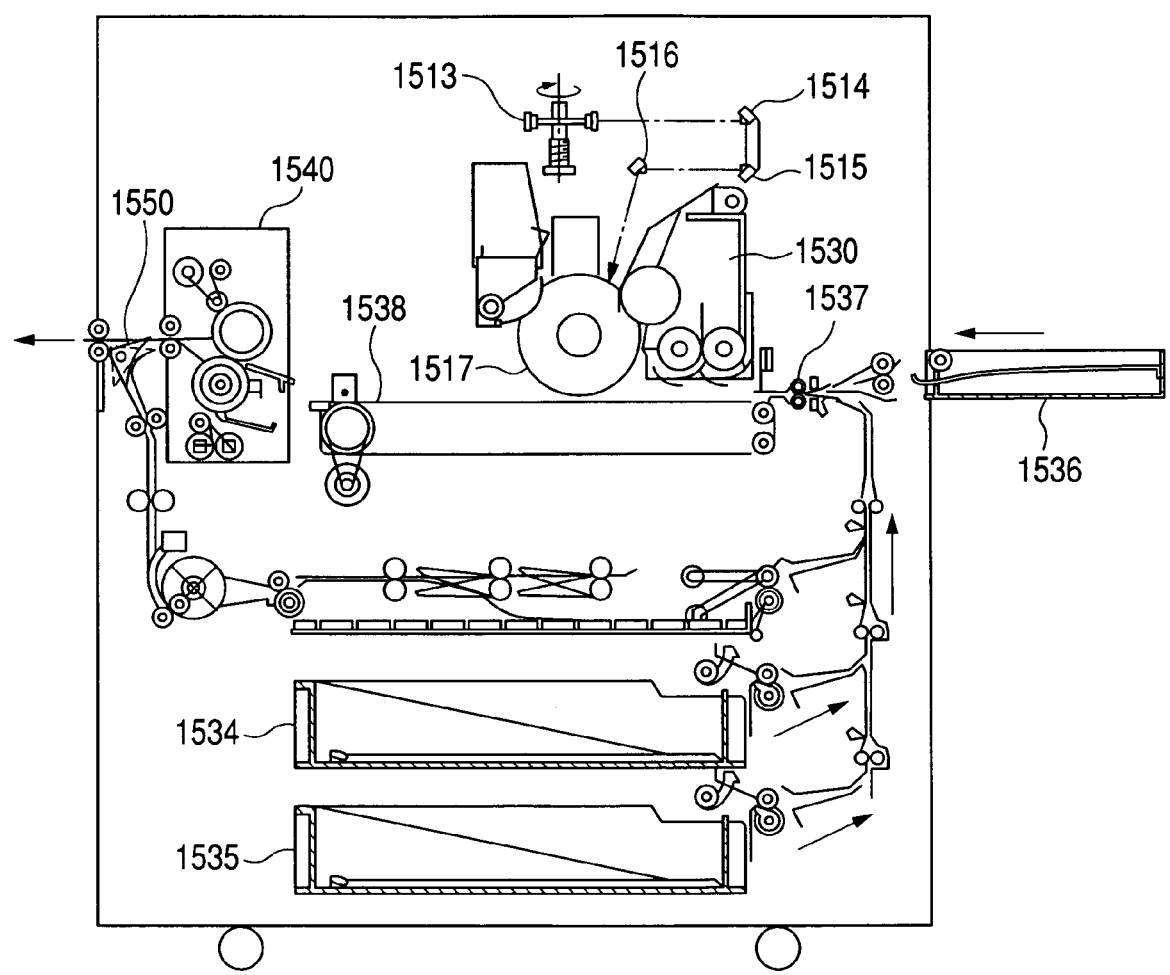
FIG. 18 shows a configuration of a printer ection (monochromatic printer section)

FIG. 18 is a configuration diagram showing the structure of the printer section (monochromatic printer section, 1209. In FIG. 18, the same constituent components as those of FIG. 16A are provided with the numbers obtained by adding 100 to the corresponding reference numerals.

In FIG. 18, reference numeral 1413 is the polygonal mirror. The polygonal mirror 1413 receives the laser beam emitted from the semiconductor laser 1305. The laser beam scans and exposes a photosensitive drum 1517, via mirrors 1514, 1515, and 1516. In addition, reference numeral 1530 is a development device for supplying the toner of black. The development device 1530 forms a toner image on the photosensitive drum 1517 in accordance with the laser beam.

The paper sheet fed from either one of paper cassettes 1534 and 1535 or a manual insertion tray 1536 is, via a registration roller 1537, absorbed onto a transfer belt 1538 and is conveyed. Here, the toner image is developed in advance on the photosensitive drum 1517, in synchronization with a timing of feeding of the paper sheet, and the toner image is transferred to the paper sheet along with the conveyance of the paper sheet. Accordingly, the output image can be obtained.

The paper sheet to which the toner is transferred is separated from the transfer belt 1538 and the toner is fixed by a fixing device 1540. The paper sheet which has passed the fixing device 1540 is once guided downward by a flapper 1550; and after the trailing edge of the paper sheet has passed the flapper 1550, the paper sheet is switched back and is discharged. Thus, the paper sheet is discharged in a face-down state, and accordingly, the paper sheet is arranged in a correct page order when the printing is conducted in order from a top page.

Note that a case where the printer section 1209 is of a laser beam system is explained in this embodiment as an example. However, the present invention is applicable to systems other than the laser beam system, such as an electrophotographic process (for example, an LED system), a liquid crystal shutter system, an ink jet system, a thermal transfer system, a sublimation system, or other print systems.

<Online Finisher Section 1210>

Figure 19:
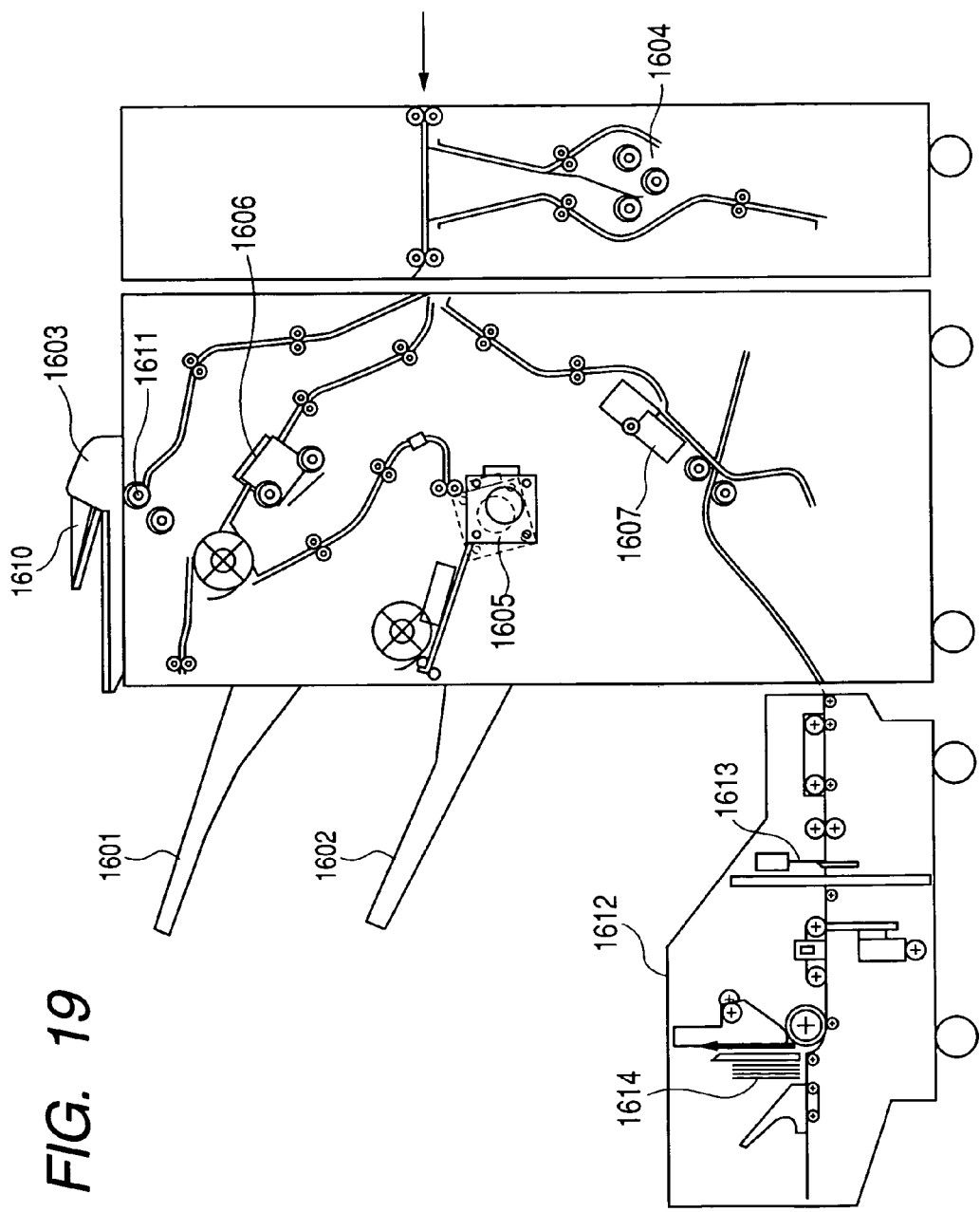
FIG. 19 shows a configuration of an online finisher section.

FIG. 19 is a configuration diagram showing the configuration of the online finisher section 1210.

In FIG. 19, if the online finisher section 1210 is connected to the printer section 1209, the paper sheet discharged from the fixing section of the printer section 1209 enters the online finisher section 1210. In the online finisher section 1210, a sample tray 1601 and a stack tray 1602 are disposed, and the paper sheet is discharged by switching to either of the trays in accordance with a type of the job and the number of sheets to be discharged.

There are two types of system for sorting paper sheets. That is, the sorting of paper sheets can be carried out by a bin sort system in which a plurality of bins are provided and the paper sheets are sorted out to the bins, and by a shift sort system in which the bin (or the tray) is shifted, by using an electronic sort function, to the back or the front, and the output paper sheets are sorted out job by job. The electronic sort function is called a collate. If the core section 1206 is provided with a buffer memory of a large capacity, the electronic sort function can be supported by using the so-called collate function which changes the order of pages and the order of discharging the paper sheet buffered by utilizing the buffer memory.

Next, a grouping function is, contrary to the sort function which sorts out the paper sheets job by job, a function for sorting out page by page.

Further, in a case where the paper sheet is discharged to the stack tray 1602, it is possible to accumulate, on a job basis, the paper sheets before being discharged, and bind by a stapler 1605 immediately before the paper sheet is discharged.

The online finisher section 1210 is provided with, other than those described above, a Z-folding device 1604 for folding the paper sheet in the shape of "Z" before the paper sheet reaches the two trays mentioned above, and a puncher 1606 which punches two (or three) holes for filing on the paper sheet. The Z-folding-device 1604 and the puncher 1606 respectively perform their processing in accordance with the type of the job.

Further, a saddle stitcher 1607 performs the processing such that after the center part of the paper sheet is bound at two points, the paper sheet is half-folded by engaging the center part of the paper sheet to the roller to create a booklet like a brochure. The paper sheets which are book-bound by the saddle stitcher 1607 are discharged to a booklet tray.

In addition, an inserter 1603 is a device for feeding the paper sheet set in a tray 1610 to either one of the trays 1601 and 1602, without passing the paper sheet through the printer 1209. This allows the paper sheet set in the inserter 1603 to be inserted between the sheets fed in the online finisher section 1210. In the tray 1610 of the inserter 1603, the user sets the paper sheet in a state of face-up, and the paper sheet is fed in the order from the uppermost paper sheet by a pickup roller 1611.

Therefore, the paper sheet from the inserter 1603 is discharged in the state of face-down, by conveying the same to the trays 1601 and 1602 as it is. In feeding the paper sheet to the saddle stitcher 1607, after the paper sheet is once fed into the puncher 1606 side, the orientation of the face of the paper sheet is adjusted by feeding the paper sheet with being switched back.

Next, a trimmer (cutting machine) 1612 will be explained.

A bundle of paper sheets which is made into a booklet (saddle-stitched booklet) by the saddle stitcher 1607 is inserted into the trimmer 1612. In this occasion, the paper sheet bundle of the booklet, first, is fed by a predetermined length by the roller. Then, the paper sheet bundle of the booklet is cut by the predetermined length by a cutter section 1613. Then, edges of the paper sheet bundle of the booklet which have been uneven for a plurality of pages within the bundle of paper sheets are neatly aligned. Then, the bundle of paper sheets is stored in a booklet holding section 1614.

<Post-Treating Manager 116>

The post-treating manager 116 is a computer for centralized control of offline finishers. The post-treating manager 116 is in charge of conducting status control, job instruction, and the like of various types of offline finishers which perform the finishing processing to the print output from the MFP 104 (or the MFP 105).

The offline finishers controlled by the post-treating manager 116 have various types of devices such as the cutting machine 121, the saddle stitch bookbinding machine 122, the wrapping bookbinding machine 123, the paper sheet folding machine 124, the inserting machine 125, and the gathering machine (collator) 126. The post-treating manager 116 grasps a status of the device and the status of the job, by the offline finishers and with a predetermined protocol, by sequential polling, and also controls the execution status of the job.

<File Archiving Manager 117>

The file archiving manager 117 archives the file of the user in case where a reservation for reprinting is made in the future. A form of the file for archiving may be either one or both of the PDL file and a Print Ready file (bitmap file and tiff file are widely known). In archiving, because archiving of the Print Ready file results in archiving a large volume of data, the file is recorded on another storage medium (such as a CD-ROM, an MO, and a ZIP); and the PDL file which is old or large is stored in another medium and the like. Further, if desired by the user, it is possible to send back the file together with a final output.

Figure 29:
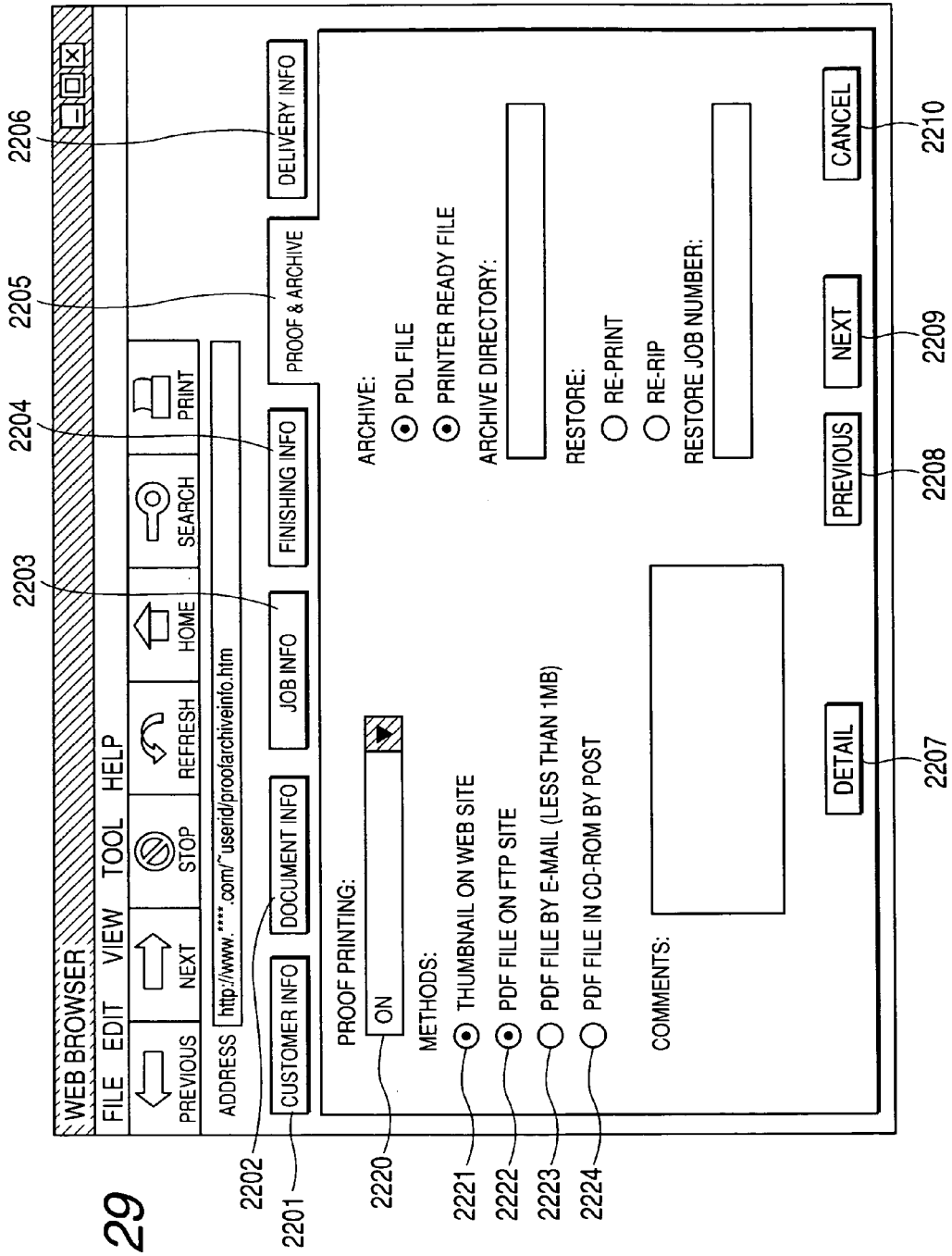
FIG. 29 shows an example of the job order receiving screen.

On the other hand, if the user desires to reprint the archived data, it is possible to reorder via the item "Restore" of the screen as shown in FIG. 29 as described later, for example.

<Delivery and Dispatch Manager 118>

The delivery and dispatch manager 118 is linked with a delivery service such as an express courier service, a courier service, and mailing service, and is a computer which controls a current state of the delivery, estimated time of arrival, and the like from a tracking number and an airway bill number, and the like of the delivery of the finished printed product.

<Scan Manager 119>

The scan manager 119 controls the scanner 106 and the scanner section of the MFPs 104 and 105. The scan manager 119 is a computer for calling a scanner driver, performing a preview, reading the image, and carrying out a quick copying in coordination with the printer section of the MFPs 104 and 105. The scan manager 119 is used when the operator digitizes the paper original in a case where the original received by the user is paper original. More specifically, first, the scanner driver is started up by the control by the scan manager 119.

Figure 20:
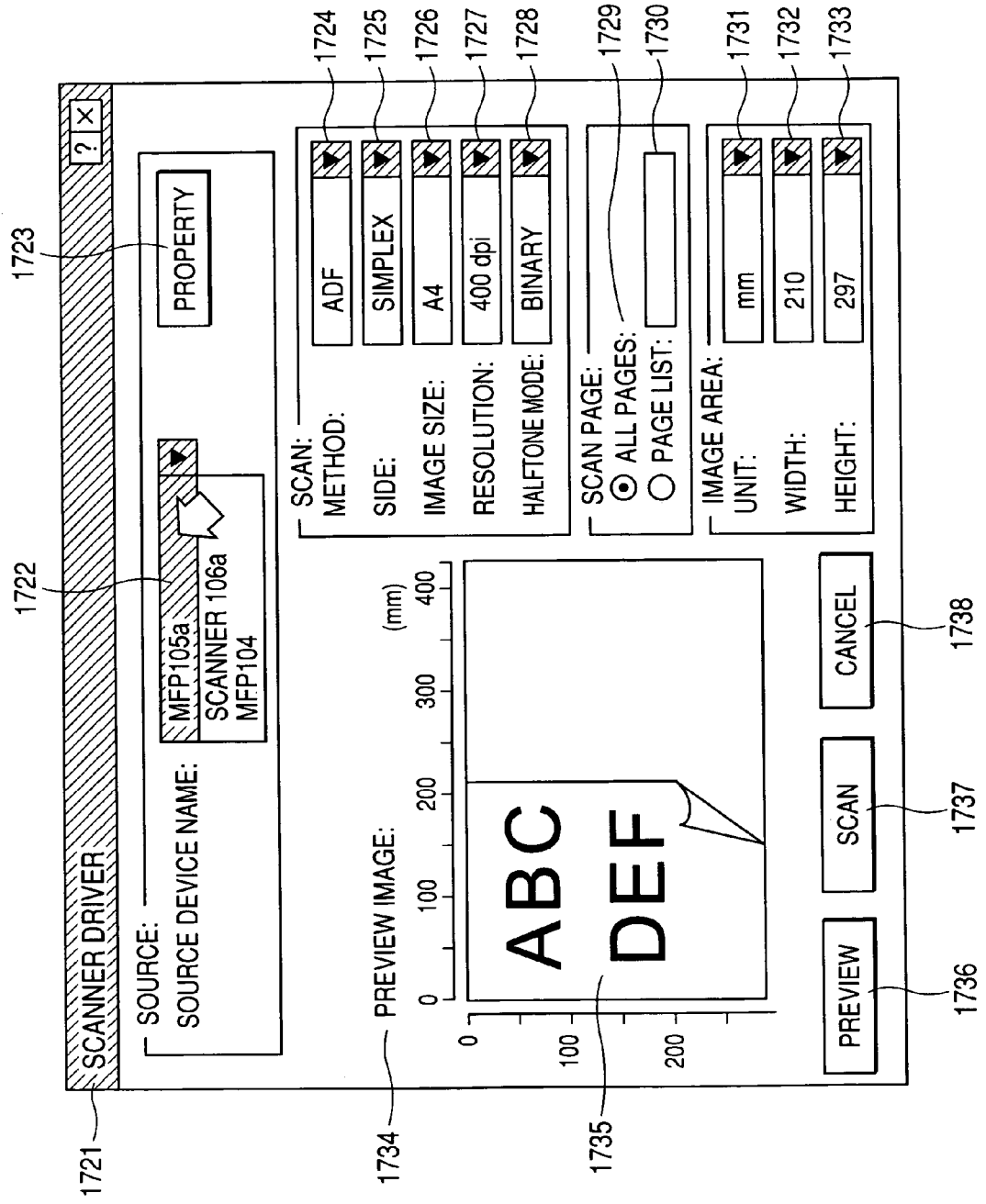
FIG. 20 shows a GUI of a scanner driver for instructing a scanning operation.

FIG. 20 shows a GUI of the scanner driver for instructing a scan operation.

In FIG. 20, the user selects the scanner to be a target by a source device name 1722, on the GUI of the scanner driver, and then specifies desired parameter settings 1724 through 1733. When the user clicks (points by a pointing device (not shown) or the like) a preview key 1736 or a scan key 1737, the reading of the image is started. Note that when a cancel key 1738 is clicked (pointed by the pointing device (not shown) or the like), the reading of the image is suspended. Further, when a property key 1723 is clicked (pointed by the pointing device (not shown) or the like), a property setting screen of the scanner selected at the source device name 1722 is displayed.

Figure 21:
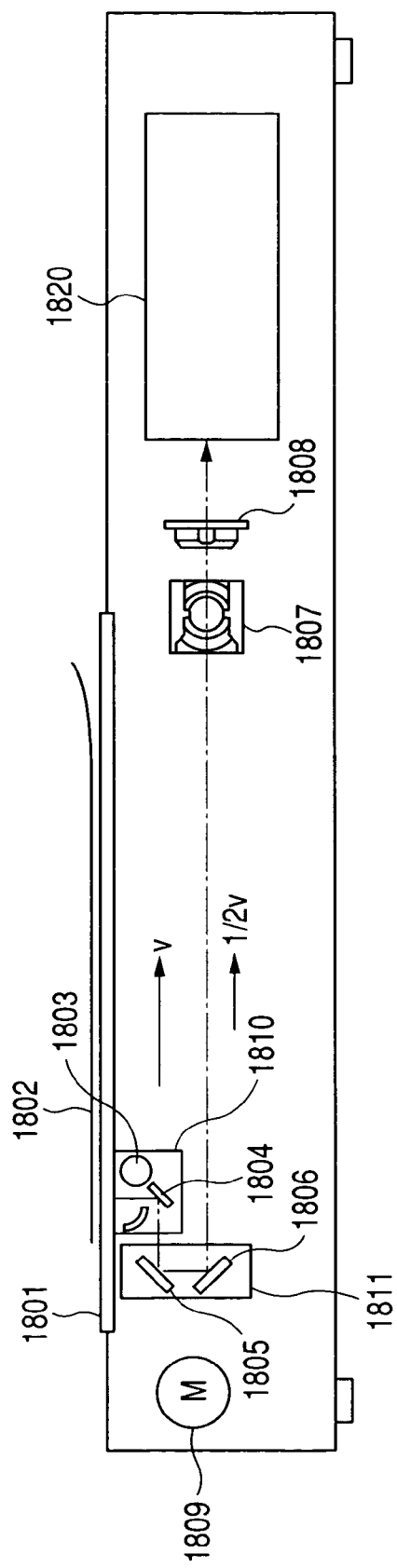
FIG. 21 is a configuration view showing a configuration of a scanner section.

FIG. 21 is a configuration diagram showing a configuration of the scanner section 1201.

In FIG. 21, an original 1802 is placed on an original table glass 1801. The original 1802 is irradiated by a lamp 1803, and a reflective light thereof is imaged on a CCD 1808 by a lens 1807, via mirrors 1804, 1805, and 1806. A first mirror unit 1810, which includes the mirror 1804 and the lamp 1803, travels at the speed v, and a second mirror unit 1811, which includes the mirrors 1805 and 1806, travels at a speed v/2, whereby the whole surface of the original 1802 is scanned. The first mirror unit 1810 and the second mirror unit 1811 are driven by a motor 1809. The output of the CCD 1808 is inputted to a data processing section 1820 having a configuration as shown in FIGS. 22A and 22B.

Figure 22A:
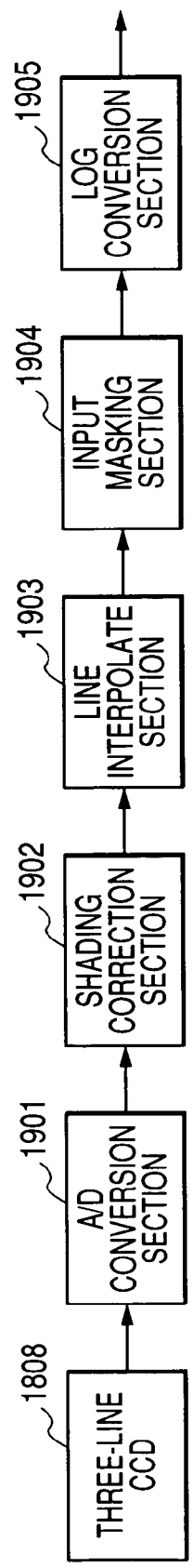
FIG. 22A is a block diagram showing a configuration of a data processing section of a color scanner.
Figure 22B:
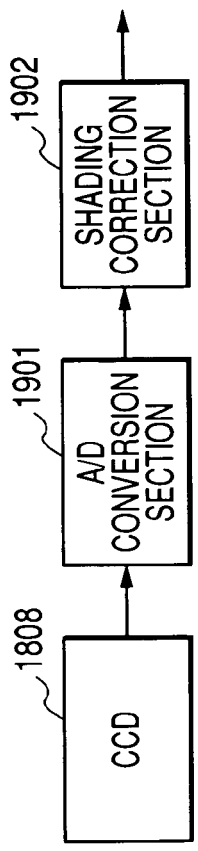
FIG. 22B is a block diagram showing a configuration of a data processing section of a monochromatic scanner.

FIG. 22A is a block diagram showing a configuration of the data processing section of a color scanner; and FIG. 22B is a block diagram showing a configuration of the data processing section of a monochromatic scanner.

In a case of a color scanner as shown in FIG. 22A, the image read from the original is converted into an electric signal by the CCD sensor 1808. The CCD sensor 1808 is a color sensor of an RGB three line color sensor, and the image signal of each of R, G, B is inputted to an A/D converter 1901. After gain adjustment and offset adjustment are carried out by the A/D converter 1901, the image signals are converted into 8-bit image signals R0, G0, B0, respectively and individually for the color signals. After that, a shading correction using a read signal of a reference white plate is performed to respective colors by the shading correction section 1902.

Further, each color line sensor of the CCD sensor 1808 is disposed at a predetermined distance to one another. In this regard, a line delay adjustment circuit (line interpolation section) 1903 corrects spatial deviation in a sub-scanning direction. Next, an input masking section 1904 is a section for converting a read color space determined by spectral characteristics of R, G, B filters of the CCD sensor 1808 into a standard color space of National Television System Committee (NTSC). The input masking section 1904 performs a matrix computation of 3×3 using a constant unique to the device with characteristics such as response characteristics of the CCD sensor 1808 and spectral characteristics of the lamp being considered. In addition, the input masking section 1904 converts the inputted (R0, G0, B0) signals into standard (R, G, B) signals.

In addition, a brightness/density conversion section (LOG conversion section) 1905 is configured by a look up table (LUT) RAM, and converts brightness signals of RGB into density signals of C1, M1, and Y1. The density signals are taken into the scan manager 119.

In a case of the monochromatic scanner as shown in FIG. 22B, the image read from the original is converted into the electric signal by using a single-color one line CCD sensor 1808. The electronic signal is inputted to the A/D converter 1901 as a single-color image signal. The image signal is taken into the scan manager 119, after being subjected to an A/D conversion by the A/D converter 1901 and to the shading correction by the shading correction section 1902.

Note that the image which is taken in can be confirmed by a preview section 1735 of the scanner driver as shown in FIG. 20. In addition, the image which is taken in is stored in the memory or the hard disk in the scan manager 119 as the image data.

<Message Manager 120>

The message manager 120 receives the maintenance information and the error information of each device connected to the network 101, and also receives the inventory information and delivery time information from the network server of the supplier of each of the maintenance parts. In addition, the message manager 120, on the basis of the information, displays a warning message of the maintenance via a display device (UI) at a desired timing set by the user. A detailed explanation of the operation of the message manager 120 will be made later.

<Data Flow>

Here, turning back to FIG. 1, let us look at the actual flow of data in the image forming system. The data is sent and received between each of the computers (managers) and the devices as shown in FIG. 1, and the process control manager 111 performs control of them all.

The data sent and received is implemented in a format called print production format (PPF) in CIP3 or in a new format job definition format (JDF) in CIP4. Note that the CIP3 expresses a cooperative organization for integration of print work flow of plate-making, printing, and post-treatment, which is called the International Cooperation For Integration of Prepress Press and Postpress. In addition, the CIP4 expresses a cooperative organization for integration of processes and processings of plate-making, printing, and post-treatment, which is called the International Cooperation For Integration of Processes in Prepress. Press and Postpress.

PPF integrates all the work flows of printing such as prepress (plate-making), press (printing), and postpress (post-treatment). Besides, PPF is a format for sending and receiving the data on the processing and the management between each of the processes. In addition, PPF handles various kinds of information such as management information, adjustment of ink, designation of cutting position, and the like. PPF is a standard format based on Post Script, having the purpose of quality stabilization, reduction of mistakes, performance of the processing at a higher speed, and effective operation of production facilities.

On the other hand, JDF is a format to which prepress operation information called portable job ticket format (PJTF) proposed by Adobe Systems Incorporated and a control attribute are appended, in addition to controllability of PPF. Further, JDF offers information integration of prepress, press, and postpress; collaboration of production with the process control manager 111; and compatibility with the existing system.

In addition, JDF follows an architecture such that an operation instruction called a job ticket, which PJTF is good at, is sent and received; and the structure of JDF is such that each of an operation history, an operation instruction, control information, and the like is subjected to necessary processings sequentially performed in each process and is transferred to a next process.

Figure 23:
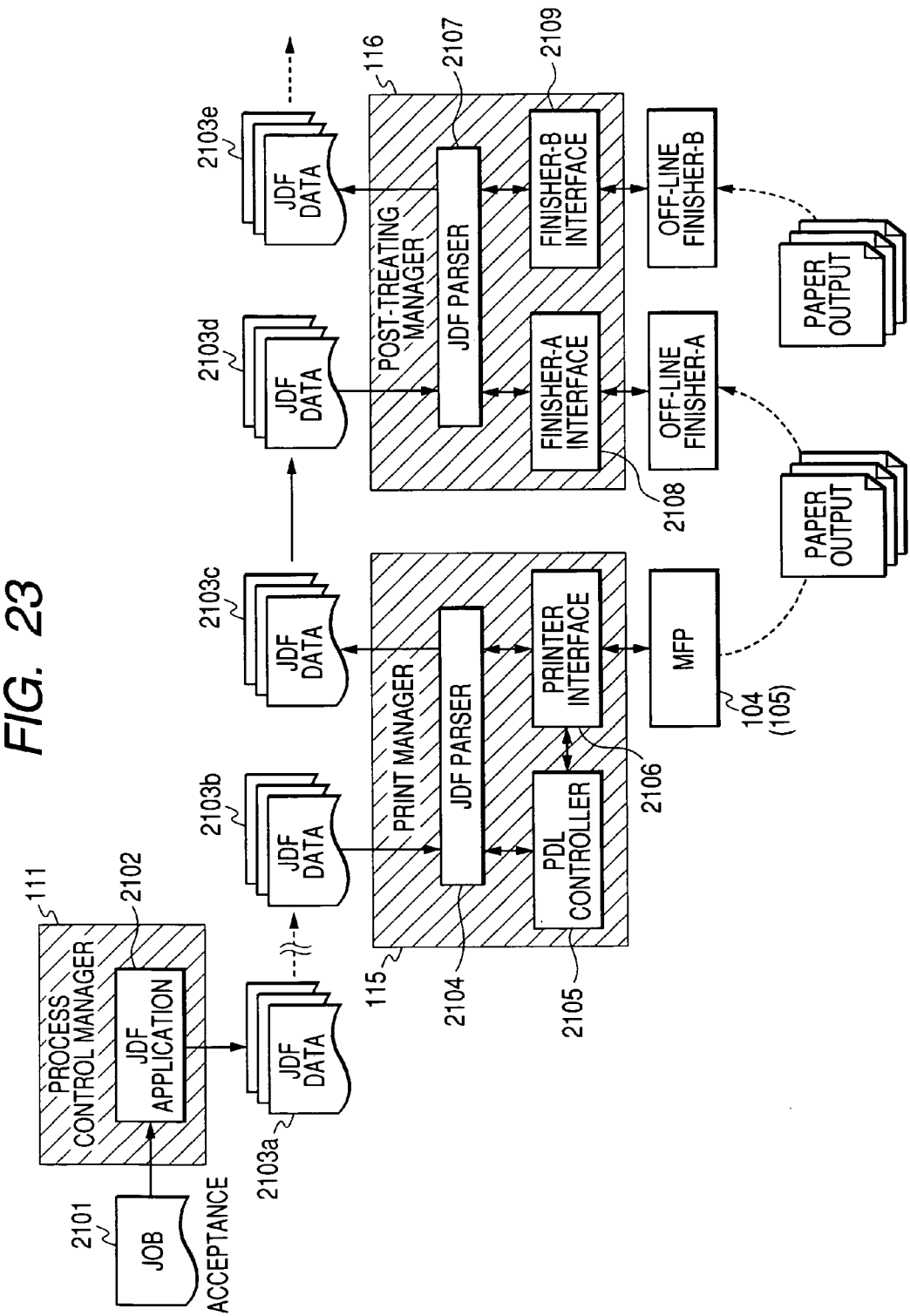
FIG. 23 shows a state in which JDF data is rewritten in each process.

Further, in JDF, extensible markup language (XML) is utilized as a language for structuring the job ticket (operation instruction). JDF defines a template called schema in which elements of the XML and arrangement of attributes are described. In JDF, XML data is rewritten in each of the processes in accordance with the defined schema. FIG. 23 shows how the rewriting is performed.

FIG. 23 shows how JDF data is rewritten in each of the processes.

In FIG. 23, in relation to a job 2101 inputted to the order receiving and original receiving manager 112, a JDF application 2102 installed in the process control manager 111 creates the JDF data.

The created JDF data is rewritten by: the process control manager 111; the order receiving/original receiving manager 112; the original editing manager 113; the proof manager 114; the print manager 115; the post-treating manager 116; the file archiving manager 117; the delivery/dispatch manager 118; or the scan manager 119.

In an example as shown in FIG. 23, what is performed between the print manager 115 and the post-treating manager 116 is shown. The sending and receiving of the JDF data is translated by a JDF parser 2104 (or a JDF parser 2107), and information is added, deleted, or modified thereto or therefrom in each of the managers.

With regard to the sending and receiving of the information, even if the actual print output (paper output) is offline-processed (the operator carries the output manually), each of job processing states is written in the JDF data from each of the devices via the JDF parser, each of the job processing states is transferred in a manner of bucket brigade, and each of the JDF data is sequentially managed by the process control manager 111. As a result, the state of each of the jobs can be confirmed at a glance.

<Order Placing and Order Receiving on the Web>

Next, an example of an electronic store utilizing a web page called a digital storefront with reference to FIGS. 24 through 31.

FIGS. 24 through 31 show examples of a job order receiving screen by the order receiving and original receiving manager 112.

Figure 24:
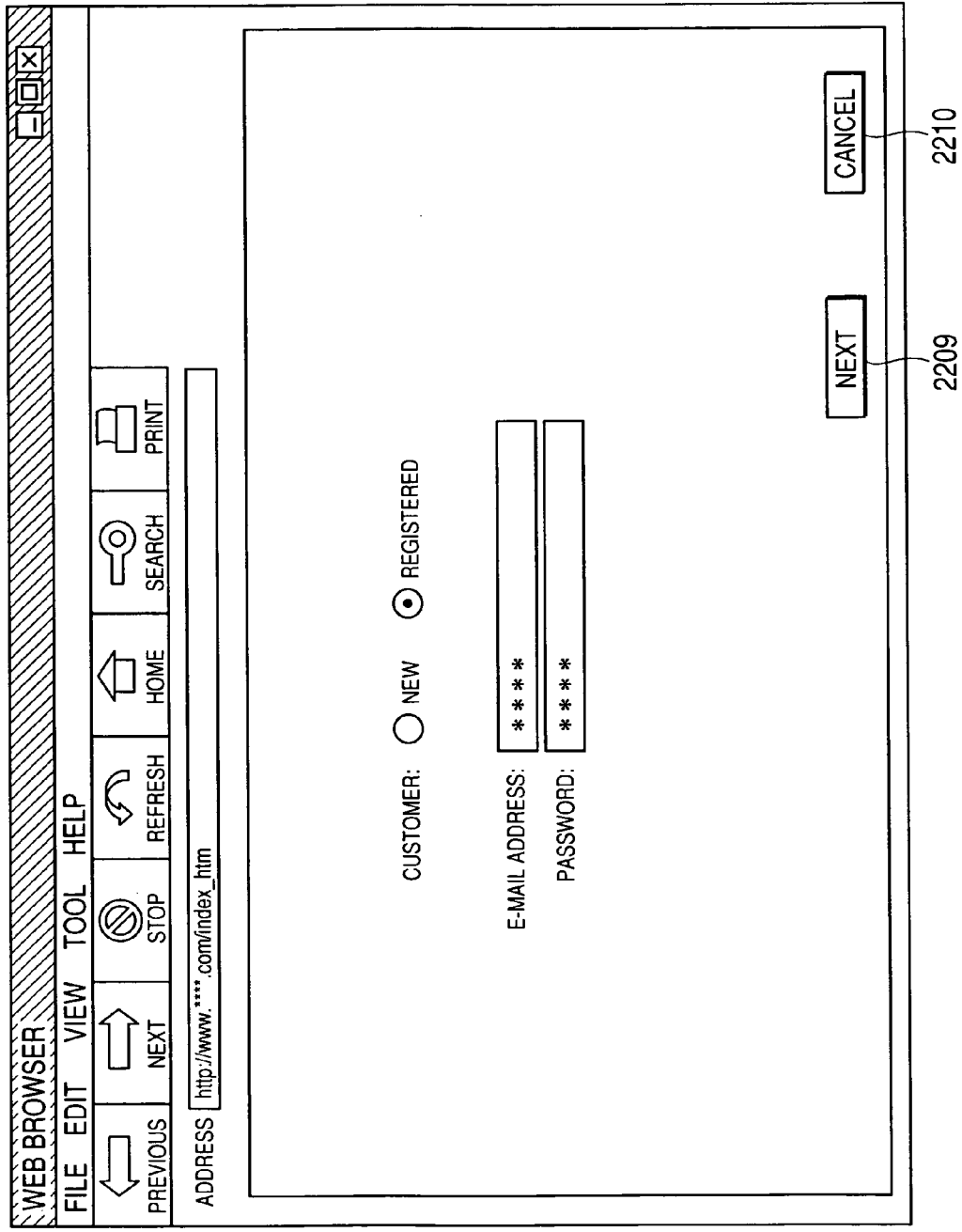
FIG. 24 shows an example of job order receiving screen provided by the order receiving/original receiving manager.
Figure 25:
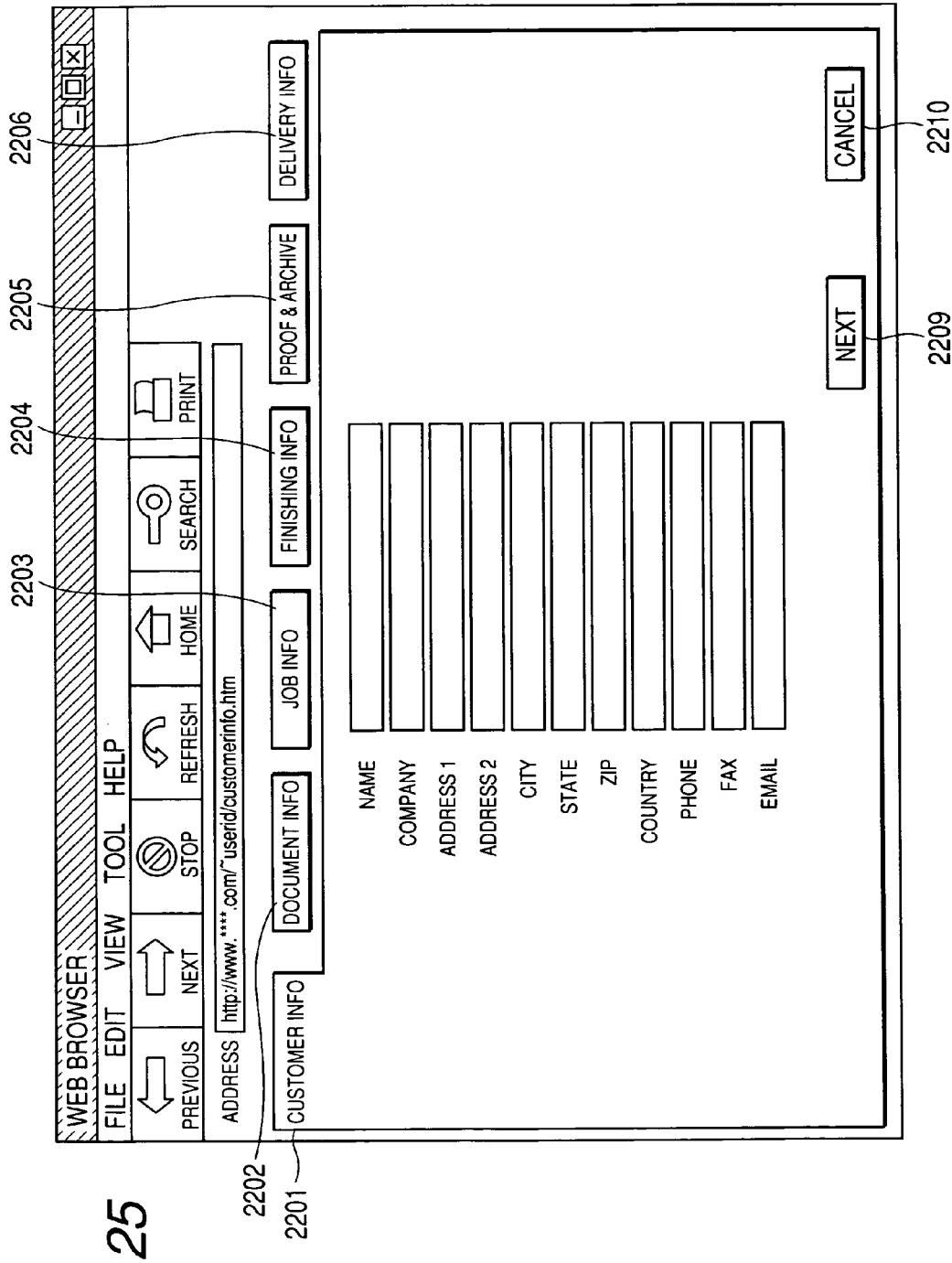
FIG. 25 shows an example of the job order receiving screen.
Figure 26:
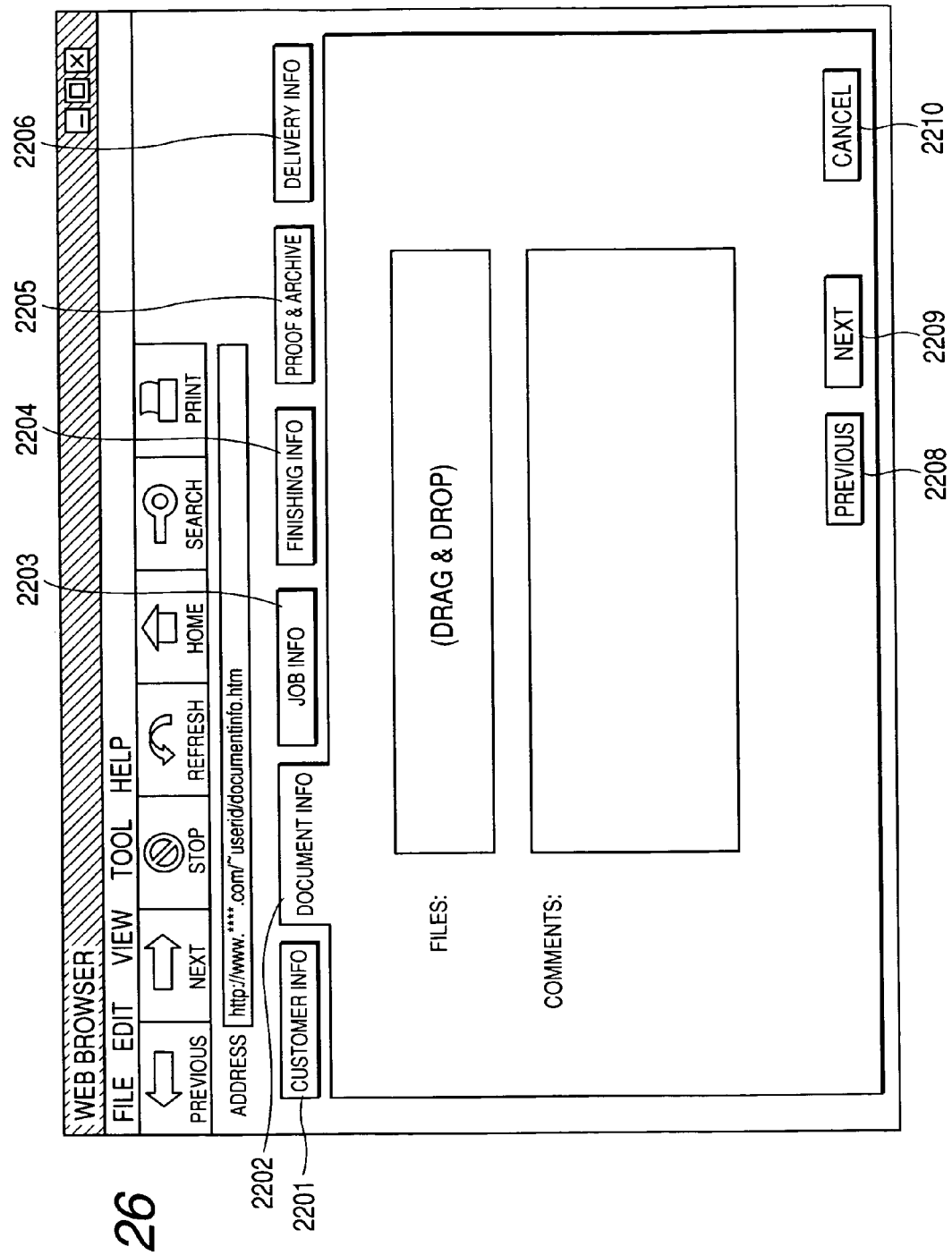
FIG. 26 shows an example of the job order receiving screen.

In FIGS. 24 through 31, the user can browse the web site as shown in FIG. 24, via the Internet, by the client computer 103 (step S201 and step S202 of FIG. 2). The user who is previously registered selects "Registered", inputs an ID number (in this case, the e-mail address) and the password, and points a "Next" key 2209. Thus, the order placing and order receiving through the web is possible, and then the processing shifts to the screen as shown in FIG. 26.

In a case of the user who newly visits the web site as shown in FIG. 24, by selecting "New" and pointing the "Next" key 2209, the processing shifts to an input screen as shown in FIG. 25.

In the input screen as shown in FIG. 25, the user inputs required items (the name, name of company, address, telephone number, facsimile number, e-mail address, and the like) to be registered (step S203 of FIG. 2). Note that reference numeral 2210 is the cancel key, which is pointed when browsing of the web site is ended. Here, an example in which the required items are simply inputted is mentioned, however, it is widely known to double-check or triple-check in order to improve the security, for example, when performing personal identification or opening an account.

Figure 27:
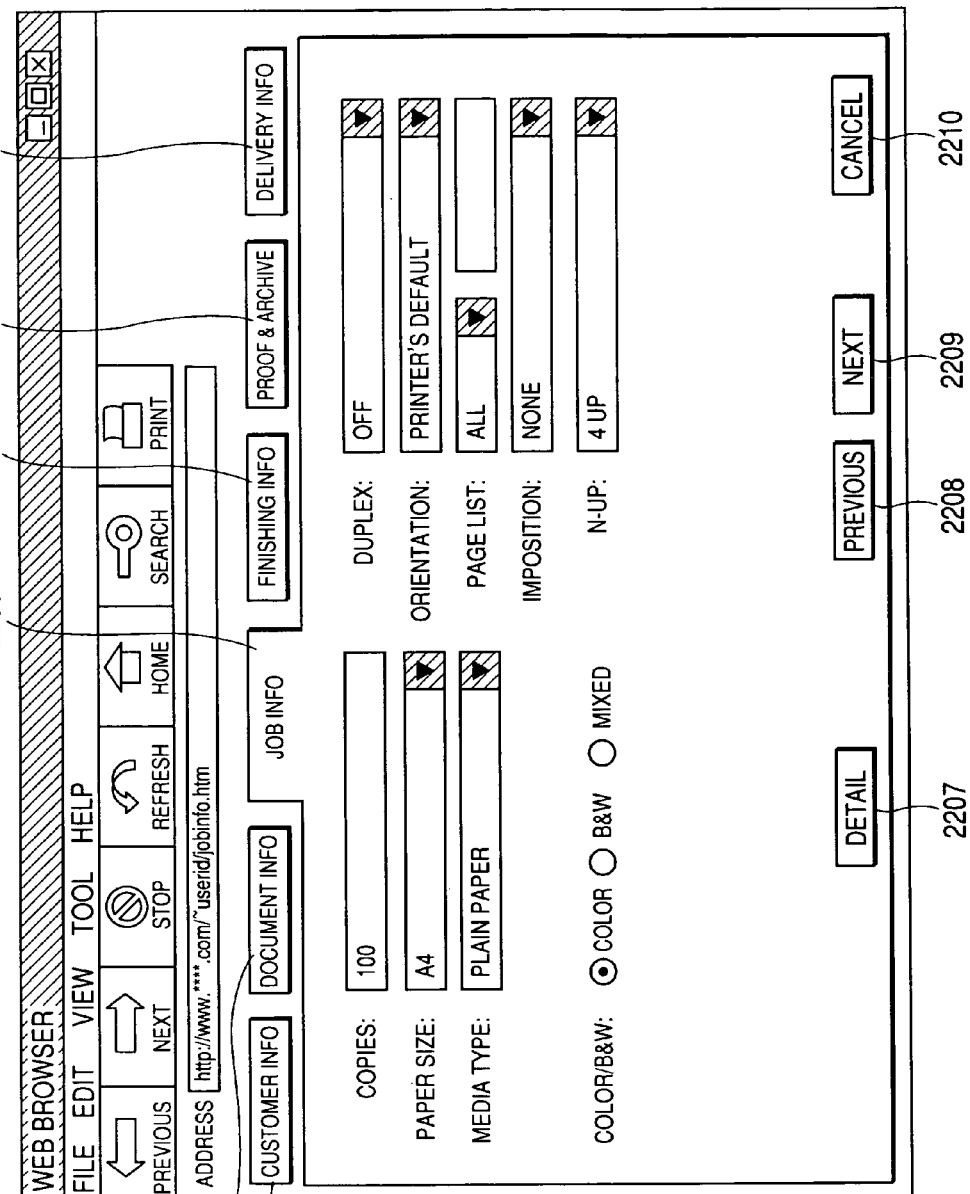
FIG. 27 shows an example of the job order receiving screen.

Next, in the screen as shown in FIG. 26, the user attaches electronic data which the user desires to print by dragging, dropping, and the like, inputs desired matters in a comment column as necessary, and points the "Next" key 2209 (step S204 of FIG. 2), so the processing shifts to the screen as shown in FIG. 27.

Figure 28:
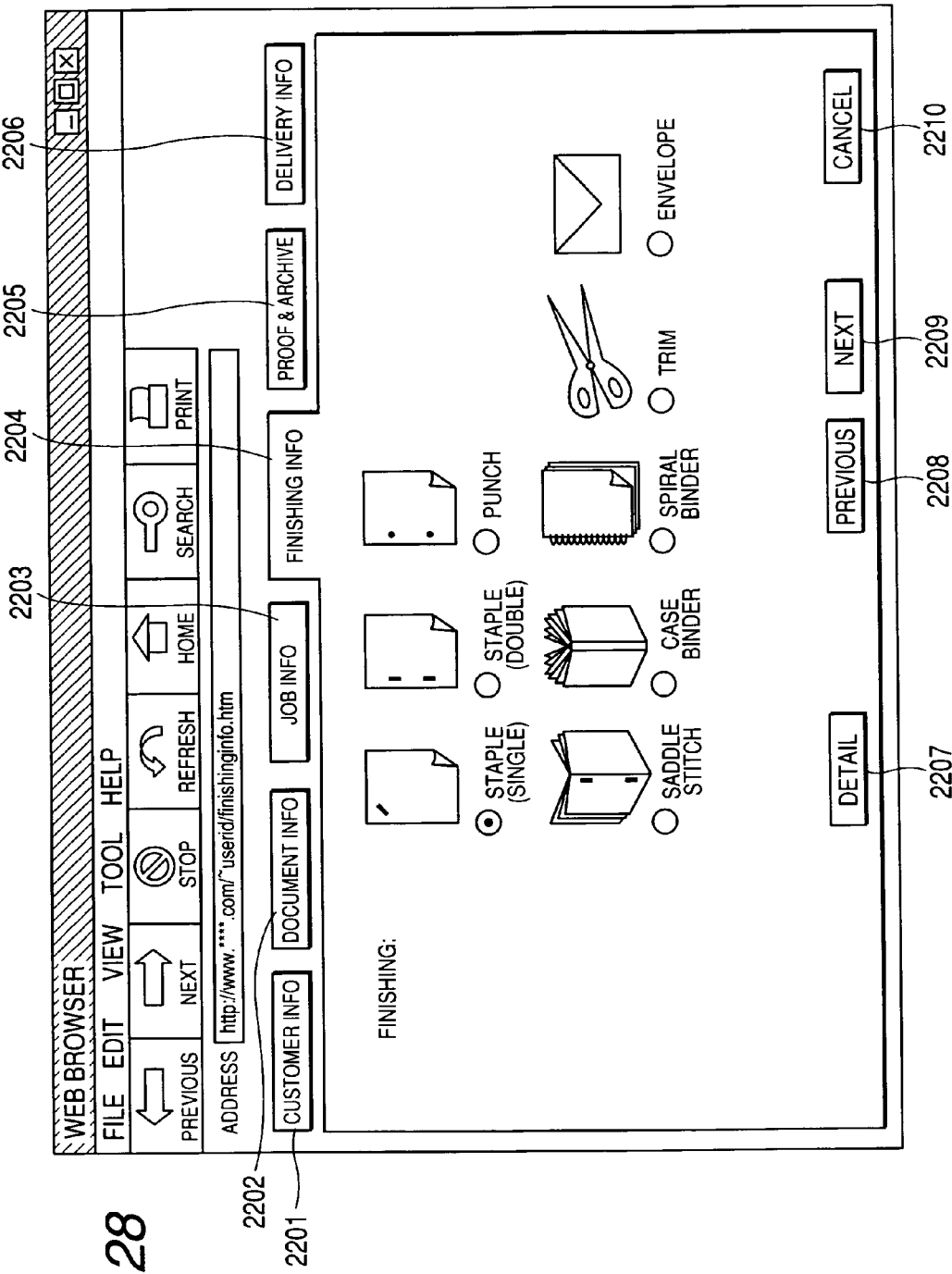
FIG. 28 shows an example of the job order receiving screen.

In the screen as shown in FIG. 27, the user inputs setting information of the job called job ticket (step S205 of FIG. 2) and points the "Next" key 2209, so the processing shifts to the screen as shown in FIG. 28.

In the screen as shown in FIG. 28, the user selects the finishing processing the user desires (step S206 of FIG. 2) and points the "Next" key 2209, so the processing shifts to the screen as shown in FIG. 29.

In the screen as shown in FIG. 29, the user selects a presence or absence of proof print 2220, inputs a necessary proof mode (the proofreading expression method), archive information, and the like (step S207 of FIG. 2), and points the "Next" key 2209, so the processing shifts to the screen as shown in FIG. 30. Note here that any one of or a plurality of proof mode can be selected from among a plurality of proofreading expression methods such as thumbnail 2221 on the web site, a PDF file 2222 on the ftp site, electronic mail transmission 2223 with the PDF file attached, mailing 2224 of the CD-ROM including the PDF file, and the like.

In the screen as shown in FIG. 30, the user inputs information on desired delivery time (step S208 of FIG. 2) and points the "Next" key 2209, so the processing shifts to the screen as shown in FIG. 31.

In the screen as shown in FIG. 31, an approximate cost is indicated, and the user can make the temporary order if the user approves the charge. Here, the approximate cost is computed in accordance with: a content of the job ticket such as whether the user is a new user or a valued customer, a job size, the number of copies, and the like; the method of finishing processing; the method and the number of the proof; information on archive and reprint; or the length of the time to delivery. The user can browse the approximate cost computed by approximate computation before making the temporary order, so it is possible to prevent troubles relating to the cost from occurring.

If the user is not satisfied in relation to the cost, by changing the setting by using each of the information tabs (a customer information tab 2201, a document information tab 2202, a job information tab 2203, a post-treatment information tab 2204, a proof and archive information tab 2205, and a delivery information tab 2206 of FIG. 25), a "Return" key 2208, the "Next" key 2209, and the like, it is possible to compute again the approximate cost.

In addition, the user can carry out a temporary order placing processing by pressing down (pointing) an "OK" key 2211 (Yes in step S209 of FIG. 2). Note that it is possible to perform changing of the setting of the job ticket even at the time of the proof, as described later.

In this way, with regard to the job received by the order receiving and original receiving manager 112, the information thereof is transmitted to the process control manager 111, and in response to this, the process control manager 111 starts the management of the job and issues the JDF data to the job.

<Confirmation of the Layout>

In the proof manager 114, as shown in FIGS. 32 through 36, a confirmation screen displaying a result of editing by the original editing manager 113 is provided to the user via the web server section 441 (steps S402 through S406 of FIG. 6).

FIGS. 32 through 36 are views each showing an example of the confirmation screen by the proof manager 114.

In FIGS. 32 through 36, in the confirmation screen, a switching button 2301 for switching between the page order and the print order, a page-by-page property (attribute setting) key 2302, a document-by-document property key 2303, and a job-by-job property key 2304 are prepared. Therefore, the paper size and a type of the medium can be changed, the number of disposition of N-up (reduction layout) and the order of disposition thereof can be determined, and the presence or absence of the finishing, a type of the finishing, and the like can be set on a page-by-page basis, a document-by-document basis, and a job-by-job basis.

In addition, if plural number of originals are inputted by the user, and even if they are of different types of applications and files, it is possible to display their thumbnail images on the confirmation screen document by document by dragging and dropping them.

Figure 32:
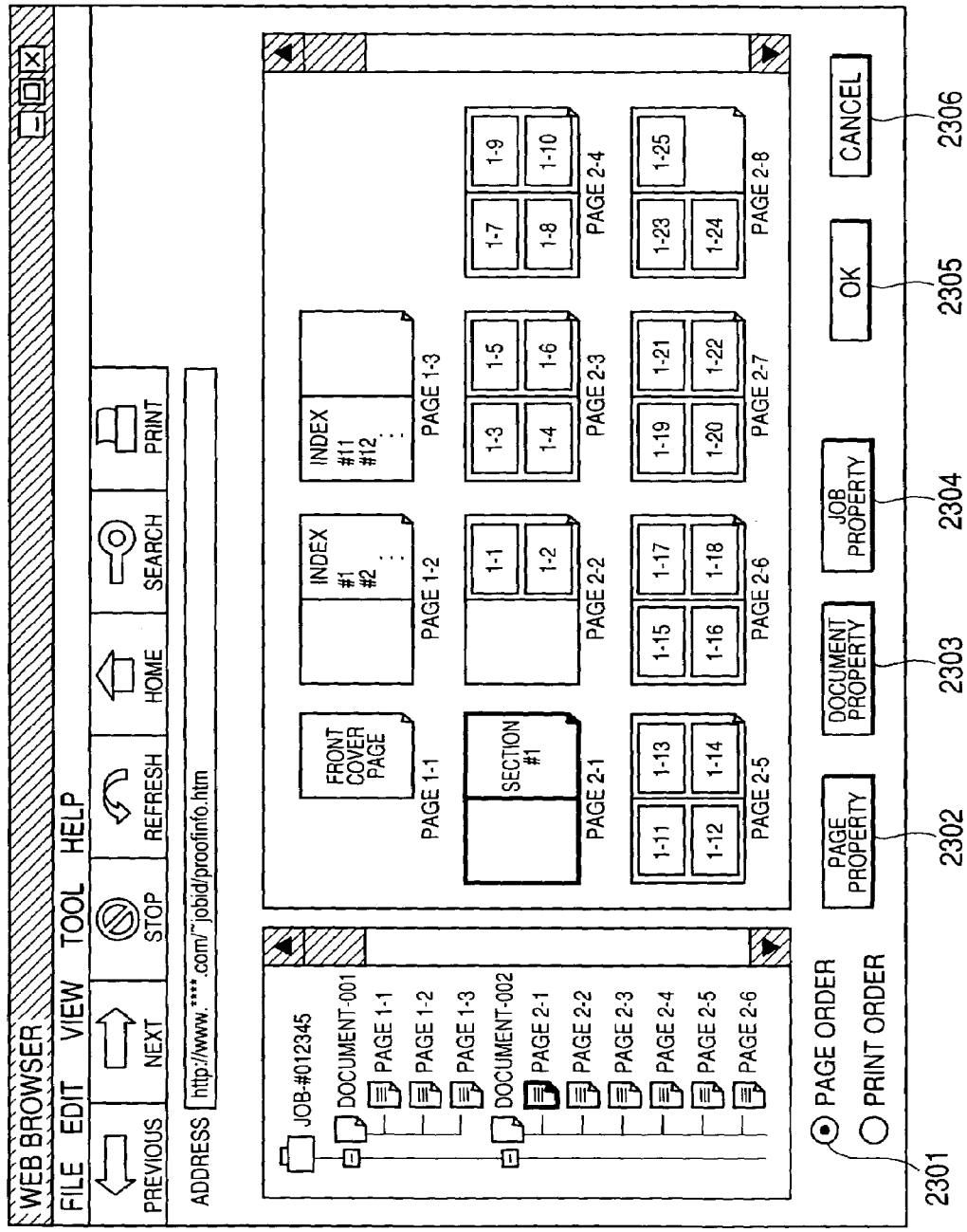
FIG. 32 shows an example of a confirmation screen provided by the proof manager.
Figure 33:
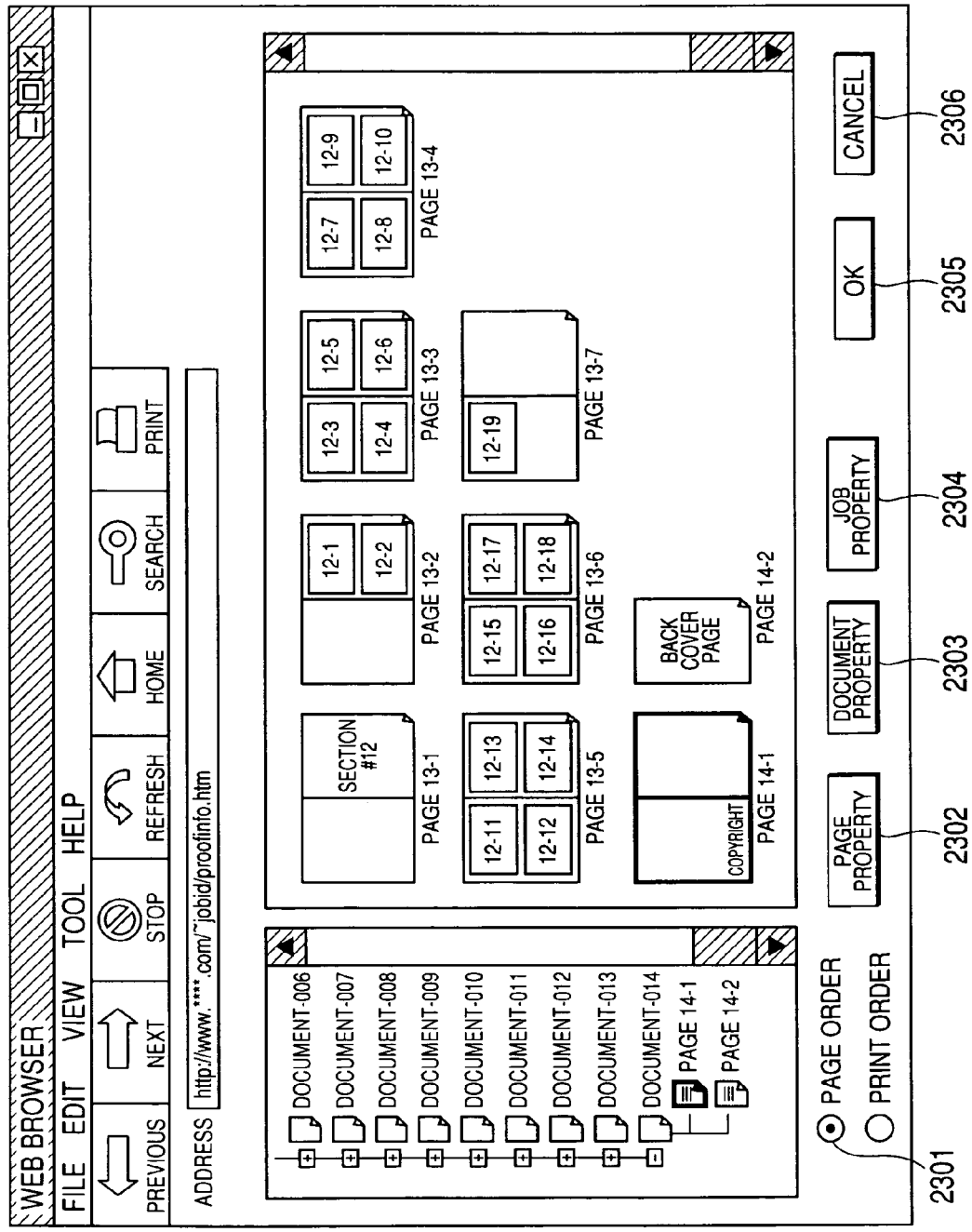
FIG. 33 shows an example of the confirmation screen.

For example, FIGS. 32 and 33 respectively correspond to an example in which the images are displayed in the page order. In these examples, a first chapter (Document-001) and a fourteenth chapter are disposed in "2 in 1", however, the others are disposed in "4 in 1". That is, the number of disposition is different chapter by chapter (document by document) in the examples.

Figure 34:
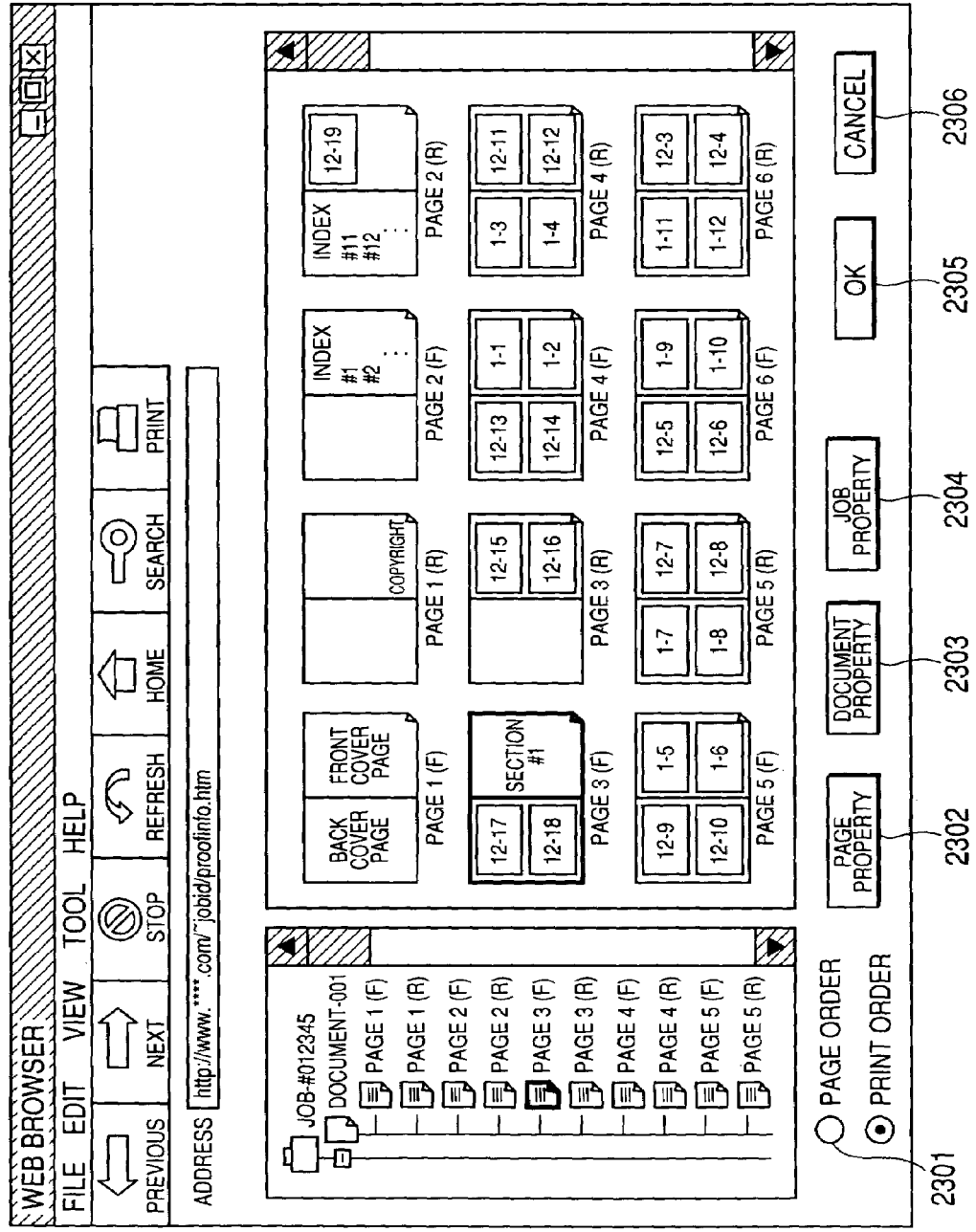
FIG. 34 shows an example of the confirmation screen.

In addition, FIG. 34 corresponds to an example in which the images are displayed in the print order by switching the switching button 2301 between the page order and the print order. In this example, a print disposition in a case where the saddle stitch bookbinding is carried out (binding in the booklet) can be browsed.

Figure 35:
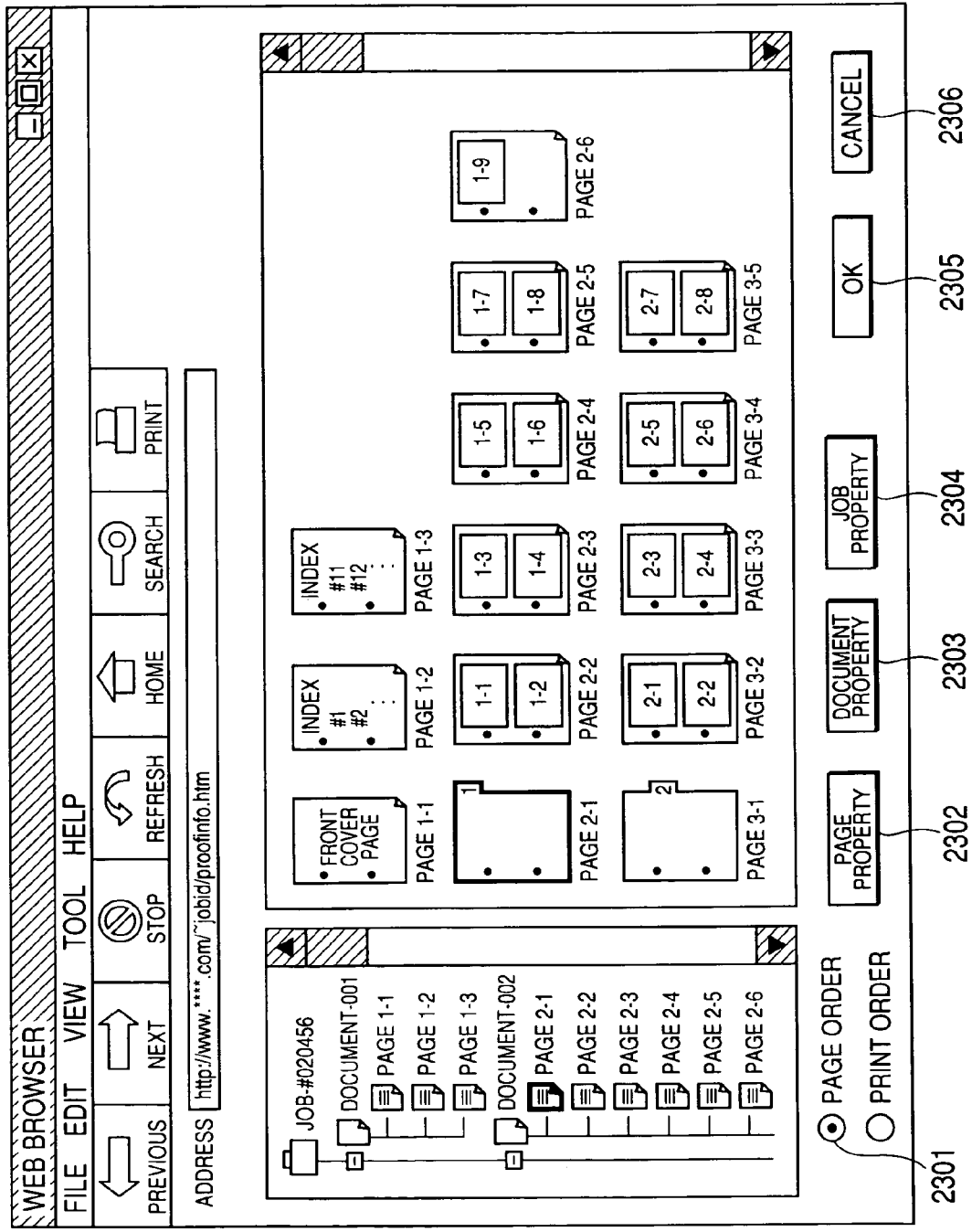
FIG. 35 shows an example of the confirmation screen.

In addition, FIG. 35 corresponds to an example in a case where the medium is changed page by page utilizing the tab paper. As shown in this example, it is possible to confirm the position of the holes on the thumbnail images even when the punching (hole making) processing is instructed at the same time.

Figure 36:
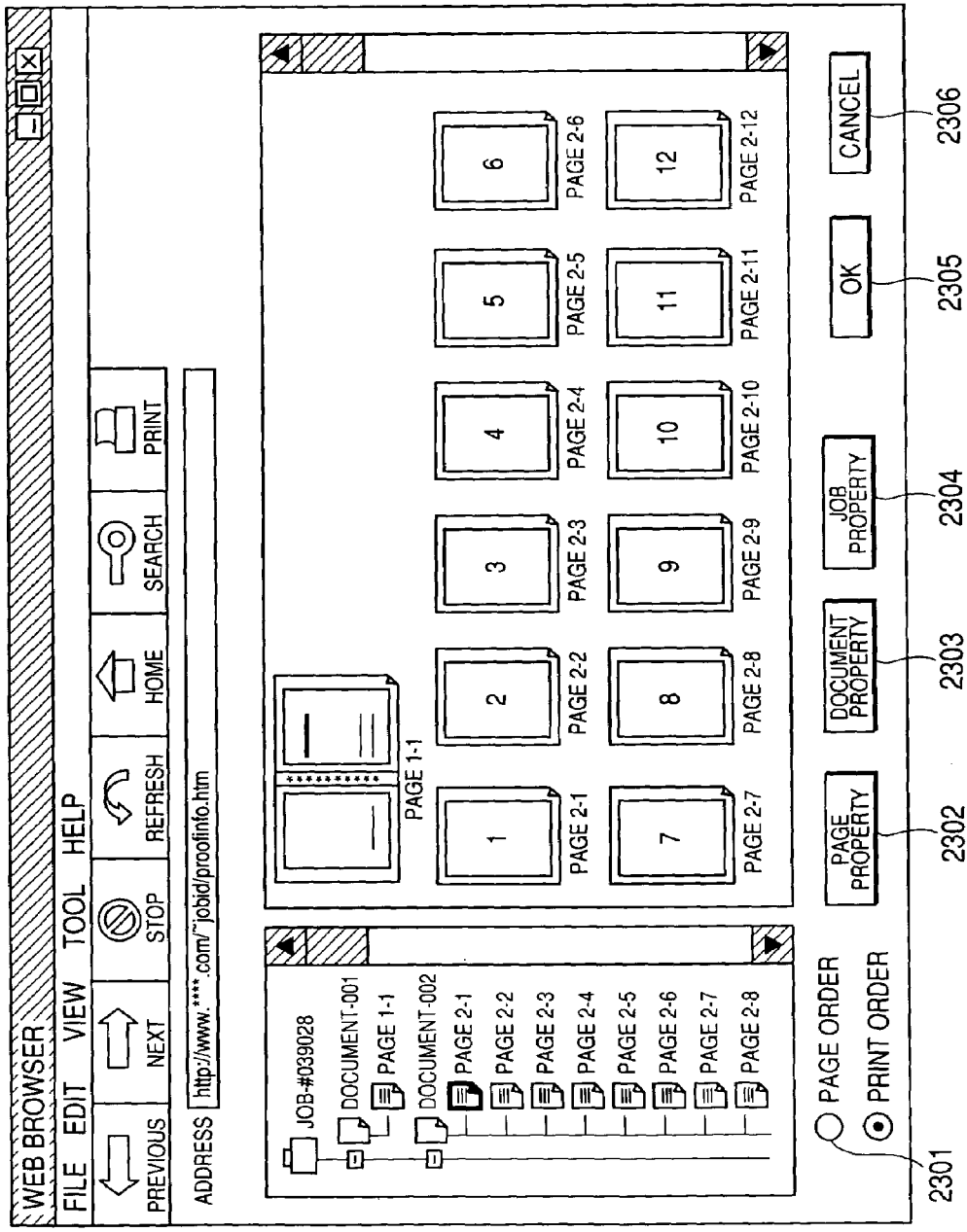
FIG. 36 shows an example of the confirmation screen.

In addition, FIG. 36 corresponds to an example of a case where the documents are case-bound. In this example, it can be confirmed that the paper of a size larger than the paper sheets of the body of the book, by the size of a book cover, is used for the front cover.

Note that the display windows of the confirmation screen as shown in FIGS. 32 through 36 are configured by a folder screen indicating a file structure and the thumbnail image, and it is possible to enlarge a page-by-page display of the preview images displayed on a page-by-page basis, when one page of the thumbnail image is double-clicked.

In the confirmation screens as shown in FIGS. 32 through 36 or in the display screen (not shown) of the PDF file (the PDF file downloaded from the web server section 441), the user confirms the proof and determines whether the confirmation of the proof is OK or not (step S408 of FIG. 6). If the user determines that the confirmation of the proof is OK, the user transmits the electronic mail describing that the proof is OK (that the shift to the printing process is instructed) (to a prescribed address allotted to the proof manager 114, address of the person in charge, and the like) (step S410 of FIG. 6).

On the other hand, if the user determines that the confirmation of the proof is not OK (NG), the user transmits the electronic mail describing that the proof is NG (that the processing is not shifted to the printing process and the revision of the proofreading is instructed) and in which the NG points of the proof and the comments are inputted (steps S409 and S410 of FIG. 6).

The proof manager 114, in response to the electronic mail, if the result of confirmation of the proof is OK (if the shift to the printing process is instructed) (Yes in step S432 of FIG. 6), the processing is ended and proceeds to the printing process. On the other hand, if the result of confirmation of the proof is NG (if the processing is not shifted to the printing process and the revision of the proofreading is instructed) (No in step S432 of FIG. 6), the operator on the side of the image forming system retries the processings such as the original editing processing, document processing, and proof printing (step S433 of FIG. 6), in accordance with the comments on the NG points by the user.

Hereafter, the process managed by the process control manager 111 is explained. Here, the explanation is made focusing on a print job.

<Print Job>

FIGS. 37 through 40 are views each showing a printing process management screen provided by the print manager 115.

Figure 37:
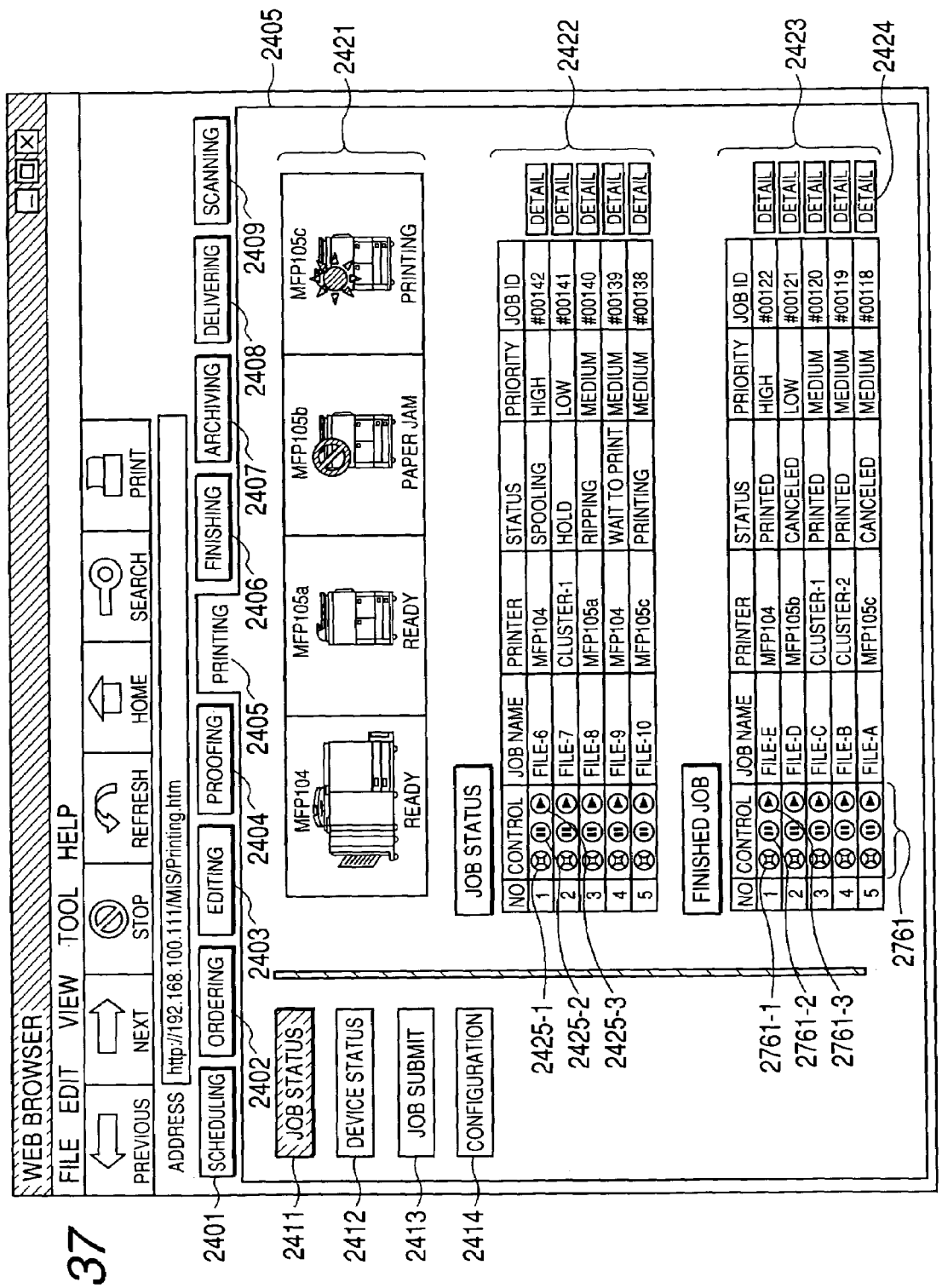
FIG. 37 shows a printing process management screen provided by a print manager.
Figure 38:
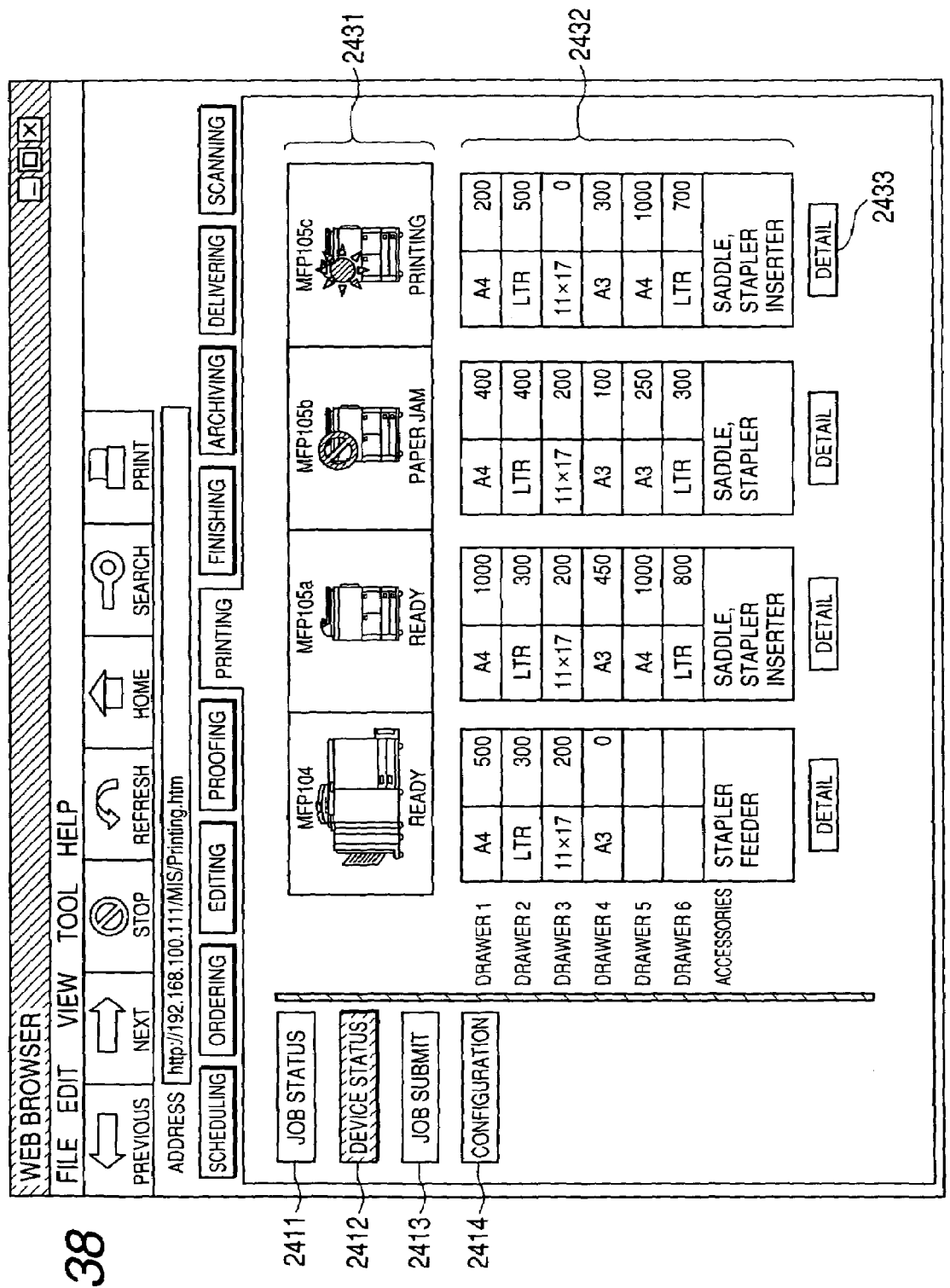
FIG. 38 shows the printing process management screen.
Figure 39:
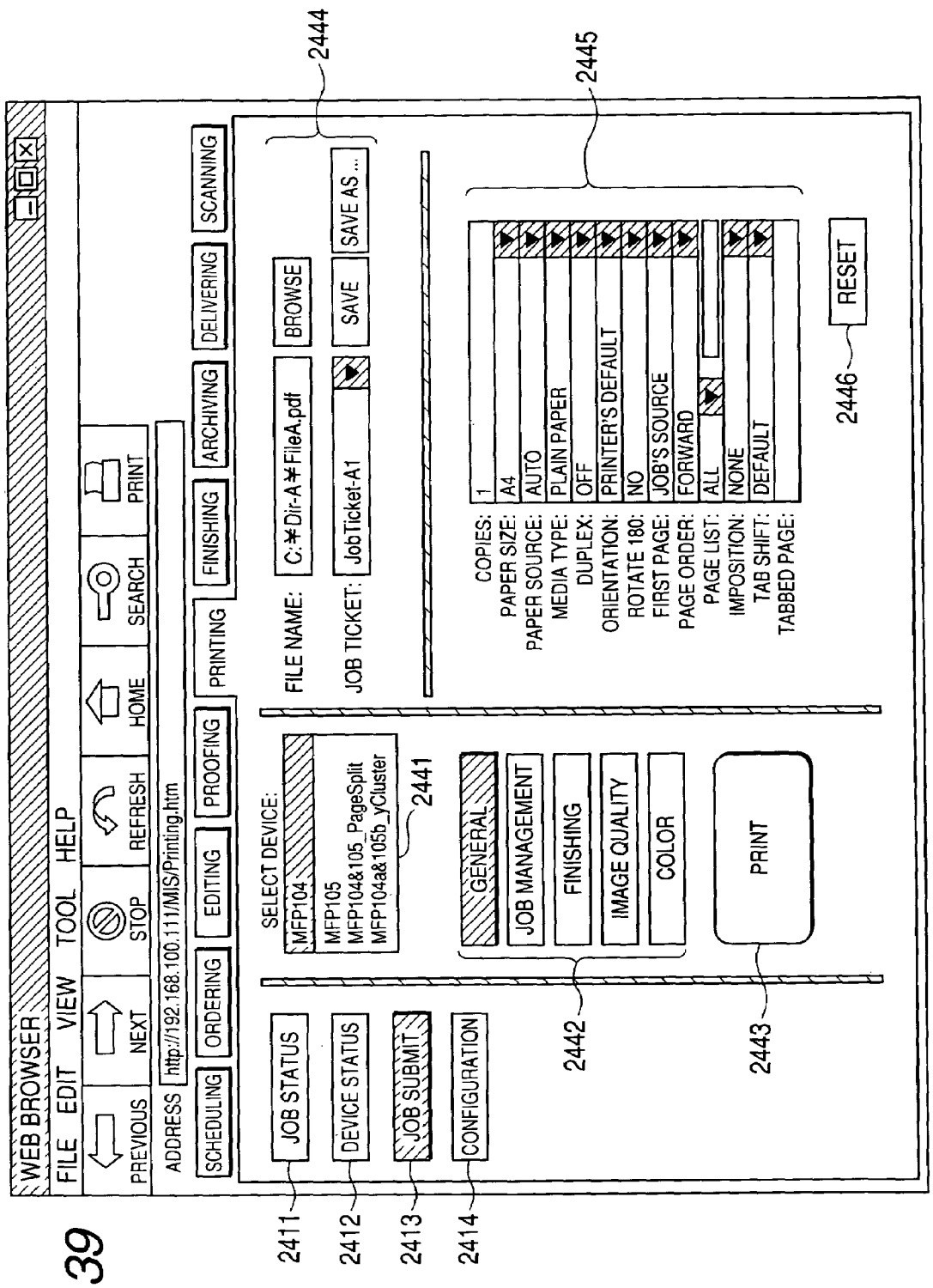
FIG. 39 shows the printing process management screen.
Figure 40:
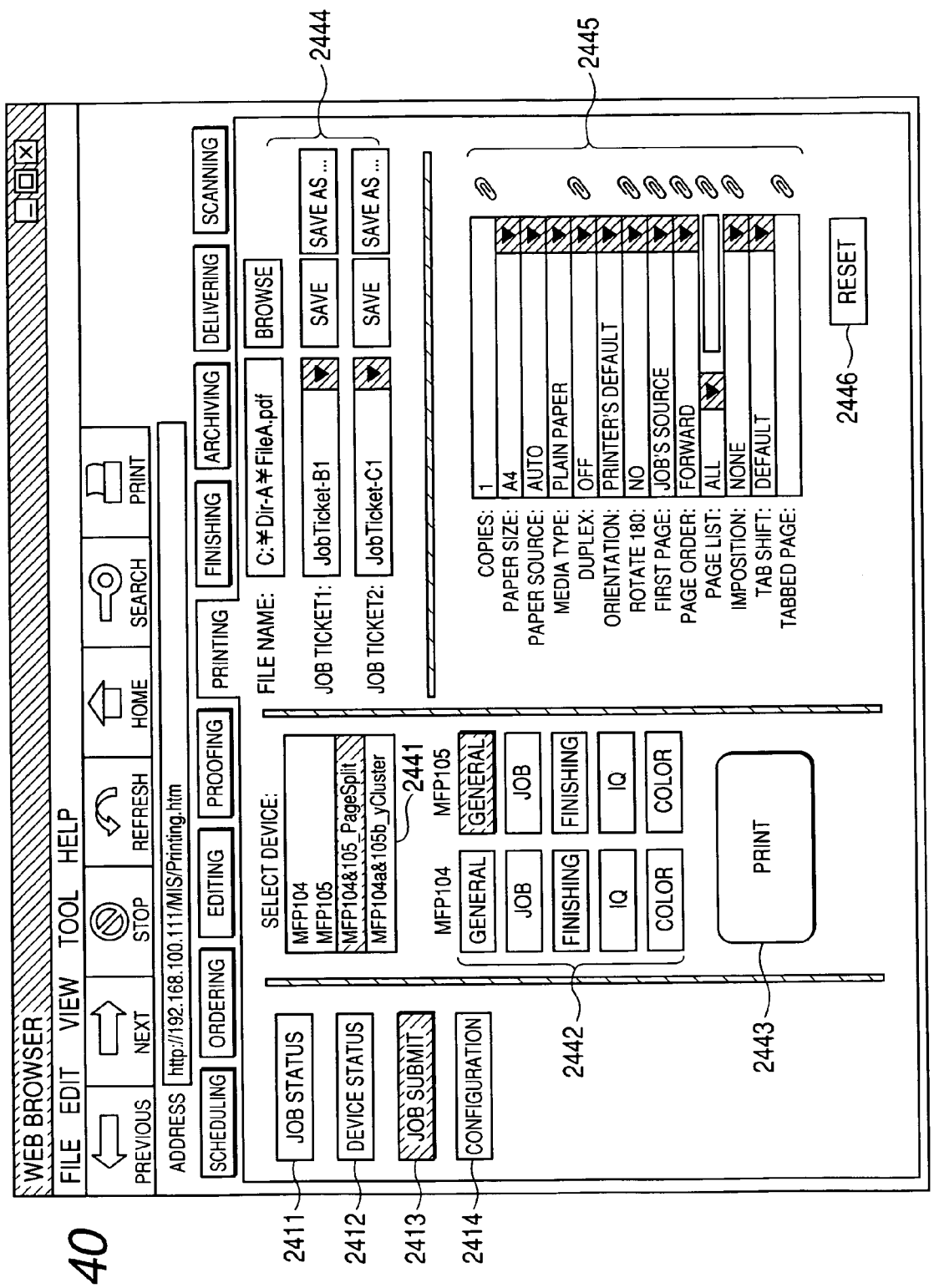
FIG. 40 shows the printing process management screen.

FIG. 37 shows a job status screen in the printing process, FIG. 38 shows a device status screen in the printing process, and FIGS. 39 and 40 each show job submit screens in the printing process.

Note that the setting is previously performed so that the service screen is read when the user inputs an IP address (here, for example, "192.168.100.11" is used; a server name may be used instead of the IP address in an environment in which domain name system (DNS) is supported) of the web server on the side of the process control manager 111 in a URL address section of the web browser on the client computer 103.

In FIG. 37, for this service tool (the service screen): a scheduling tab 2401 for making a schedule between each of the managers; an ordering tab 2402 for confirming a state of order receiving by the order receiving/original receiving manager; an editing tab 2403 for editing the original; a proofing tab 2404 for managing an approval state of the proof by the customer by the proof manager 114; and the like, are prepared. In addition, for the service tool; a printing tab 2405 for managing the print job and inputting the print job; a finishing tab 2406 for managing the post-treatment process by the post-treating manager 116; an archiving tab 2.407 for managing the archiving status of the job by the file archiving manager 117; and the like, are prepared. In addition, for the service tool, a delivery tab 2408 for managing a delivery slip and status of delivery by the delivery and dispatch manager 118; a scan tab 2409 for managing a scan job by the scan manager 119; and the like, are prepared.

When the user selects the printing tab 2405, the web server (It may be the same as the web server on the side of the process control manager 111) on the side of the print manager 115 is accessed and a job status screen in the printing process as shown in FIG. 37 is read.

In printing process management screens (service screens in which the printing tab 2405 is selected) as shown in FIGS. 37 through 40, there are provided: a job status key 2411 for managing the job; a device status key 2412 for controlling the MFP 104 and the MFP 105; a job submit key 2413 for controlling the input of the print job; a configuration key 2414 for performing various settings such as registration of the printer and the cluster printer; and the like.

FIG. 37 shows the screen corresponding to a case in which the job status key 2411 is selected, FIG. 38 shows the screen corresponding to a case in which the device status key 2412 is selected, and FIGS. 39 and 40 show cases in which the job submit key 2413 is selected.

First, in the job status screen as shown in FIG. 37, reference numeral 2421 is a device display section. In the device display section 2421, a device name of the MFP and the like on the network and a device icon (the icon changes in accordance with the status) are displayed. Further, characters expressing the status (Ready, Paper Jam, Printing, and the like) are displayed in the job status screen as shown in FIG. 37.

Next, reference numeral 2422 is a job status display section. The job status display section 2422 is capable of monitoring the status of each job within the server. The job status is expressed in the characters such as "Spooling" (receiving of the data before RIP processing is being executed), "Ripping" (RIP processing is being executed), "Wait to Print" (print waiting state), or "Printing" (printing is being executed). In addition, the job which is previously instructed in the server to wait at the time of input of the job is held as "Hold" in a state before being subjected to the RIP processing. If an error or jam occurs, the occurrence is displayed to inform the user. After the printing, the job is transferred to a next job history (Finished Job).

With regard to the status of each network device, a countermeasure is taken such that the server issues an inquiry for each predetermined period and that each network device notifies the server when the status of the network device is changed. Both or either one of the countermeasures may be taken.

Besides, reference numeral 2423 is a job history display section. By means of the job history display section 2423, the job history can be browsed. In the job history display section 2423, the message "Printed" is displayed when the job is normally finished, and if the job is cancelled halfway, the message "Cancelled" is displayed.

Further, in the job status display section 2422 and the job history display section 2423, reference numeral 2424 denotes a detail key. By clicking the detail key 2424 (by pointing by a pointing device (not shown) or the like), a detailed status of the job being executed or the finished job can be grasped. In addition, when the detail key 2424 is clicked: a job name; a target printer; a job status; a job priority; a job ID; a client name; the number of pages; the number of copies to make; the paper size; an estimated time to be outputted; a comment including demands from the client to the user; or the like, are displayed. However, the estimated time to be outputted is merely an estimated time, and the estimated time is computed by a current spool order, RIP estimated time, a printing speed of the printer, or the like.

Further, in the job status display section 2422, reference numeral 2425 denotes a control key. The control key 2425 can be controlled only by a person authorized for each of the jobs (for example, an administrator). The control key 2425 is the key for instructing, starting from the left; a cancellation of the job 2425-1; a suspension of the job (the job is paused or held) 2425-2; a restart of the job (release of the paused job or the held job) 2425-3; and the like.

Besides, in the job history display section 2423, reference numeral 2761 denotes a control key. The control key 2761 is capable of controlling the job in the job history display section 2424. The control key 2761 is the key for instructing, starting from the left: an archiving of the job (a function for archiving the job in another place on the network) 2761-1; a deletion of the job 2761-2; a reprinting of the job (reprint job) 2761-2; and the like. On the basis of the instructions, the user can handle the server.

In a network interface portion in the printer devices such as the MFP 104, the MFP 105, and the like, a standardized database called Management Information Base (MIB) is constructed. Via a network management protocol called simple network management protocol (SNMP), it is possible to communicate with the client computer 103 or the like on the network and to replace necessary information on, for example, the state of the printer devices connected to the network, such as the MFP 104 and the MFP 105.

It is possible, for example, to determine which finisher having what function is connected as equipment information of the MFP 104 and the MFP 105, or to determine whether the error or the jam is occurring or not, whether the printing is being performed or not, or whether the idling is performed or not, as status information. It is possible, for example, to obtain various types of static information such as: the equipment information of the printer device such as the MFP 104 and the MFP 105; the state of the device; the setting of the network; details of the job; and management and control of the use status. The print manager 115 takes in the status of the printer device such as the MFP 104 and the MFP 105 by utilizing the MIB and updates the status as an HTML file, thereby making it possible to browse the status from the client computer 103 at any time.

When the user clicks (points by a pointing device (not shown) or the like) the device status key 2412, the device status screen as shown in FIG. 38 is displayed. In the status screen as shown in FIG. 38, it is possible to confirm, by the device status display section 2423, the paper size of the paper sheet mounted in each of the printer devices and the replenishment status of the paper sheet (remaining amount of the paper sheet in each paper sheet stacker or the cassette) and to confirm in advance an accessory status of the finisher and the like equipped to each of the printer devices. However, the remaining amount of the paper sheet is determined by a dedicated sensor. It is difficult to detect the remaining amount of the paper sheet with an accuracy of one sheet of the paper, and accordingly, the minimum detection unit is about ten sheets, for example. However, if there is no paper sheet mounted, the absence of paper sheet can be reliably detected.

Reference numeral 2433 denotes a detail key. When the detail key 2433 is clicked (pointed by a pointing device (not shown) and the like), the detailed status of the printer device (for example, color/monochromatic, the resolution, the printing speed, and the like) is displayed.

In addition, when the job submit key 2414 is clicked (pointed by a pointing device (not shown) and the like), the job submit screen as shown in FIG. 39 is displayed. The method of using the job submit screen is the same as that of using the printer driver mentioned above, however, the job submit screen is a screen for inputting (transferring or copying a document file to be printed with additional information appended) the file on the client computer 103 directly to the print manager 115, not by opening the file by the application (not by instructing to print by means of the application).

In an ordinary case, the printer driver has two roles. That is, one of the roles is to activate the data by means of the application on the client computer 103 and to convert the data into the PDL data such as Post Script (or PCL) and the like. The other role is to input the converted data into the print manager 115 (or the printer). This is because a conventional RIP processing is capable of performing only one kind of RIP processing.

In contrast, the job submit has only a role of inputting the job together with the job ticket by using the GUI. In recent years, one capable of performing the RIP processing to the data of various types of formats (such as pdf, tiff, and jpg), as well as the PS, with the same software RIP module has appeared.

In addition, by providing a plurality of types of the software RIP module (for example, the PS and the PCL) in the print manager 115, it becomes possible to use the RIP modules by switching between one RIP module to the other in accordance with the type of the data. As a result, it becomes possible to develop the data of the various types of formats (such as pdf, tiff and jpg) and the various types of PDL data, not merely one type of the PDL data, into bitmap data even when the various types of data is directly sent to the print manager 115.

In addition, if the printer device such as the MFP 104 and the MFP 105 is the printer device with a function of RIP processing in which the PS data only, not the bitmap data, is handled, for reasons of the interface, it is possible to handle the data of the various types of formats. For example, the print manager 115 performs image compression on the data developed into the bitmap data in JBIG and G4 (CCITT). After that, a header such as PS (the header indicating that the data is the PS data) and the like to the compressed data, and the data with the header is outputted to the printer device. Therefore, printing of the various types of formats can be implemented by various types of printer devices.

As a setting items appended in the job submit, reference numeral 2441 denotes a transmission destination selection column for selecting an output destination which is a target. In general, it is possible to set a cluster printer obtained by virtually combining the MFP 104, the MFP 105, or a plurality of printer devices, by the transmission destination selection column 2441. Note that when the cluster printer is selected by the transmission destination selection column 2441, the GUI of a setting item switching key 2442 is changed so that each of the printer devices is set as shown in FIG. 40.

Reference numeral 2444 denotes a column for selecting a file. A file name may be directly instructed together with the directory by the column 2444. In general, a job file existing in the computer of the server itself (or in the network) is selected by the browse button on the right side of the file name.

By performing the above setting and by clicking a print key 2443, a content of the setting and the designated file are transferred to the print manager 115 and are added (queued) as a printing job.

In addition, a setting item sent together with the selected file is called the job ticket. The job ticket includes items as indicated by reference numeral 2445.

Note that in FIGS. 39 and 40, the setting items in a general setting (General) are displayed. When a classification (general setting, job management, finishing, image processing setting, and color setting) of the setting items is switched by the setting item switching key 2442, the setting items (the setting items such as job management, finishing, image processing setting, color setting) of a different classification as shown in FIGS. 41 through 44 are displayed. When each of the setting items is set, the set setting items are transmitted as the job ticket to the print manager 115 together with the image data and are utilized for the RIP processing, the printing processing, the post-treatment, and the like.

In this embodiment, with regard to detailed setting items of the job ticket of each classification, there are some classifications as described below, for example, so it is possible to perform various types of setting.

(1) General setting (General): a number of copies to make, a paper size, a paper feed stage, type of medium, presence or absence of both-side printing, and the like (reference numeral 2445 in FIGS. 39 and 40)

Figure 41:
FIG. 41 shows an example of a job control setting item.

(2) Job Management: priority order of the job, presence or absence of job saving, and the like (FIG. 41)

Figure 42:
FIG. 42 shows an example of a finishing setting item.

(3) Finishing: stapling, punching, booklet, and the like (FIG. 42)

Figure 43:
FIG. 43 shows an example of an image processing item.

(4) Image Processing setting (Image Quality=IQ): sharpness, brightness, toner reduction setting, and the like (FIG. 43)

Figure 44:
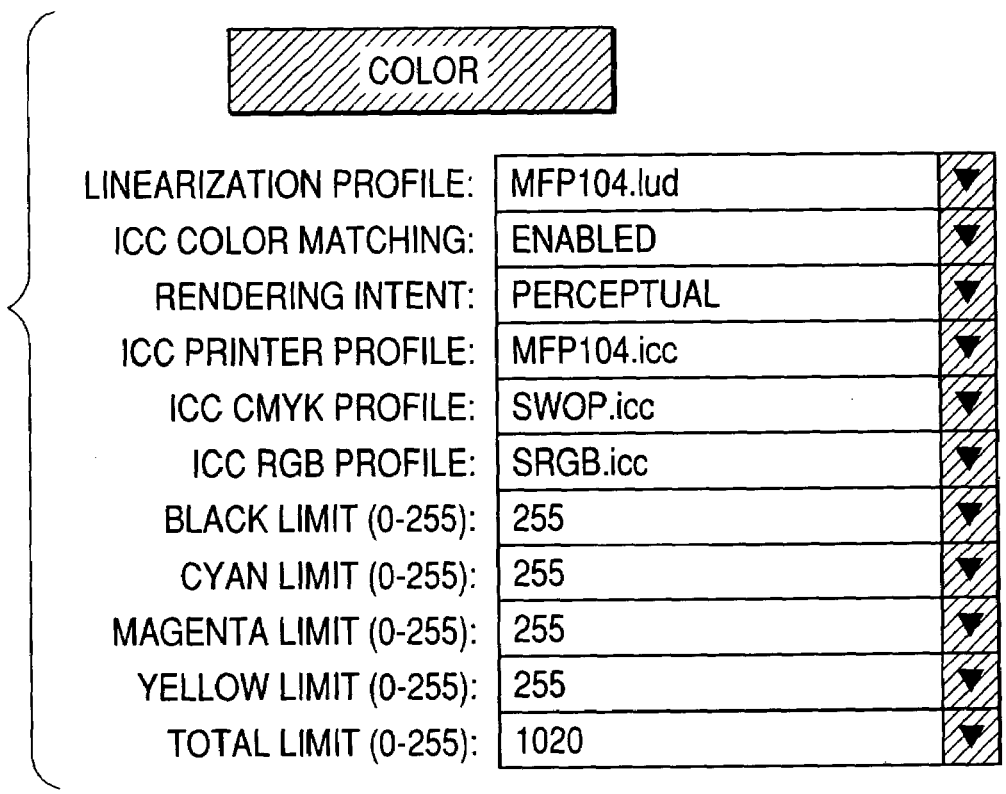
FIG. 44 shows an example of a color setting item.

(5) Color setting (Color): setting of a gamma conversion table, setting of the ICC profile, and the like (FIG. 44)

Besides, the detailed setting items (1) through (5) of the job ticket mentioned above can be set for each printer when printing is performed by combining a plurality of printer devices as shown in FIG. 40.

Further, the job ticket includes the setting items unique to each device and also has an advantage in that it is possible to carry out the operation smoothly if previously prepared. Accordingly, a group of keys 2444 including: a job ticket call key; a save key for storing the job ticket which is arbitrarily set (in order to reuse the job ticket); a save as key for saving the job ticket as a new job ticket; and a delete key for deleting the job ticket (not shown) is prepared. Note that the group of keys 2444 is provided with a file name inputting area, a browse key, and the like for selecting the print file from the computer of the user own or from the network accessible by the user.

In addition, a job ticket reset key 2446 is prepared so that the setting of the job ticket can be returned to the default setting.

<Print Job Processing>

Figure 45B:
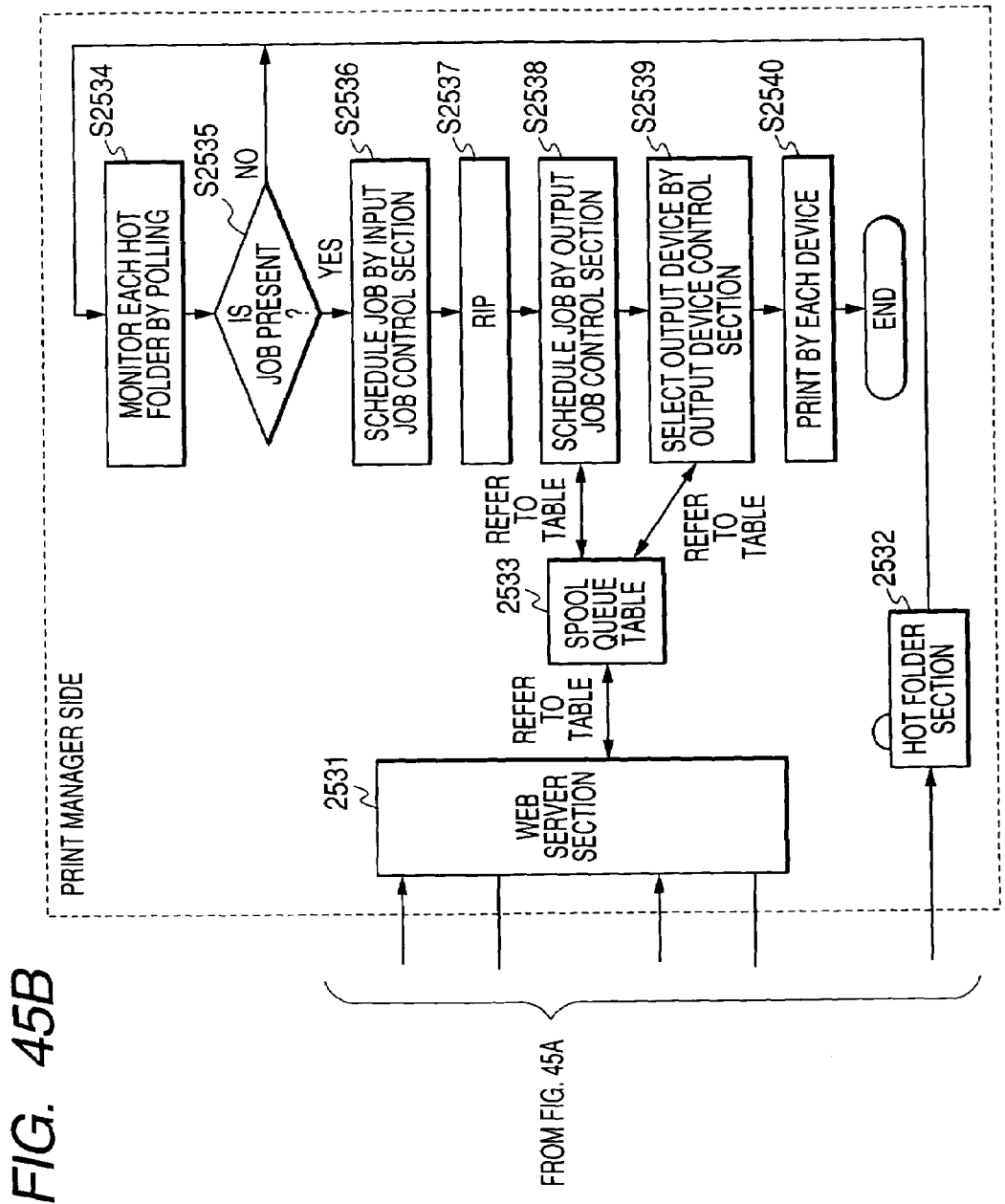
FIG. 45, which is composed of FIGS. 45A and 45B, is a flow chart showing a processing of a print job inputted to the print manager by the operation through a job submit screen.
Figure 46:
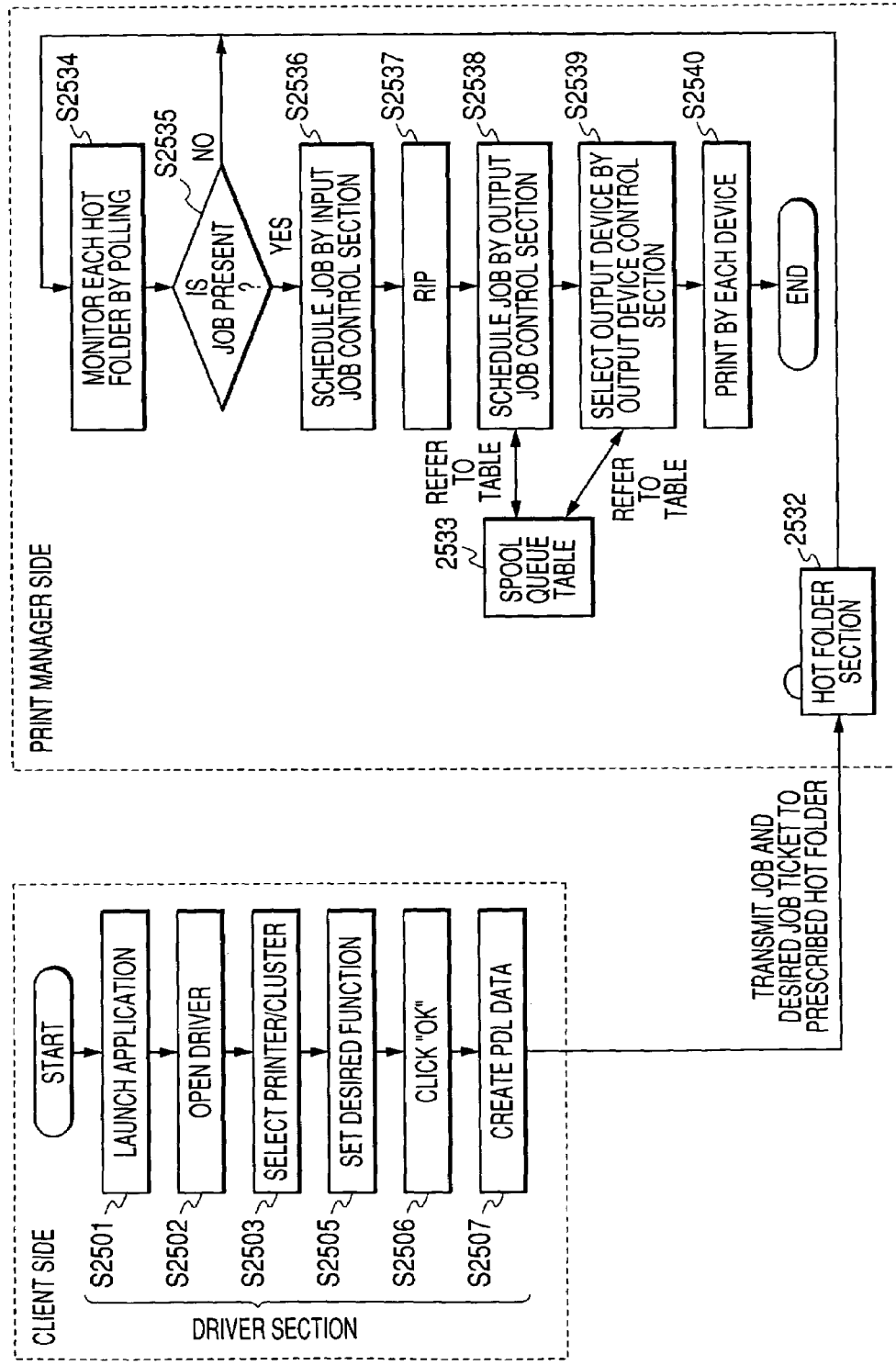
FIG. 46 is a flow chart showing a processing of a print job inputted to the print manager by the operation through a printer driver screen.

Next, the processing of job submit and the print job inputted to the print manager 115 from the printer driver are explained with reference to the flow chart as shown in FIGS. 45 and 46.

FIG. 45, which is composed of FIGS. 45A and 45B, is a flow chart showing the processing of the print job inputted to the print manager 115 by the operation from the job submit screens as shown in FIGS. 39 and 40.

In FIG. 45, steps S2508 through S2514 each indicate an operation step taken by the user on the web browser (job submit screen) on the side of the client computer 103, and steps S2534 through S2540 each indicate control processing step on the side of the print manager 115.

The client computer 103, in inputting the file to the print manager 115 form the job submit as shown in FIGS. 39 and 40, first, accesses to an web server section 2531 existing on the side of the print manager 115 by the web browser (step S2508).

To describe this in more detail, the user launches the web browser on the client computer 103, inputs the URL address on the web browser, accesses the web server section 2531 on the side of the print manager 115, and thereby opens the job submit screen (the job submit screen as shown in FIG. 39) (step S2509). Note that the access to the web server section 2531 is carried out by selecting the printing tab 2405 (refer to FIG. 37) and further selecting the job submit key 2413 on the service screen provided by the web server-on the side of the process control manager 111.

Next, the user selects a desired print file from the print file existing on the client computer 103 or on the network accessible by the user (step S2510). The file selected at this time, if it is possible to rasterize (RIP) the server, may not necessarily be the PS file, and may be the PCL file, TIFF file, JPEG file, PDF file, and the like.

Further, the user selects the printer or the cluster printer to which the user desires to output the file, on the web browser (step S2511). A selected printer name or the selected cluster name is immediately notified to the print manager 115. In accordance with this, the web page including the default (or desired) job ticket prepared in advance on the side of the print manager 115 and a hot folder name, is notified to the client computer 103, and the web page is displayed on the web browser (step S2512).

Next, the user changes the job ticket on the browser to the desired setting value at which the printing is desired to be carried out (step S2513). When the user clicks (points by the pointing device and the like (not shown)) the print key 2443, the selected job and the desired job ticket are transmitted to a hot folder section 2532 on the side of the print manager 115 (submission of the print job) (step S2514).

At this time, on the side of the print manager 115, a received job file (here, the job file of the PDL file and the job file of an application file are collectively referred to as the job file) and job setting information (job ticket) are separately managed by separate and different extensions and the like, for example.

In addition, on the side of the print manager 115, a plurality of hot folders are monitored by sequential polling (step S2534). If the job is present in the hot folder section 2532 (Yes in step S2535), the job is transferred to the input job control section 602 (step S2536). In the input job control section 602, RIP is performed as shown in FIGS. 7 and 11 (step S2537). Further, a spool queue table 2533 of the desired printer (or the cluster printer) selected by the user is referred to (step S2538 and step S2539), and printing is performed by the output device registered thereto (the print data is transmitted to each of the output devices) (step S2540).

FIG. 46 is a flow chart showing the processing of the print job inputted to the print manager 115 by the operation from the printer driver screens as shown in FIGS. 8 through 10.

In FIG. 46, steps S2501 through S2507 each indicate an operation step taken by the user on the printer driver screen on the side of the client computer 103, and steps S2534 through S2540 each indicate a control processing step on the side of the print manager 115. The step which is the same as that in FIG. 45 is provided with a same step number.

The client computer 103, in inputting the file to the print manager 115 from the printer driver, first, issues the print instruction from the application software (for example, a word processor software) operable on the client computer 103, and as a result, the job is inputted form the printer driver. To explain this in more detailed manner, the user launches the application software on the client computer 103 (step S2501), opens the file to be printed, and issues the print instruction (opens the printer driver screen as shown in FIG. 8) (step S2502).

Next, the user selects the printer or the cluster printer (step S2503) and sets the desired function by utilizing the property and the like (step S2505). When the user clicks (points by the pointing device and the like (not shown)) the OK button 705 (FIG. 8) (step S2506), creation of the PDL data is started in the client computer 103 (step S2507).

When the PDL data is obtained in the client computer 103, the PDL data is immediately sent to the prescribed hot folder 2532 existing in the print manager 115. In the processings in the print manager 115 after this, the printing is performed in the same way as in the case of the job submit mentioned above, and accordingly the explanation is omitted.

At this time, in selecting the printer or the cluster printer, it is necessary to prepare a postscript printer description (PPD) file in the client computer 103 and to set the printer driver in advance. The PPD file has a description as to the setting items for controlling the printer and the initial value or as to whether or not it is possible to combine the settings. The PPD file is provided as the file unique to each printer or to each cluster printer. Then, it is necessary for the user to prepare in advance the PPD file and the printer driver which are mutually linked for each printer or for each cluster printer.

<Detail of Operation of the Message Manager>

Next, the operation of the message manager 120 is explained in detail.

Figure 47:
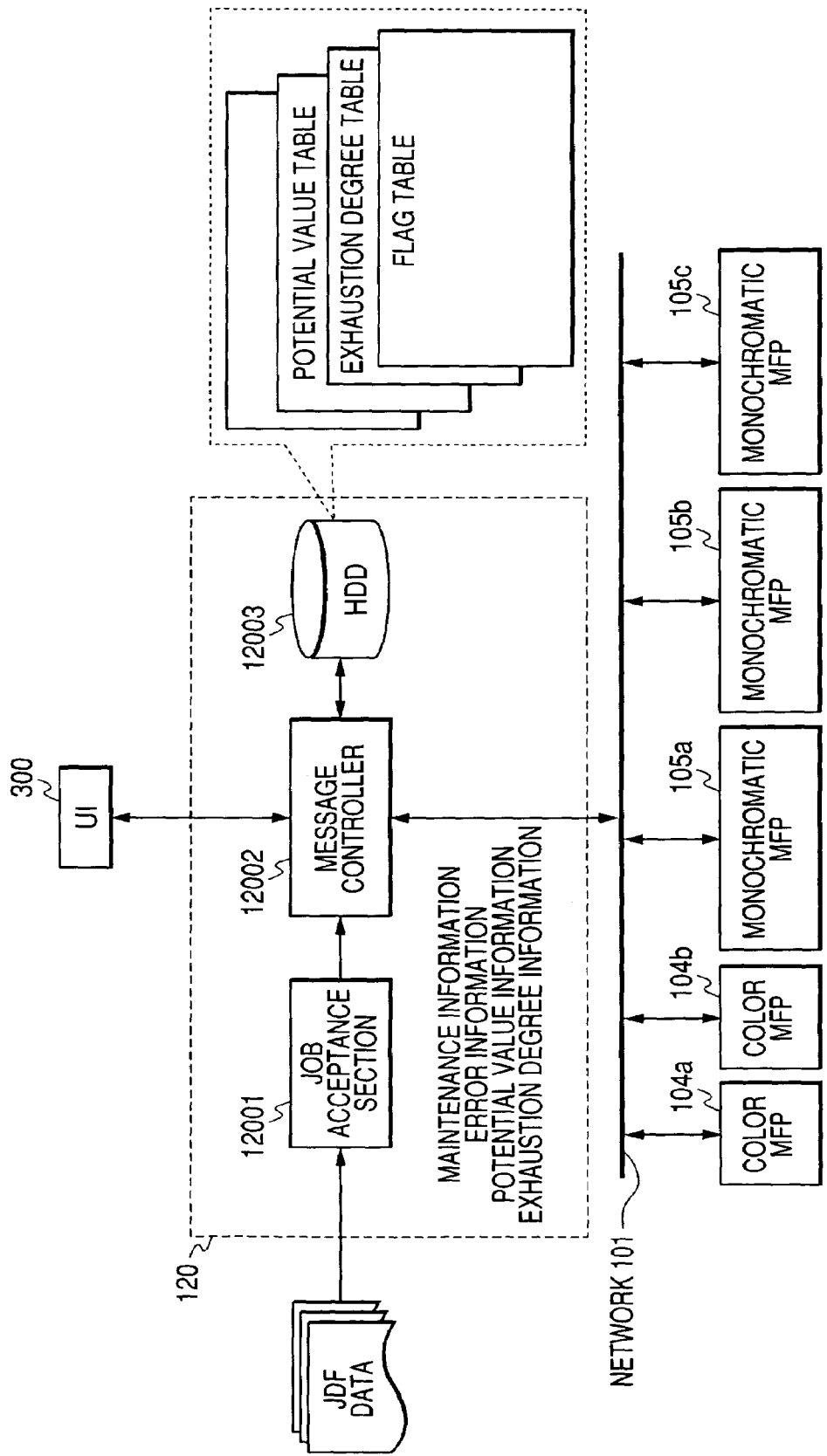
FIG. 47 shows a configuration of a message manager and a form of connection of the image forming system having a printer device which is a peripheral device.

FIG. 47 is a block diagram showing a configuration of the message manager 120 and a form of connection of the image forming system having the printer device which is a peripheral device.

In FIG. 47, when the print job is inputted as the JDF data to a job acceptance section 12001 of the message manager 120, the job acceptance section 12001 makes a determination as to by which printer device among the printer devices (the color MFP 104a, the color MFP 104b, the monochromatic MFP 105a, the monochromatic MFP 105b, and the monochromatic MFP 105c) connected to the network 101b the print job is outputted.

Further, the job acceptance section 12001 receives maintenance information (the information related to maintenance parts), error information (the information indicating the errors such as jam), potential value information (the information indicating the remaining amount of the toner, paper sheet, and the like), and exhaustion degree information (the information indicating an exhaustion degree) of each of the maintenance parts of the applicable printer device via the network 101b.

Here, the maintenance parts are consumables used by the printer device (the color MFP 104a, the color MFP 104b, the monochromatic MFP 10a, the monochromatic MFP 105b, and the monochromatic MFP 105c) to form the image on the paper sheet. More specifically, as for the printer device, for example, the items as described below are the consumables.
(1) The paper sheet supplied from the paper cassette 1434 to form the image
(2) The toner of each color (Y, M, C, K) as a developer used to form the image on the paper sheet
(3) A staple which is a bind member of the paper sheet used by the stapler 1605 of the online finisher section 1210
(4) The fixing device 1540 for fixing under heat the toner on the paper sheet on which the toner is transferred Note that in this embodiment, the toner used in a case where the image is formed by an electrophotographic process is mentioned as the developer described above, however, an ink used in a case where the image is formed by an inkjet system may be the developer.

A message controller 12002 of the message manager 120 performs the control so that the warning message displayed by the UI 300 is displayed (reported) at a set timing, on the basis of the error information, the maintenance information, the potential value information, and the exhaustion degree information received via the network 10b. The message controller 12002 receives the information related to the remaining amount of a plurality of consumables described above (for example, the number of the remaining paper sheets supplied to the paper cassette 1434, a remaining capacity of the toner which can be supplied to the developing devices 1430 through 1433, and the number of the remaining staples which can be used by the stapler 1605) from each of a plurality of printer devices (the color MFP 104a, the color MFP 104b, the monochromatic MFP 105a, the monochromatic MFP 105b, and the monochromatic MFP 105c).

Figure 48:
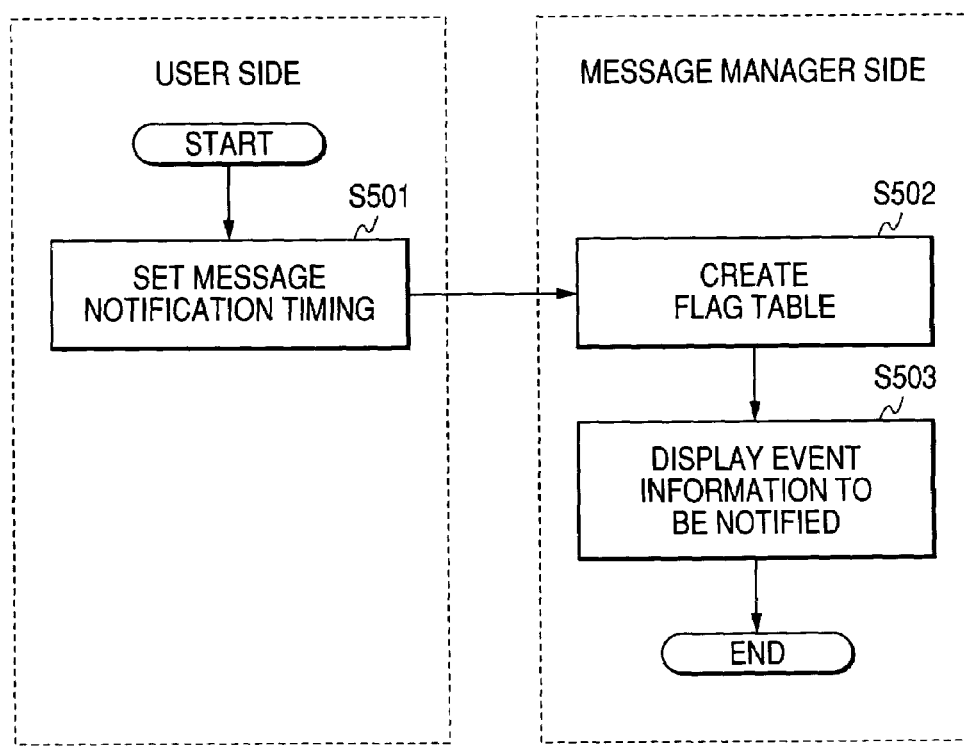
FIG. 48 is a flow chart showing a processing for setting a timing at which a warning message is notified.

FIG. 48 is a flow chart showing the processing for setting the timing for notifying the warning message displayed on the UI 300.

In FIG. 48, the operator sets a message notification timing as to at which timing the warning message indicating that the maintenance is necessary is displayed, via the UI 300 (step S501). FIG. 49 shows the screen on the UI 300 which is displayed when the message notification timing is set in the step S501.

Note that the UI 300 is provided to each of the printer devices and is a user interface screen used by the operator (worker) of the printer device in order to perform various settings to the printer device. The UI 300 may also be used as a display screen for reporting the user the information related to the remaining amount of at least one of a plurality of consumables mentioned above (the paper sheet, the toner, and the staple). Note that the information related to the remaining amount includes: the number of the remaining paper sheets supplied to the paper cassette 1434; the remaining capacity of the toner which can be supplied to the developing devices 1430 through 1433; and the number of the remaining staples which can be used by the stapler 1605.

In addition, the UI 300 is the user interface screen used in order to perform, by means of the message manager 120 provided to a plurality of printer devices via the network 101a, various kinds of settings to each of a plurality of printer devices via the network 101a. Besides, the UI 300 may also be used as the display screen for reporting the user the information (for example, the number of the remaining paper sheets supplied to the paper cassette 1434, the remaining capacity of the toner which can be supplied to the developing devices 1430 through 1433, and the number of the remaining staples which can be used by the stapler 1605) related to the remaining amount of at least one of a plurality of consumables mentioned above (the paper sheet, the toner, and the staple).

Note that in the explanation below, the explanation is made assuming that the UI 300 is, not provided to each of the printer devices, but the user interface screen used by the message manager 120 in order to perform various kinds of settings to each of a plurality of printer devices via the network 101a. In addition, for the UI 300, a liquid crystal display (LCD) and the like may be used.

In an example as shown in FIG. 49, a case is shown where to which cause the warning message is displayed can be set for five timings such as when power source is on; when power source is off; before job is started; when job is ended; and at the time of real time (a cause for maintenance or a cause for error is desired to be immediately displayed when the cause for maintenance or the cause for error occurs).

Here, when the power source is on refers to the timing at which a power supply voltage, which is inputted to a power source section (not shown) of the printer device from a commercial power source via a plug outlet, is inputted (supplied) to each portion of the printer device, by switching a main switch, for example, which is provided to the printer device, from an OFF state to an ON state. In addition, when the power source is off refers to the timing at which the supply to each portion of the printer device of the power supply voltage, which is inputted to the power source section (not shown) of the printer device from the commercial power source via the plug outlet, is suspended by switching the main switch, for example, which is provided to the printer device, from the ON state to the OFF state.

In addition, before the job is started refers to the timing before the execution, by any one of the printer devices (here, the MFP 104a), of the print job managed by the print manager 115 and whose execution is determined by the print manager 115 to be preformed by the color MFP 104a is started. Besides, when the job is ended refers to the timing at which the execution, by any one of the printer devices (here, the MFP 104a), of the print job managed by the print manager 115 and whose execution is determined by the print manager 115 to be performed by the color MFP 104a ended.

When any one of the display timings as shown in FIG. 49 is selected, a display maintenance cause selection screen for each display timing as shown in FIGS. 50 through 54 is displayed on the UI 300.

FIG. 50 shows a screen for selecting an item for displaying the warning message when the power source is on.

In FIG. 50, an example is shown in which: the replenishment of the paper sheet when no paper sheet is left (remaining amount is 0); the replenishment of the toner when no toner is left (remaining amount is 0); the replenishment of the staple when no staple is left (remaining amount is 0); roller replacement; oil replacement; the replenishment of the paper sheet when the remaining amount of the paper sheet is small (remaining amount is small); the replenishment of the toner when the remaining amount of the toner is small (remaining amount is small); the replenishment of the staple when the remaining amount of the staple is small (remaining amount is small); and the like are selected as the items.

Here, when the remaining amount is small in the replenishment of the paper sheet refers to a case where the number of paper sheets mounted in the paper cassette 1434 is below a predetermined number of sheets (for example, 5% of a maximum mountable amount mountable on the paper cassette 1434). In addition, when the remaining capacity of the toner is small refers to a case where the remaining capacity of the toner of a specific color (here, yellow) used by the printer device (here, the color MFP 104a) is below a predetermined capacity (for example, 5% of a full capacity of a yellow toner bottle (not shown) which supplies a yellow toner to the developer 1430 of yellow). Besides, when the number of the remaining staples is small refers to a case in which the number of the remaining staples used by the stapler 1605 of the online finisher section 1210 connected to the printer device (here, the color MFP 104a) is smaller than a predetermined quantity (for example, 5% of a quantity at the state of full load of the staples which can be supplied to the stapler 1605).

In the operator maintenance, all the consumables and the maintenance parts configuring the MFP such as motors, drivers, photosensitive drums, transfer drums, electrifying devices, electrostatic dischargers and having a life are also included as ORC. Therefore, if corresponding ORC parts exist other than the consumables and the maintenance parts mentioned above, an ORC item other than the items mentioned above is additionally displayed in the same screen. In the case of the ORC parts, a part number of the ORC part may be displayed together with a name of the ORC part because the number indicating the ORC part is displayed at the same time, together with the name of the ORC part.

In the example as shown in FIG. 50, a case where the warning message is displayed with regard to: the replenishment of the paper sheet (remaining amount is small); the replenishment of the toner (remaining amount is small); and the replenishment of the staple (remaining amount is small).

FIG. 51 shows a screen for selecting items for displaying the warning message when the power source is off.

In the example as shown in FIG. 51, a case where the warning message is displayed with regard to: the roller exchange; oil exchange; and temperature control error is shown.

FIG. 52 shows a screen for selecting items for displaying the warning message before the job is started.

In the example as shown in FIG. 52, a case in which the warning message is displayed with regard to: the replenishment of the paper sheet (remaining amount is 0); the replenishment of the toner (remaining amount is 0); the replenishment of the staple (remaining amount is 0); and voltage control error is shown.

FIG. 53 shows a screen for selecting items for displaying the warning message after the job is started.

In the example as shown in FIG. 53, a case in which the warning message is displayed with regard to: the replenishment of the paper sheet (remaining amount is 0); the replenishment of the toner (remaining amount is 0); the replenishment of the staple (remaining amount is 0); the and jam error is shown.

FIG. 54 shows a screen for selecting items for displaying the warning message in the real time.

In the example as shown in FIG. 54, a case in which the warning message is displayed with regard to: the replenishment of the paper sheet (remaining amount is 0); the replenishment of the toner (remaining amount is 0); the replenishment of the staple (remaining amount is 0); and the temperature control error is shown.

Returning to FIG. 48, the message controller 12002 of the message manager 120 creates a flag table in accordance with the setting of the display items for each display timing which the user sets on the UI screen (step S502).

FIG. 55A shows the flag table created by the message controller 12002. In the flag table, a flag indicating the display timing set in the step S501 with regard to each event to be notified to the operator is set. In the example as shown in FIG. 55A, a case is shown of: a flag 1 for an item displayed only when the power source is on; a flag 2 for an item displayed only when the power source is off; a flag 3 for an item displayed only before the job is started; a flag 4 for an item displayed only when the job is ended; a flag 5 for an item displayed only at the time of real time; . . . and a flag 20 for an item displayed at each timing of when the power source is on, when the job is ended, and at the time of real time.

For example, because the items of, for example, the replenishment of the paper sheet (remaining amount is small), the replenishment of the toner (remaining amount is small), and the replenishment of the staple (remaining amount is small) of Nos. 6 through 8, among the items in a notification event list, are events which are to be displayed only when the power source is on, the flag 1 is set for the items.

The flag table created by the message controller 12002 of the message manager 120 is stored in an HDD 12003. In the HDD 12003, in addition to the flag table, an exhaustion degree table indicating the exhaustion degree and the number of time of use of each maintenance item (consumables and maintenance parts) of each of the printer devices and a potential value table indicating the potential values different for each of the printer devices are stored.

Returning to FIG. 48, the message controller 12002 of the message manager 120 displays, on the UI 300, event information to be notified at each timing set by the user (step S503).

The content of the event information displayed on the UI 300 is defined in accordance with the created flag table mentioned above. In FIG. 55B, an example is shown in which the screen as shown in FIG. 55B is displayed because the event information to be notified when the power source is on which is displayed on the UI 300 is the item of, for example, the replenishment of the paper sheet (remaining amount is small), the replenishment of the toner (remaining amount is small), and the replenishment of the staple (remaining amount is small) of Nos. 6 through 8, among the items in the notification event list for which the flag 1 of FIG. 55A is set.

<Message Display Processing for Each Timing>

Figure 56:
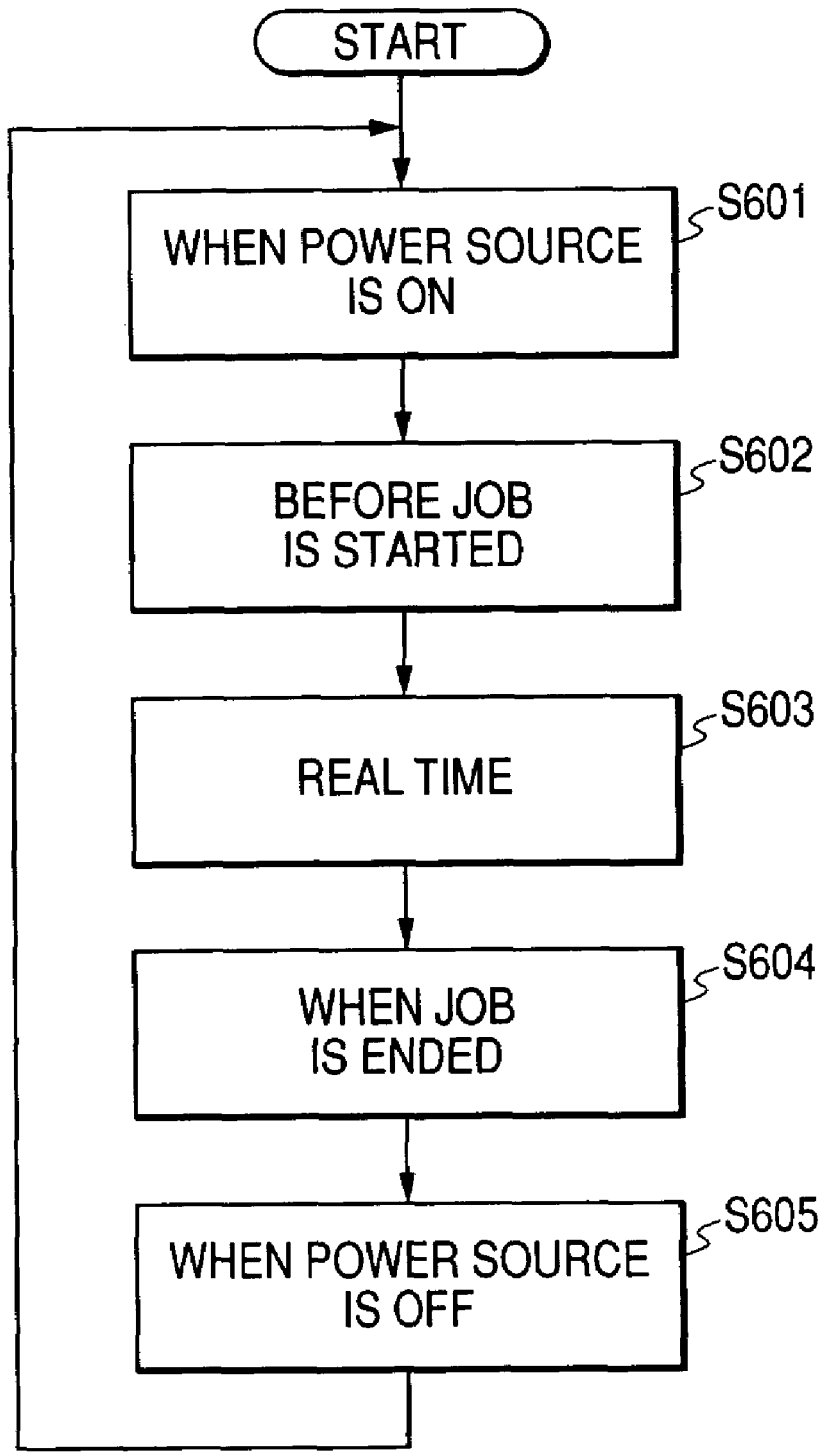
FIG. 56 is a flow chart showing an order of determination of the event for each display timing.

FIG. 56 is a flow chart showing an order of determining the event in each display timing.

In FIG. 56, the message controller 12002 of the message manager 120 determines the event of each display timing in accordance with the order of: when the power source of the printer device is on (step S601); before the job is started (step S602); at the time of real time (step S603); when the job is ended (step S604); and when the power source of the printer device is off (step S605), and carries out the control so that the message is notified to the operator.

Next, a flow from the determination of the event to be notified up to the display of the warning message on the UI 300 at each display timing is explained.

<Message Display Processing When the Power Source is On>

Figure 57:
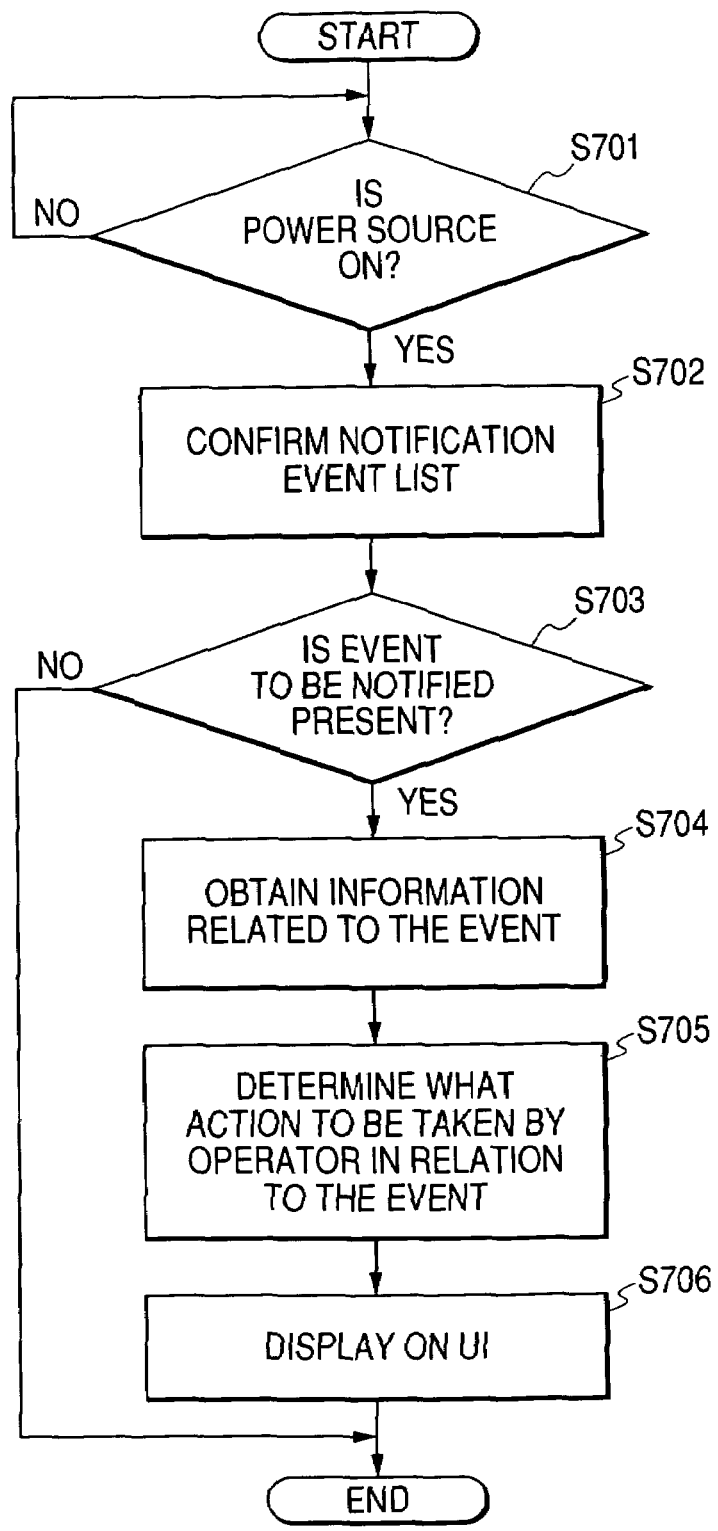

FIG. 57 is a flow chart showing the warning message display processing when the power source is on.

In FIG. 57, first, the message controller 12002 of the message manager 120 checks whether or not a power switch of a plurality of printer devices (the color MFP 104a, the color MFP 104b, the monochrome MFP 105a, the monochrome MFP 105b, and the monochromatic MFP 105c) is turned on (step S701). The message controller 12002 repeats the step S701 until the power switch is turned on. After the message controller 12002 confirms that the power switch of a specific printer device among a plurality of printer devices (here, the color MFP 104a) is turned on, the message controller 12002 confirms whether or not the flag indicating an event to be notified when the power source is on is set in the flag table (step S702 and step S703). Note that the event to be notified includes the following cases where the remaining number of the sheets of paper is small, where the remaining amount of the toner level is small, and where the number of the staples remaining is small. When the flag indicating the event to be notified when the power source is on is set in the flag table, the processing shifts to step 704. When the flag indicating the event to be notified when the power source is on is not set in the flag table, the warning message display sequence is ended.

Next, the message controller 12002 obtains the information related to the event from the HDD 12003 (step S704). For example, when the event of the replenishment of the toner (remaining amount of the toner is small) is selected, the message controller 12002 reads the remaining amount of the toner of the applicable printer device from the exhaustion table stored in the HDD 12003.

Next, the message controller 12002 determines what to be done by the operator in relation to the event (step S705). For example, concerning the remaining amount of a plurality of consumables when the replenishment of the sheets of paper (remaining amount of the paper is small) and the replenishment of the toner (remaining amount of the toner is small) are selected, the message controller 12002 judges whether or not the remaining number of the sheets of paper is below the prescribed number of sheets (for example, 5% of the maximum loadable amount) and the remaining amount of the toner is below the prescribed amount (for example, 5% of the full amount) When it is judged that the remaining number of the sheets of paper is below the prescribed number of sheets and that the remaining amount of the toner is below the prescribed amount, the message controller 12002 then determines to display the warning message to the operator of the color MFP 104a.

Note that when it is judged that the remaining amount of the sheets of paper is not below the prescribed number of sheets (for example, 5% of the maximum mountable amount) and that the remaining capacity of the toner is not below the prescribed capacity (for example, 5% of the full capacity), the message controller 12002 determines to provide no warning or to display a message (send a notice) to the effect that the remaining number of the sheets of paper is not below the prescribed number of sheets and that the remaining amount of the toner is not below the prescribed amount (reported), in relation to the sheets of paper and the toner that do not fall short of the prescribed number or amount.

Finally, the message controller 12002 displays a warning message on the UI 300 in accordance with the content of what is determined in the step S705 (step S706).

<Message Display Processing When the Power Source is Off>

Figure 58:
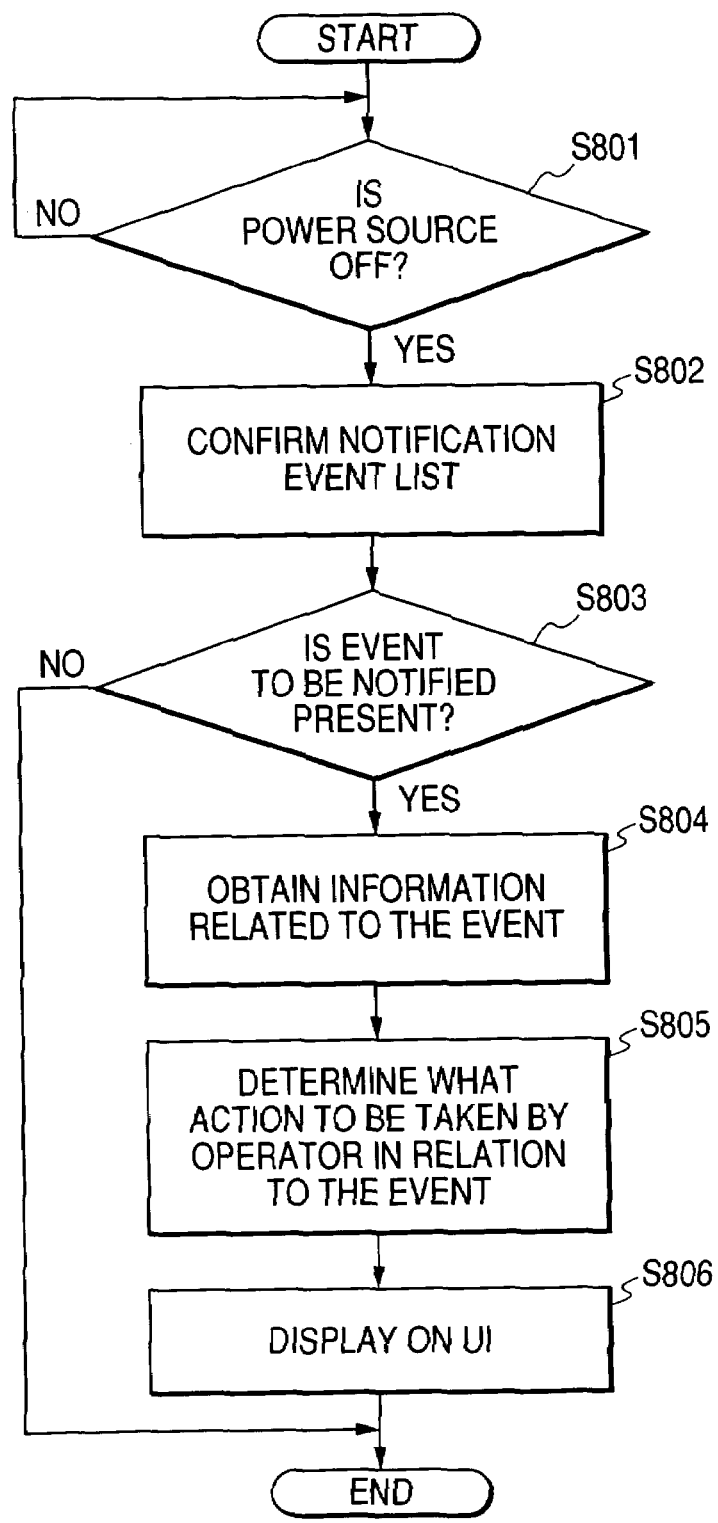
FIG. 58 is a flow chart showing the warning message display processing when the power source is off.

FIG. 58 is a flow chart showing the warning message display processing when the power source is off.

In FIG. 58, first, the message controller 12002 of the message manager 120 checks whether or not a power switch of the printer devices is turned off (step S801). The message controller 12002 repeats the step S801 until the power switch is turned off. After the message controller 12002 confirms that the power switch is turned off, the message controller 12002 confirms whether or not the flag indicating an event to be notified when the power source is off is set in the flag table (step S802 and step S803). When the flag indicating the event to be notified when the power source is off is set in the flag table, the processing shifts to step 804. When the flag indicating the event to be notified when the power source is off is not set in the flag table, the warning message display sequence is ended.

Next, the message controller 12002 obtains the information related to the event from the HDD 12003 (step S804). For example, when the event of the replacement of the roller is selected, the message controller 12002 reads the number of use of the applicable printer device from the exhaustion table stored in the HDD 12003.

Next, the message controller 12002 determines what to be done by the operator in relation to the event (step S805). For example, when the event of the replacement of the roller is selected, the message controller 12002 determines whether or not the number of prints exceeds a threshold value of the number of prints previously set at which it is determined to be the time to replace the roller. When it is judged that the number of prints exceeds the threshold value, the message controller 12002 determines to display a warning message. When it is judged that the number of prints does not exceed the threshold value of the number of copies of printing previously set, the message controller 12002 determines to display no message or to display a message indicating OK.

Finally, the message controller 12002 displays the warning message on the UI 300 in accordance with the content of what is determined in the step S805 (step S806).

<Message Display Processing Before the Job is Started>

Figure 59:
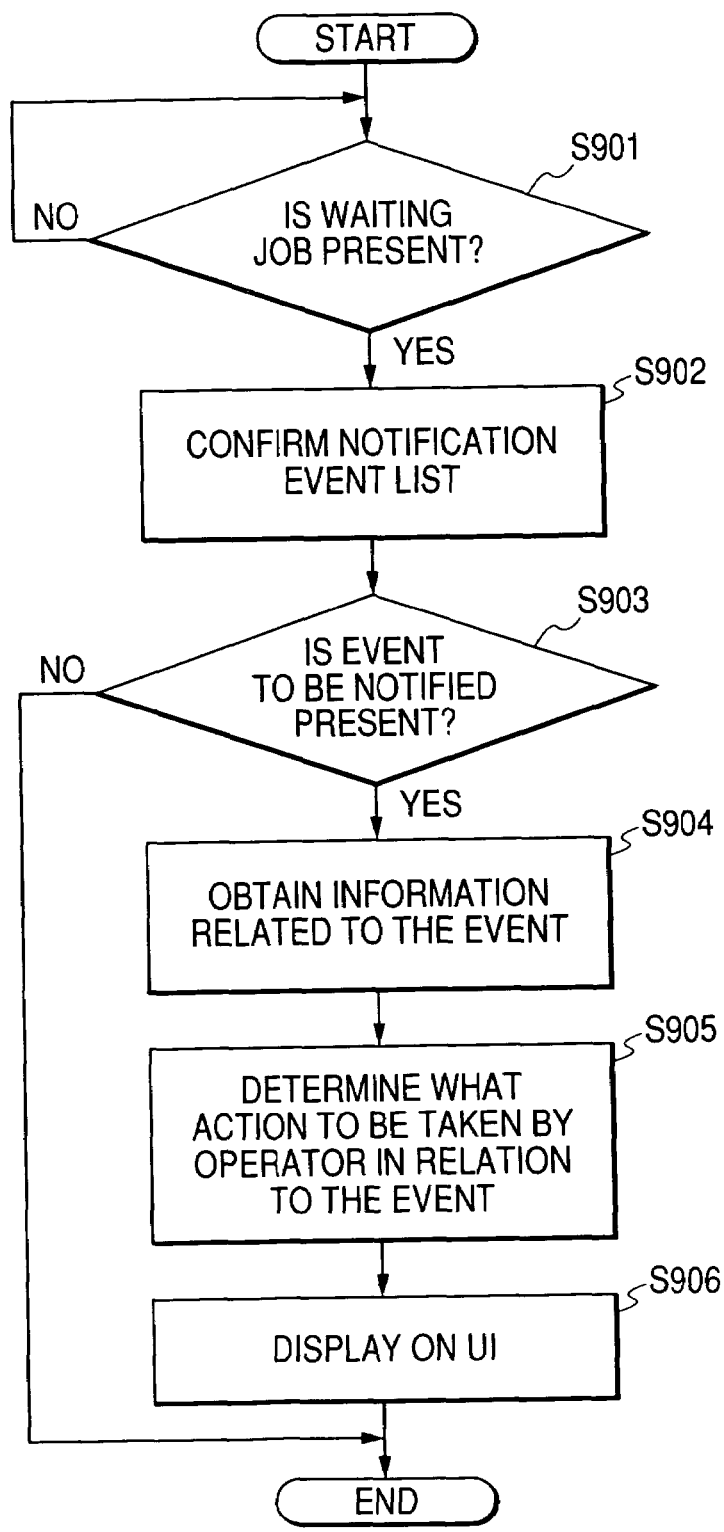
FIG. 59 is a flow chart showing the warning message display processing before the job is started.

FIG. 59 is a flow chart showing the warning message display processing before a job is started.

In FIG. 59, the message controller 12002 of the message manager 120, in relation to the specific printer device (here, the color MFP 104a) among a plurality of printer devices configuring the image forming system, checks by means of the print manager 115 whether or not a waiting job is present (step S901). The message controller 12002 repeats the processing of the step S901 until the waiting job related to the color MFP 104a is appeared. When it is confirmed that the waiting job related to the color MFP 104a is appeared, the message controller 12002 confirms whether or not the flag indicating the event to be notified before starting a job is set in the flag table (step S902 and step S903). When the flag indicating the event to be notified before starting a job is set in the flag table, the processing shifts to step S904. When the flag indicating that the event to be notified before the job is started is not set in the flag table, the warning message display sequence is ended.

Next, the message controller 12002 obtains the information related to the event from the HDD 12003 (step S904). For example, when the event of the replenishment of the sheets of paper (remaining amount is 0) is selected, the message controller 12002 reads the remaining amount of the paper of the applicable printer device from the exhaustion table stored in the HDD 12003.

Next, the message controller 12002 determines what to be done by the operator in relation to the event (step S905). For example, when the event of the replenishment of the sheets of paper (remaining amount is 0) is selected, the message controller 12002 determines whether or not the remaining amount of the paper sheet is 0. When the remaining amount of the paper sheet is 0, the message controller 12002 determines to display a warning message, and when the remaining amount of the paper sheet is not 0, the message controller 12002 determines to display no message or to display a message indicating OK.

In other words, the message controller 12002 determines whether or not any remaining amount of the consumables (the replenishment of the paper sheet (remaining number is 0) and the replenishment of the toner (remaining amount is zero) in FIG. 52) selected by the UI 300 will reach the predetermined amount (with regard to the paper sheet, the remaining number is 0; and with regard to the toner, the remaining amount is 0) after the color MFP 104a executes the print job related to the color MFP 104a by forming the image over a plurality of pages.

In addition, when the message controller 12002 determines that the remaining number of the paper sheet will be 0 and that the remaining amount of the toner will be 0 through the execution of the print job by the color MFP 104a, the message controller 12002 determines to display the warning message to the operator of the color MFP 104a. When the remaining amount of the paper sheet will not be 0 and that the remaining amount of the toner will not be 0, the message controller 12002 determines to issue no warning or to display a message (send a notice) to the effect that the remaining amount of the paper sheet will not fall short of the predetermined number of sheets and that the remaining capacity of the toner will not fall short of the prescribed capacity, in relation to the sheets of paper and the toner that do not fall short of the predetermined number or amount.

Finally, the message controller 12002 displays a warning message on the UI 300 in accordance with the content of what is determined in the step S905 (step S906).

<Message Display Processing Upon Finishing the Job>

Figure 60:
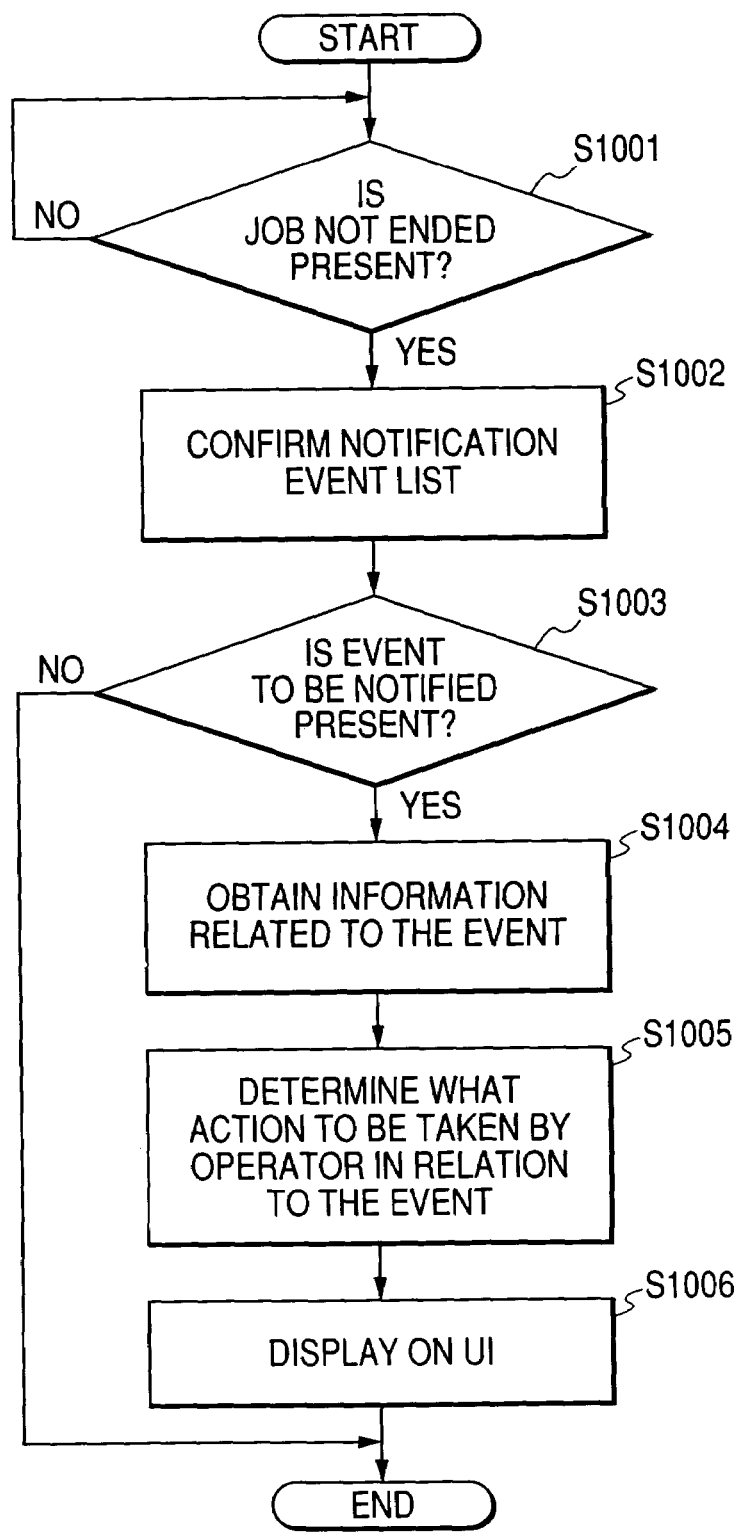
FIG. 60 is a flow chart showing the warning message display processing when the job is ended.

FIG. 60 is a flow chart showing the warning message display processing upon finishing the job.

In FIG. 60, the message controller 12002 of the message manager 120 checks whether or not an unfinished job is present (step S1001). The message controller 12002 repeats the processing of the step S1001 until no job is left unfinished. When the message controller 12002 confirms that there is no job left unfinished, the message controller 12002 then confirms whether or not the flag indicating the event to be notified upon finishing the job is set in the flag table (step S902 and step S903). When the flag indicating that the event to be notified upon finishing the job is set in the flag table, the processing shifts to step 1004. When the flag indicating that the event to be notified upon finishing the job is not set in the flag table, the warning message display sequence is ended.

Next, the message controller 12002 obtains the information related to the event (step S1004). For example, when the event of the jam error is selected, the message controller 12002 reads the jam error flag relating to the corresponding printer device.

Next, the message controller 12002 determines what to be done by the operator in relation to the event (step S1005). For example, when the event of the jam error is selected, the message controller 12002 determines whether or not the jam error flag is true. When the jam error flag is determined to be true, the message controller 12002 determines to display a warning message, and when the jam error flag is determined not to be true, the message controller 12002 determines to display no message or to display the message indicating OK.

Finally, the message controller 12002 displays a warning message on the UI 300 in accordance with the content of what is determined in the step S705 (step S1006).

<Message Display Processing in Real Time>

Figure 61:
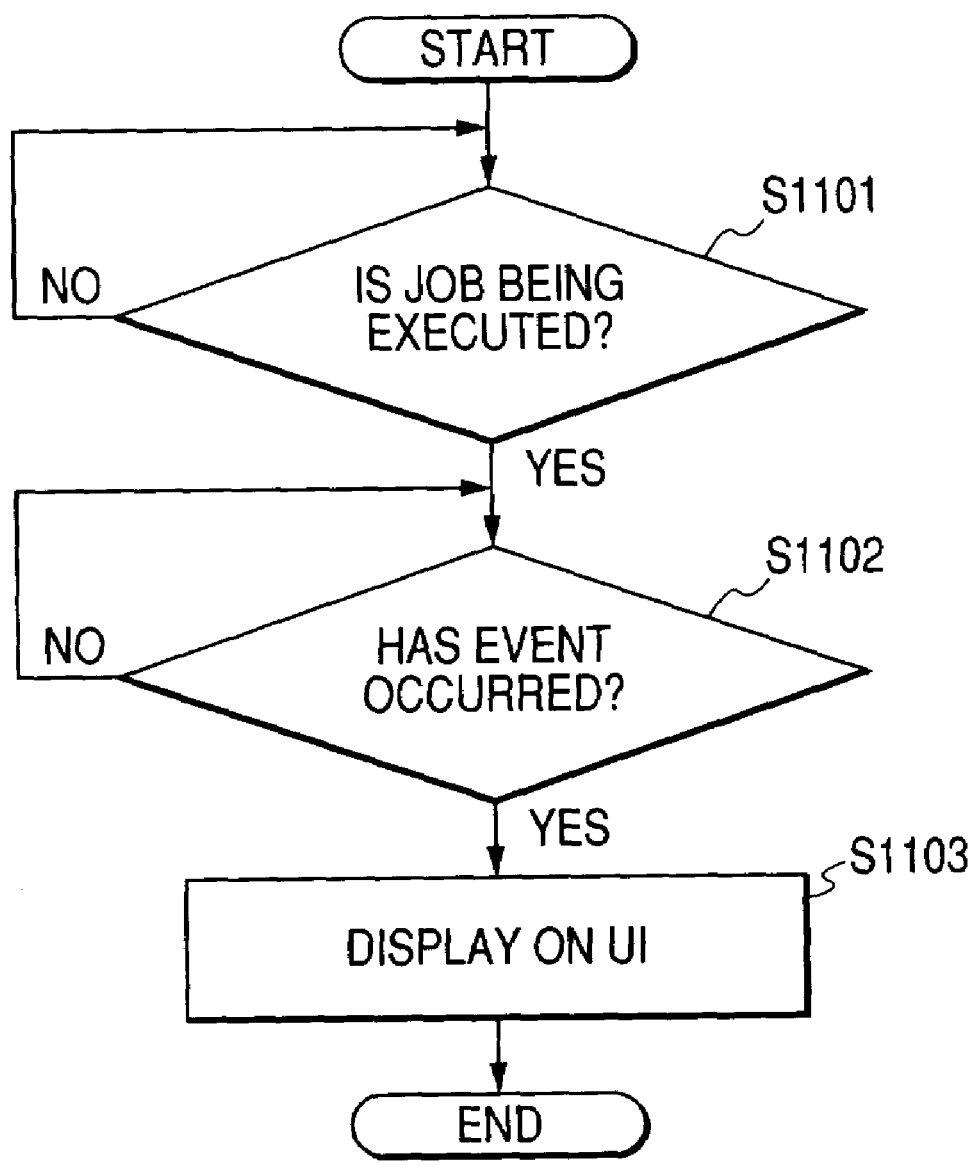
FIG. 61 is a flow chart showing the warning message display processing at the time of real time.

FIG. 61 is a flow chart showing the warning message display processing in real time.

In FIG. 61, the message controller 12002 of the message manager 120, first, checks whether or not the job is being executed by the printer device (step S1101). The message controller 12002 repeats the processing of the step S1101 until the job to be executed appears. When the message controller 12002 confirms that the job is being executed, the message controller 12002 checks whether or not there occurs the event to be notified in real time (step S1102).

For example, when the event of the temperature control error is selected, the message controller 12002 reads a temperature error flag in the corresponding printer device. When there occurs no event to be notified to the operator, the message controller 12002 repeats the step S1102.

Finally, the message controller 12002 displays a warning message on the UI 300 (step S1003).

<Message Display Processing When Predicting the Maintenance Event>

Next, the operation for displaying a warning message by predicting the event related to the maintenance before starting a job is explained, on the basis of the warning message display processing before starting a job as shown in FIG. 59.

In FIG. 59, the message controller 12002 of the message manager 120 checks whether or not a waiting job is present (step S901). The message controller 12002 repeats the processing of the step S901 until the waiting job appears. When the message controller 12002 confirms that the waiting job is appeared, the message controller 12002 then confirms whether or not the flag indicating the event to be notified before starting a job is set in the flag table (step S902 and step S903). When the flag indicating that the event to be notified before starting a job is set in the flag table, the processing shifts to the step 904. When the flag indicating that the event to be notified before starting a job is not set in the flag table, the warning message display sequence is ended.

Next, the message controller 12002 obtains the information related to the event from the HDD 12003 (step S904). For example, when the event of the replenishment of the paper sheet (remaining amount is 0) is selected, the message controller 12002 reads the remaining amount of the paper sheet in the corresponding printer device from the exhaustion table stored in the HDD 12003. Further, the message controller 12002 computes a predicted amount of the paper sheet to be consumed in the applicable printer device by printing the job to be executed.

Next, the message controller 12002 determines what to be done by the operator in relation to the event (step S905). For example, when the event of the replenishment of the paper sheet (remaining amount is 0) is selected, the message controller 12002 determines whether or not the remaining amount of the paper sheet, which is obtained by subtracting the predicted amount of the paper consumption through the execution of the job from the value of remaining amount of paper read from the exhaustion degree table, is below 0. Then, the message controller 12002, when the remaining amount of the paper sheet is below 0, determines to display no warning message or to display the message indicating OK.

Finally, the message controller 12002 displays a warning message on the UI 300 in accordance with the content of what is determined in the step S905 (step S906).

In this embodiment, it is possible to display on the UI at each display timing desired by the operator the warning message indicating that the maintenance by the operator is necessary for each maintenance item (replenishment of the consumables such as the paper sheet; toner; and staple, and replacement of the parts that require maintenance such as the photosensitive drum; roller; and motor) of the printer device configuring the image forming system, thereby making it possible to notify the maintenance time at the appropriate timing in accordance with operator's convenience.

The message controller 12002, for each of the printer devices, is capable of setting the predetermined timing for reporting the information related to the remaining amount of a plurality of consumables (paper sheet, toner, staples, and the like) used by each of the printer devices; and is also capable of setting a plurality of different timings as the predetermined timings (i.e., when the power source is on, when the power source is off, before the job is started, and when the job is ended). In addition, the message controller 12002 is capable of selecting, on the basis of the input from the UI 300, the consumable which the report regarding thereto is to be issued to the operator of the printer device at each of a plurality of predetermined timings (i.e., when the power source is on, when the power source is off, before the job is started, and when the job is ended).

As is described above, according to this embodiment, information is reported in relation to the remaining amount of the consumables upon the coming of the predetermined timing (i.e., when the power source is on, when the power source is off, before the job is started, and when the job is ended) after a plurality of consumables reaches the predetermined remaining amount, rather than reporting information to the operator of the printer device no sooner than a plurality of consumables used for the printer device reaches the predetermined amount. Therefore, it becomes possible, for example, to simultaneously report information on the remaining amounts of the first consumable and the second consumable at the prescribed timing, and accordingly, it is possible to reduce an operation load (the number of operations) of the operator of the printer device.

Second Embodiment

The second embodiment of the present invention is different from the first embodiment as described above in the points mentioned below. The other elements of the second embodiment are the same as the corresponding elements of the first embodiment described above; and accordingly, the explanation thereof is omitted.

In the first embodiment as described above, the explanation is made as to a case where the determination of whether or not the message manager 120 displays the warning message is made based only on the maintenance information, the error information, potential value information, the exhaustion degree information of each of the parts, which require maintenance, of the printer device (the color MFP 104*a*, the color MFP 104*b*, the monochrome MFP 105*a*, the monochrome MFP 105*b*, and the monochrome MFP 105*c*) connected to the network 101.

In this embodiment, an explanation is made on a configuration in which the message manager 120 is also connected via the network to the supplier which supplies the various kinds of parts that require maintenance, and the determination as to whether or not to display a warning message is made in view of the inventory information of the parts that require maintenance in the POD center in which the image forming system is installed, and in view of the inventory information and the delivery time information of the parts that require maintenance in the supplier.

Figure 62:
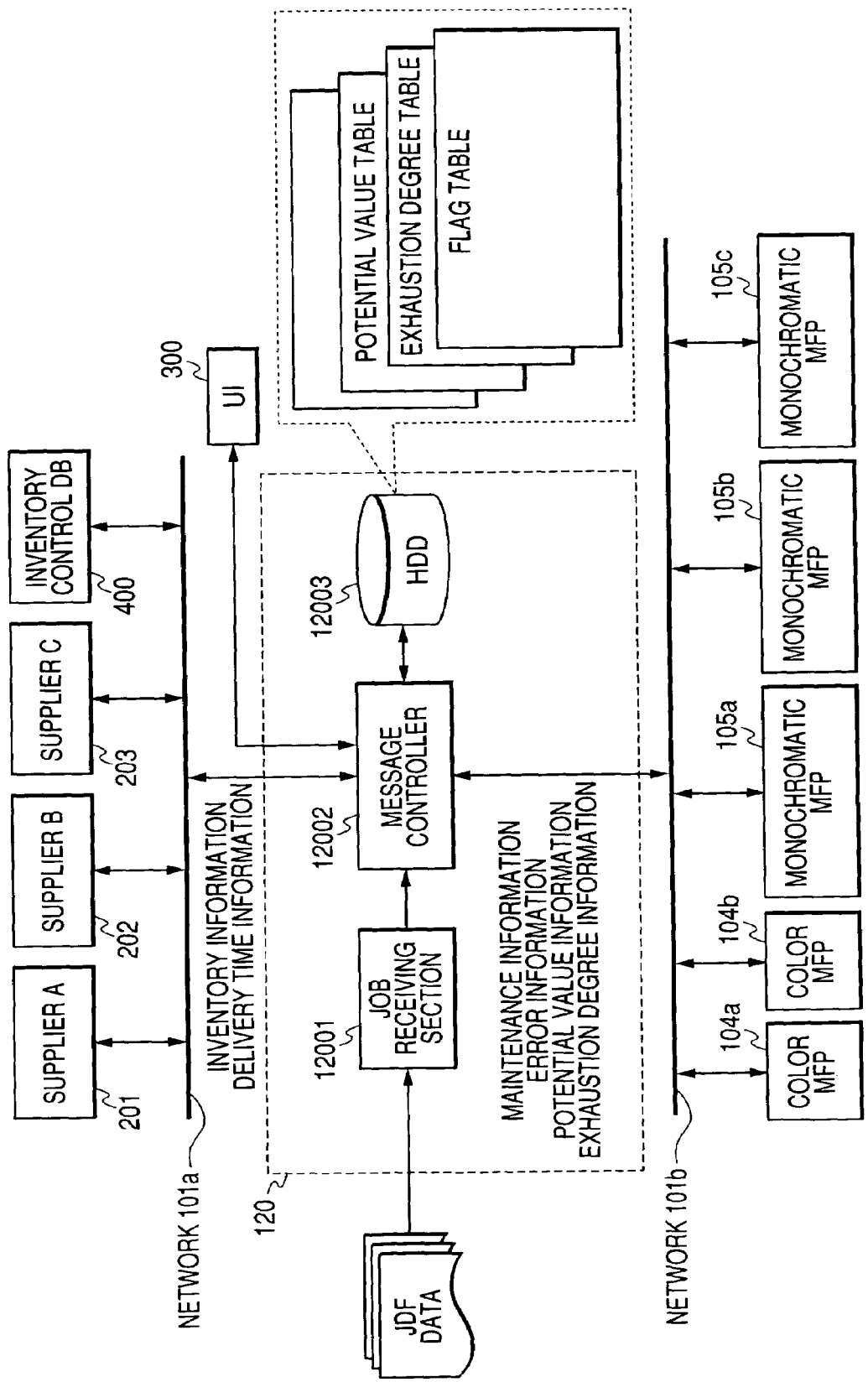
FIG. 62 shows a configuration of a message manager and a form of connection of peripherals according to a second embodiment of the present invention.

FIG. 62 shows a configuration of the message manager 120 and a connection pattern of the peripherals therefor. Note that the constituent components which are the same as the components of FIG. 47 are provided with same reference symbols.

In FIG. 62, when a print job is inputted as the JDF data to the job acceptance section 12001 of the message manager 120, the job acceptance section 12001 determines which printer device among the printer devices (the color MFP 104*a*, the color MFP 104*b*, the monochromatic MFP 105*a*, the monochromatic MFP 105*b*, and the monochromatic MFP 105*c*) connected onto the network 101*b* the printer job is outputted to, according to the JDF data. In addition, the job acceptance section 12001 receives maintenance information, error information, potential value information, and the exhaustion degree information of each of the maintenance parts of the corresponding printer device, via the network 101*b*.

The message controller 12002 of the message manager 120 is connected to the printer device mentioned above via the network 101*b*, and further connected to, via the network 101*a*, each of information data bases of a supplier A201, a supplier B202, and a supplier C203, who handle each of the maintenance parts; and also to an inventory management DB 400 for managing the inventory information of the maintenance parts in the POD center in which the image forming system is installed. The message controller 12002 receives the inventory information and the delivery time information of the maintenance parts in each of the supplier 201, the supplier 202, and the supplier 203, via the network 101*a*.

The message controller 12002 performs the control so that the warning message to be displayed via the UI 300 is displayed at the predetermined timing which, on the basis of the error information, the maintenance information, the potential value information, and the exhaustion degree information of the printer device received via the network 101*b* mentioned above; and also on the basis of the inventory information and the delivery time information of each of the maintenance parts received via the network 101*a* mentioned above.

In addition, the message controller 12002 creates the flag table, and the exhaustion degree table and the potential value table for each of the printer devices; and, in addition thereto, the inventory information table and the delivery time information table for each maintenance item obtained via the network 101*a* from the inventory management DB 400, the supplier A201, the supplier B202, and the supplier C203. The message controller 12002 then stores those tables thus created into the HDD 12003.

<Message Display Processing in Relation to the Placement of an Order for the Maintenance Parts>

Next, a procedure is explained by which the event to be notified to the operator is determined at each of the display timings in view of the inventory information of the maintenance parts in the POD center and the inventory information and the delivery time information of the maintenance parts of the supplier, and then the warning message is displayed via the UI 300. The processes of the display processing of each of the display timings are the same as those of the first embodiment described above, and accordingly, the explanation is made only as to the message display processing when the power source is on.

<Message Display Processing when the Power Source is On>

FIG. 57 is a flow chart showing the warning message display processing when the power source is on.

In FIG. 57, first, the message controller 12002 of the message manager 120 checks whether or not a power switch of the printer device is turned on (step S701). The message controller 12002 repeats the step S701 until the power switch is turned on. After the message controller 12002 confirms that the power switch is turned on, the message controller 12002 confirms whether or not the flag indicating the event to be notified when the power source is on is set in the flag table (step S702). When the flag indicating the event to be notified when the power source is on is set in the flag table, the processing shifts to a step 704. When the flag indicating the event to be notified when the power source is on is not set in the flag table, the warning message display sequence is ended.

Next, the message controller 12002 obtains the information related to the event from the HDD 12003 (step S704). For example, when the event of the placement of an order for the toner bottle is selected the message controller 12002 reads each information such as the information on the number of the remaining toner bottles in the POD center and the number of the remaining toner bottles of the supplier from the inventory information table of the toner bottles stored in the HDD 12003, and the information on the number of days running to the delivery date of the toner bottles of the supplier from the delivery time information table of the toner bottles.

Next, the message controller 12002 determines what to be done by the operator in relation to the event (step S705). For example, when the event of placement of an order for the toner bottle is selected, the message controller 12002 first determines whether or not the number of the remaining toner bottles in the POD center is below a predetermined threshold value. Note that the threshold value can be set at the discretion of each operator. Here, with regard to the threshold value, two threshold values, namely a threshold value 1 and a threshold value 2 are provided, for example, and the threshold value 1 is set to be greater than the threshold value 2.

When the remaining number of the toner bottle is below the threshold value 1 but is not below the threshold value 2, the message controller 12002 determines whether or not to display a warning message to the effect that it is necessary to place an order for the toner bottle considering the number of the remaining toner bottles and the number of days running to the delivery date of the toner bottle. When the number of the remaining toner bottles is below both the threshold value 1 and the threshold value 2, the message controller 12002 determines to display the warning message without considering the number of the remaining toner bottles and the number of days running to the delivery date of the toner bottle. When the number of the remaining toner bottles is not below the threshold value 1, the message controller 12002 determines to display no warning message or to display a message indicating OK.

Finally, the message controller 12002 displays the warning message on the UI 300 in accordance with the content of what is determined in the step S705 (step S706).

As is described above, according to this embodiment, it is possible to display on the UI the warning message indicating that it is necessary to place an order for the maintenance parts at each display timing desired by the operator on the basis of the inventory information of the maintenance parts in the POD center where the image forming system is installed, and of the inventory information and the delivery time information of the maintenance parts of the supplier; therefore, it is possible to notify the time to place an order for the maintenance parts at appropriate timings in accordance with the convenience to the operator.

Third Embodiment

A third embodiment of the present invention is different from the first embodiment described above in the points as described below. Because the other elements of the third embodiment are the same as the corresponding elements of the first embodiment (FIG. 1) described above; therefore, the explanation thereof is omitted.

In the third embodiment of the present invention, considering that the state of the print job to be inputted to the image forming system varies from time to time, the timing at which the maintenance becomes necessary varies in real time depending on the state of a reception of a print job and the state of a reception of an order. In this regard, in this embodiment, a configuration is explained in which the timing at which the maintenance becomes necessary is predicted in accordance with the state of a reception of a print job and the state of a reception of an order, to thereby dynamically scheduling timings for displaying the warning message.

<Scheduling of the Process Management>

To begin with, the explanation is made as to a scheduling function in the image forming system.

The process control manager 111 communicates with the order receiving and original receiving manager 112; the original editing manager 113; the proof manager 114; the print manager 115; the post-treating manager 116; the file archiving manager 117; the delivery and dispatch manager 118; the scan manager 119; and the like, to manage the status of the job in each manager; and also the process control manager 111 is capable of establishing interaction between the managers and coordinating schedules thereof.

Figure 63:
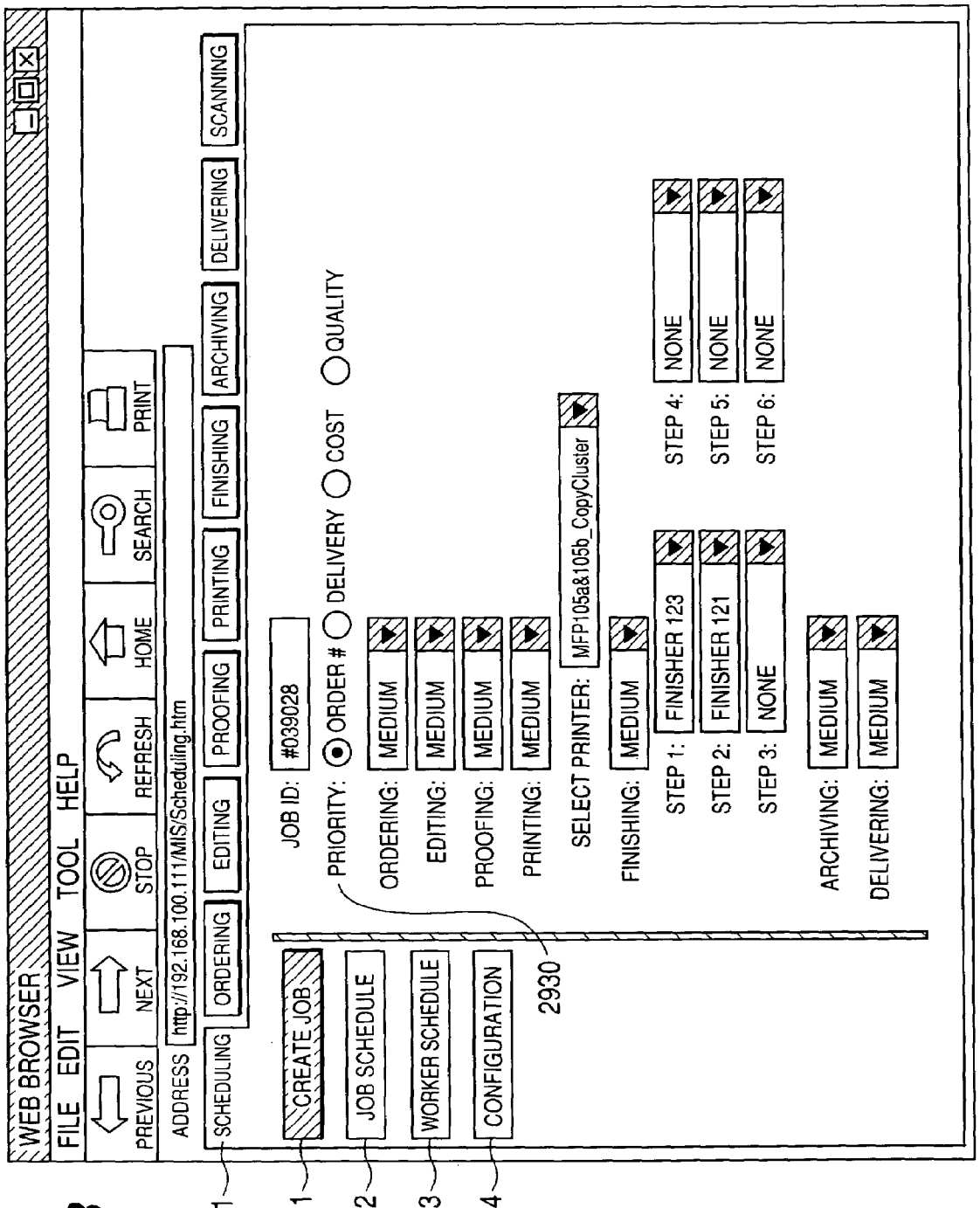
FIG. 63 shows a job creation screen provided by a process control manager according to a third embodiment of the present invention.

FIG. 63 shows a job creation screen provided by the process control manager 111.

With regard to the job creation screen, it is previously set such that the job creation screen is read onto the client computer 103 when an operator inputs the IP address of the web server on the process control manager 111 side to the URL address section of the web browser on the client computer 103.

In FIG. 63, reference numeral 2911 is a create job key. The job creation screen as shown in FIG. 63 corresponds to a state in which the create job key 2911 is clicked (pointed by a pointing device (not shown) and the like). In the job creation screen, when a reception of an order for a job by the order receiving and original receiving manager 112 is established, the operator, in response to the job, selects the priority of the job (selects through operating priority selection buttons 2930 from among an order receiving order priority (Order); a delivery schedule priority (Delivery); a cost priority (Cost); and a quality priority (Quality)); and makes a determination as to which printer device is used, which finisher is used, and the like; and can input the same.

As a result, a new job is issued from the process control manager 111, and the JDF data is also issued, to thereby start the job management on the process control manager 111.

Figure 67:
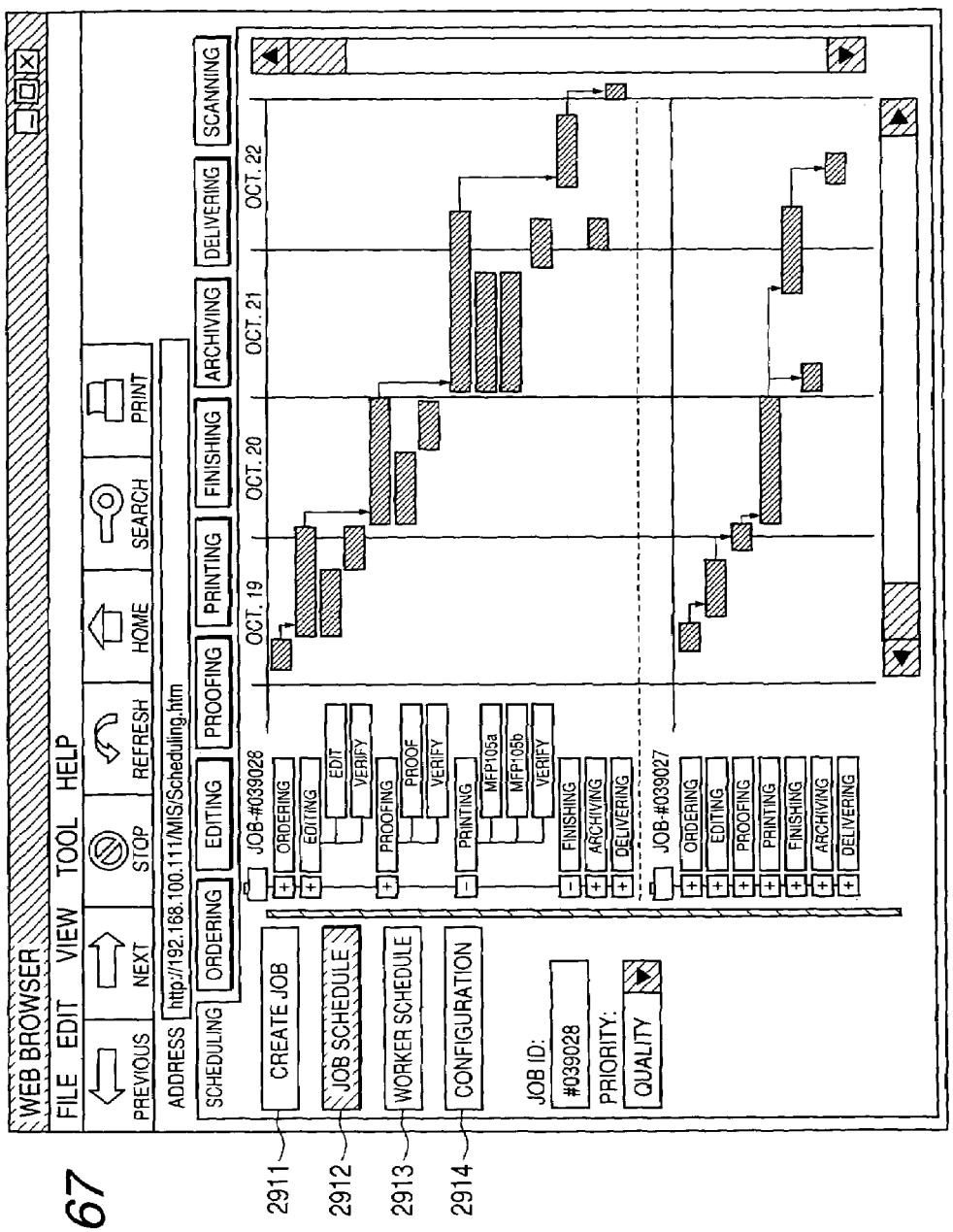
FIG. 67 shows the job scheduling screen.
Figure 68:
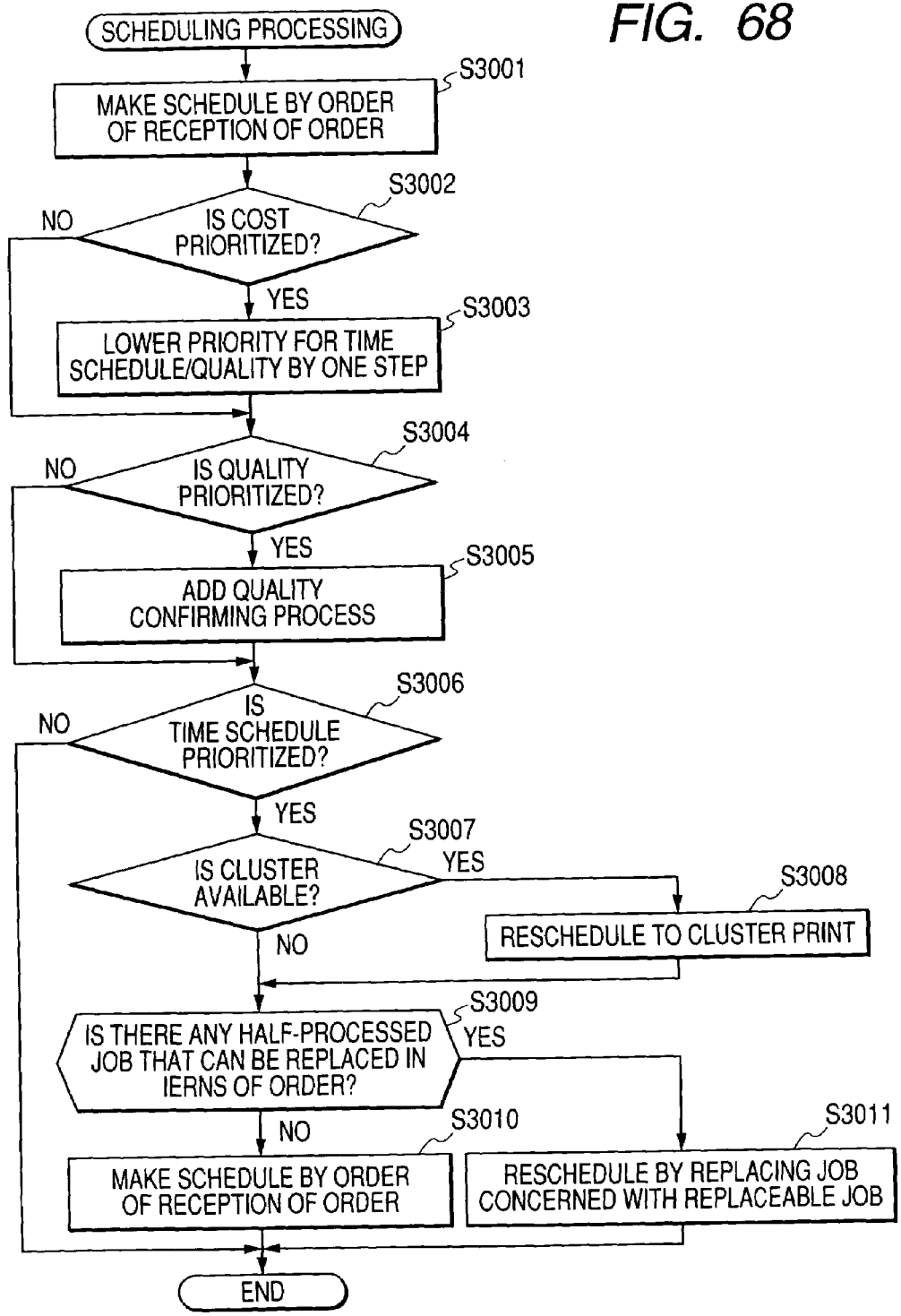
FIG. 68 is a flow chart showing an example of a scheduling processing performed by the process control manager.

Reference numeral 2912 denotes a scheduling key. By clicking (pointing by a pointing device (not shown) and the like) the scheduling key 2912, the process control manager 111 performs the scheduling of the job (the scheduling processing as shown in FIG. 68 to be described later) on the basis of the input in the job creation screen, and the result of the scheduling is displayed on the job scheduling screens as shown in FIGS. 64 through 67.

Reference numeral 2913 denotes a configuration key. By clicking (pointing by a pointing device (not shown) and the like) the configuration key 2913, a job configuration screen (not shown) is displayed.

FIGS. 64 through 67 show the job scheduling screens provided by the process control manager 111. In FIGS. 64 through 67, the same constituent components as that of FIG. 63 are provided with same reference numerals.

Figure 64:
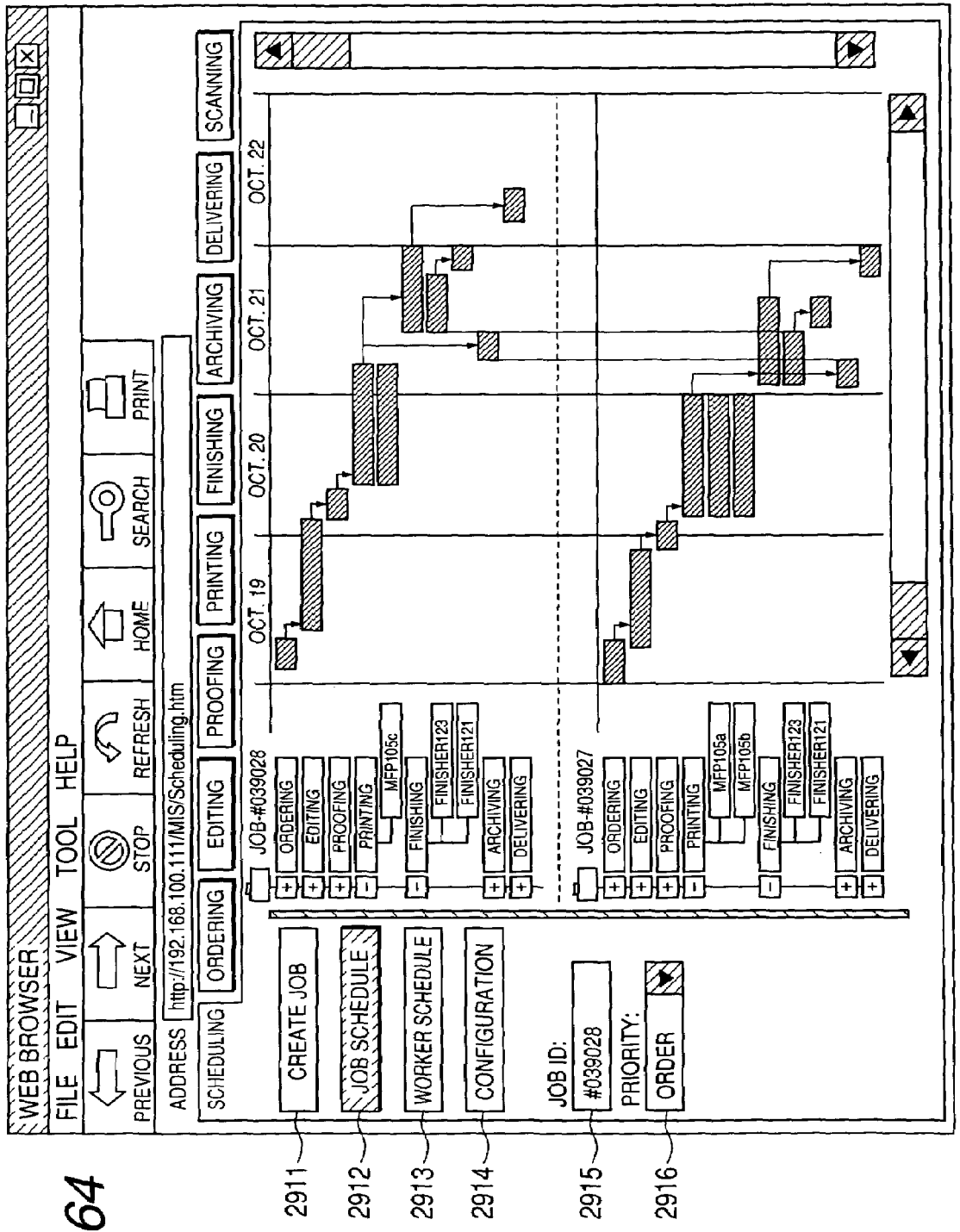
FIG. 64 shows a job scheduling screen.

In FIG. 64, in the job scheduling screen, the schedule in accordance with the time required for each manager (managers 112 through 119) is displayed so that the collaboration of the managers can be confirmed at a glance. The job scheduling screen is managed for each of the jobs. When a job ID is inputted in a job ID input column 2915, the schedule of the job is displayed together with the schedule of the peripheral jobs.

The display of the schedule is performed for each of the processes for each job whose process is managed by the process control manager 111. In addition, the time required for each process is displayed.

For example, when the job ID #039028 (job number) is inputted in the job ID input column 2915, the schedule of the job is displayed. That is, the schedule from the reception of the order of the job to the delivery is displayed. By clicking (pointing by a pointing device (not shown) and the like) a "+" mark or a "−" mark on the left of a process name, if each process has a detailed process, it is possible to display the detailed process by developing and reducing the process.

It is understood from the job ID #039028 that each process is sequentially being carried out, and that a time-lag occurs when the job is transferred from the print manager 115 to the post-treating manager 116. This is because a previous job of the ID #039027 utilizes the same cutting machine 121 and the same wrapping bookbinding machine 123 as a job of the job ID #039028 due to the schedule made in the order of reception of orders (FIG. 64 corresponds to a case in which the order receiving order priority (Order) is selected by the priority selection button 2930 in FIG. 63). The job ID #039028 has to wait until finishing process of the job-ID #039027 ends, which leads to a bottleneck that exerts an influence upon the delivery time.

However, in a case where a customer requests the delivery to be shortest as possible, that is, even if a job with the same job ID #039028 is received, if all the jobs in process can be delayed, it is possible to finish the job with the advanced delivery time than that in the above-described case where the schedule is made in accordance with the order reception order as shown in FIG. 64.

Figure 65:
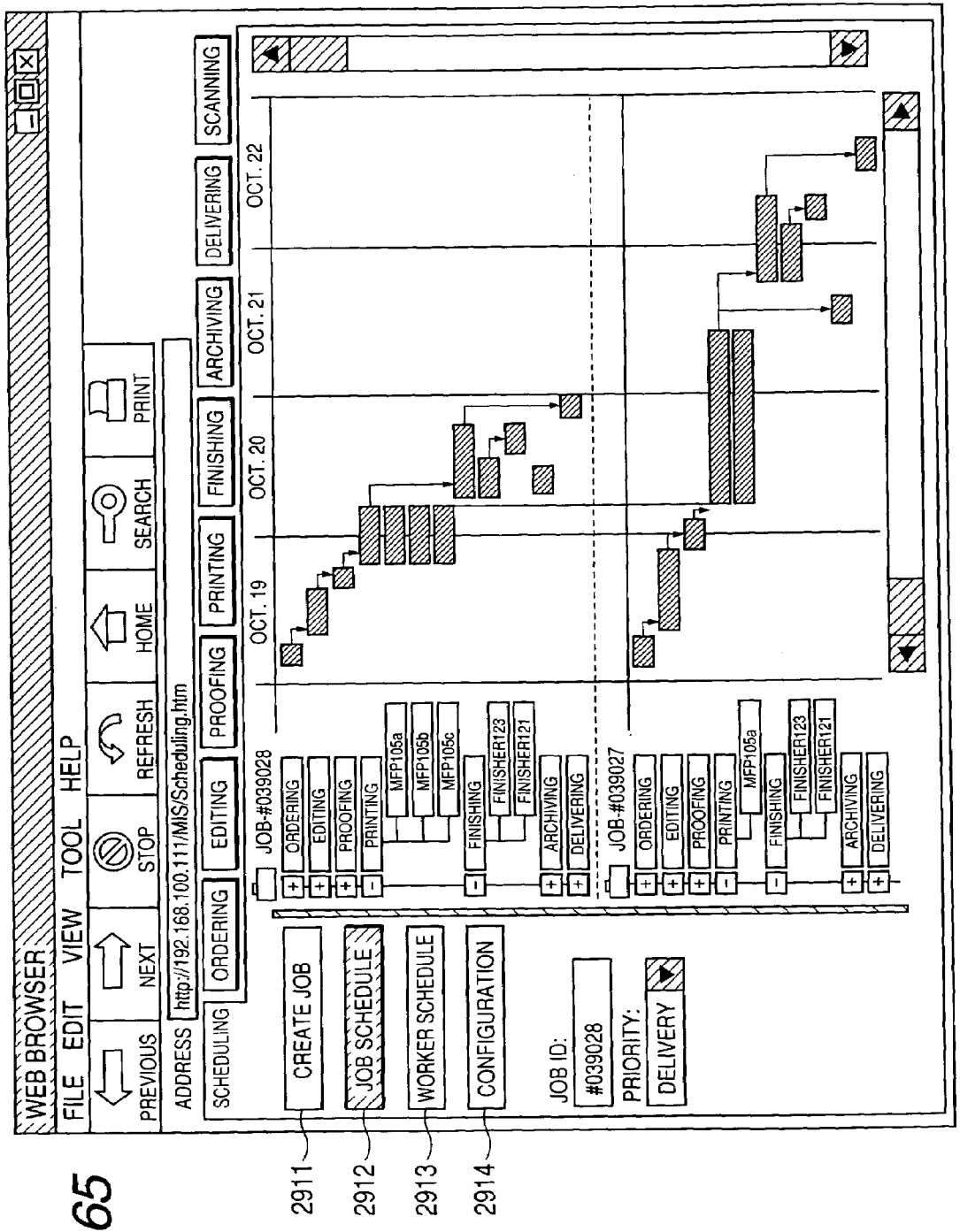
FIG. 65 shows the job scheduling screen.

In this case, by switching the priority key (priority order key) 2916 from the order receiving order priority (Order) to the delivery time schedule priority (Delivery), the job scheduling screen on the basis of the delivery time order is displayed as shown in FIG. 65.

The schedule according to the delivery time schedule priority (Delivery) as shown in FIG. 65, the job (printing product) of the job ID #039028 is delivered as much as two days earlier than the delivery date in a case where the schedule is made according to the order receiving order priority (Order) as shown in FIG. 64.

In the schedule of the delivery time schedule priority (Delivery), the cluster is configured by three printer devices, contrary to the case of the schedule of the order receiving order priority (Order) in which printing is performed by one printer device (MFP). Further, the time required for the post-treating manager 116 is reduced by giving the job a higher priority than to other jobs. With regard to other managers, it is possible to make the schedule shortened by putting in more workers, by having them work overtime, and the like.

On the contrary, as for the job ID #039027 has to wait until the end of the use of the printer devices (MFPs), because the three printer devices (MFPs) are used for the job of the job ID #039028. Therefore, in the case of the schedule of the order reception order priority, it should be expected that the delivery date is advanced by sacrificing other jobs.

Next, in addition to the schedules of the order receiving order priority (Order) and of the delivery time schedule priority (Delivery), the schedules of the cost priority (cost) and of the quality priority (Quality) can be considered in the same way. That is, the priority key (priority order key) 2916 is provided not only with the order receiving order priority (Order) and the delivery time schedule priority (Delivery), but with the cost priority (cost), the quality priority (Quality), and the like. By switching the priority key (priority order key) 2916 to the cost priority (cost) and to the quality priority (Quality), the job scheduling screen of the cost priority as shown in FIG. 66 and the job scheduling screen of the quality priority as shown in FIG. 67 are displayed.

In this way, it is possible to make the schedule for all the jobs with the order receiving order priority (Order), the delivery time schedule priority (Delivery), the cost priority (cost), and the quality priority (Quality), in order to meet customer demands.

Figure 66:
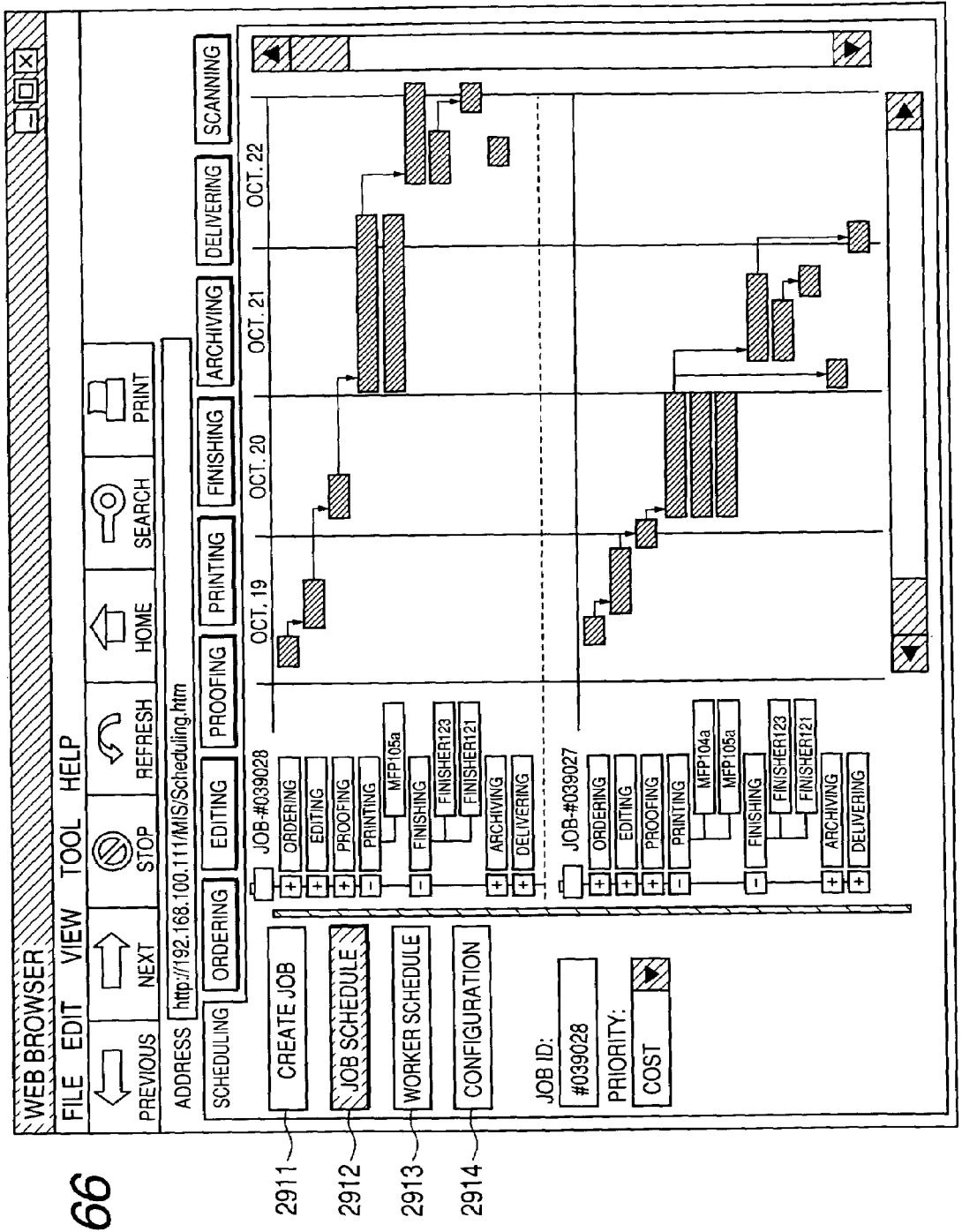
FIG. 66 shows the job scheduling screen.

In the job scheduling screen of the cost priority (cost) as shown in FIG. 66, the job of the job ID #039028 is scheduled in cost priority, and the schedule is made with lead time for each process in advance. The customer is made to draw up a schedule with lead time for delivery time so that even if the job received later is scheduled in schedule priority, the job received later is prioritized; thereby a degree of discount is made higher for the customer.

However, even if the cost is prioritized, if the cost-prioritized job is always overtaken by the schedule-prioritized job which is received later, there arises a possibility that the cost-prioritized job cannot be delivered at all. Therefore, it is necessary to make the schedule by previously determining at least a deadline. The process control manager 111 may determine the number of dates from the delivery date desired by the user, namely the deadline mentioned above, as predetermined number of dates; or otherwise, the administrator may perform the setting to that effect in advance.

In the job scheduling screen of quality priority as shown in FIG. 67, the job of the job ID #039028 is scheduled in the quality priority; and it is necessary to make the schedule with the processes, such as confirmation operations to be performed after each process, for securing the quality added thereto, even if it delays the delivery.

In this way, by switching the priority key 2916, it is possible to make the schedule by selecting among the order receiving order priority, the delivery time schedule priority, the cost priority, the quality priority, and the like. Further, the schedule is made with various kinds of matters considered, in such a way to place a priority on a capacity operating rate 15, of the printing device and the worker.

FIG. 68 is a flow chart showing an example of the scheduling processing by the process control manager 111.

The scheduling processing is the processing for adjusting the schedule of one job with the schedule of the other jobs in accordance with the priority. Here, the explanation is made as a case in which the order of order reception is set as the default setting, for example.

In FIG. 68, the process control manager 111, first, creates the schedule in the order of reception of order (in the order of order) (step S3001). Next, the process control manager 111 determines whether or not the cost priority is selected (step S3002) When the process control manager 111 determines that the cost priority is selected, the process control manager 111 adjusts the schedule by performing the processing for controlling the parameters of the schedule and the quality (lowering the priority of the schedule or the quality by one step) so that it is possible for the job to give way to the other jobs (step S3003); and the processing proceeds to a step S3004. On the other hand, if the process control manager 111 determines that the cost priority is not selected, the processing proceeds to the step S3004 as it is.

Next, the process control manager 111 determines whether or not the quality priority is selected (step S3004). If it is determined that the quality priority is selected, the process control manager 111 adjusts the schedule by adding a quality confirmation process (step S3005), and the process proceeds to a step S3006. On the other hand, if the process control manager 111 determines that the quality priority is not selected, the processing proceeds to the step S3006 as it is.

Next, the process control manager 111 determines whether or not the delivery schedule priority is selected (step S3006). If the process control manager 111 determines that the delivery schedule priority is selected, the process control manager 111 judges whether or not a cluster (the processing in which printing is carried out simultaneously combining a plurality of printer device) is possible (step S3007). If the process control manager 111 determines that the cluster is possible, the process control manager 111 reschedules to the cluster print (step S3008); and the processing proceeds to a step S3009. On the other hand, if the process control manager 111 determines that the cluster is not possible, the processing proceeds to the step S3009 as it is.

Next, the process control manager 111 determines whether or not there is any in-process job whose order can be changed (step S3009). If it is determined that there is an in-process job whose order can be changed, the process control manager 111 replaces the schedule of the present job and the replaceable job to adjust the schedule (step S3011), ends the scheduling processing and performs a schedule display processing (not shown). On the other hand, if it is determined that there is no in-process job whose order can be changed, the process control manager 111 makes the schedule in the order of reception of order (the order of "Order") (step S3010), ends the scheduling processing and performs a schedule display processing (not shown).

As described above, it becomes possible to perform an efficient process management by performing the optimum scheduling for each process in consideration of: efficient operation procedures; efficient operation order; the priority order considering the priority of the other jobs; and the like by classifying the processes in the printing industry and the POD market (by classifying the job in the processes such as: order receiving/original receiving; original editing; proof; print; post-treatment; file archiving; delivery/dispatch; scan; or the like).

<Scheduling of the Worker>

Contrary to scheduling focusing on the above-mentioned printer device of the image forming system, it is also possible to perform the scheduling focusing on the worker working under the circumstances of the image forming system. In other words, it is possible to carry out the whole work efficiently by allotting (scheduling) what to do to each worker, allocating what can be efficiently done by each worker, or instructing the worker on a next work by the process control manager 111.

Figure 69:
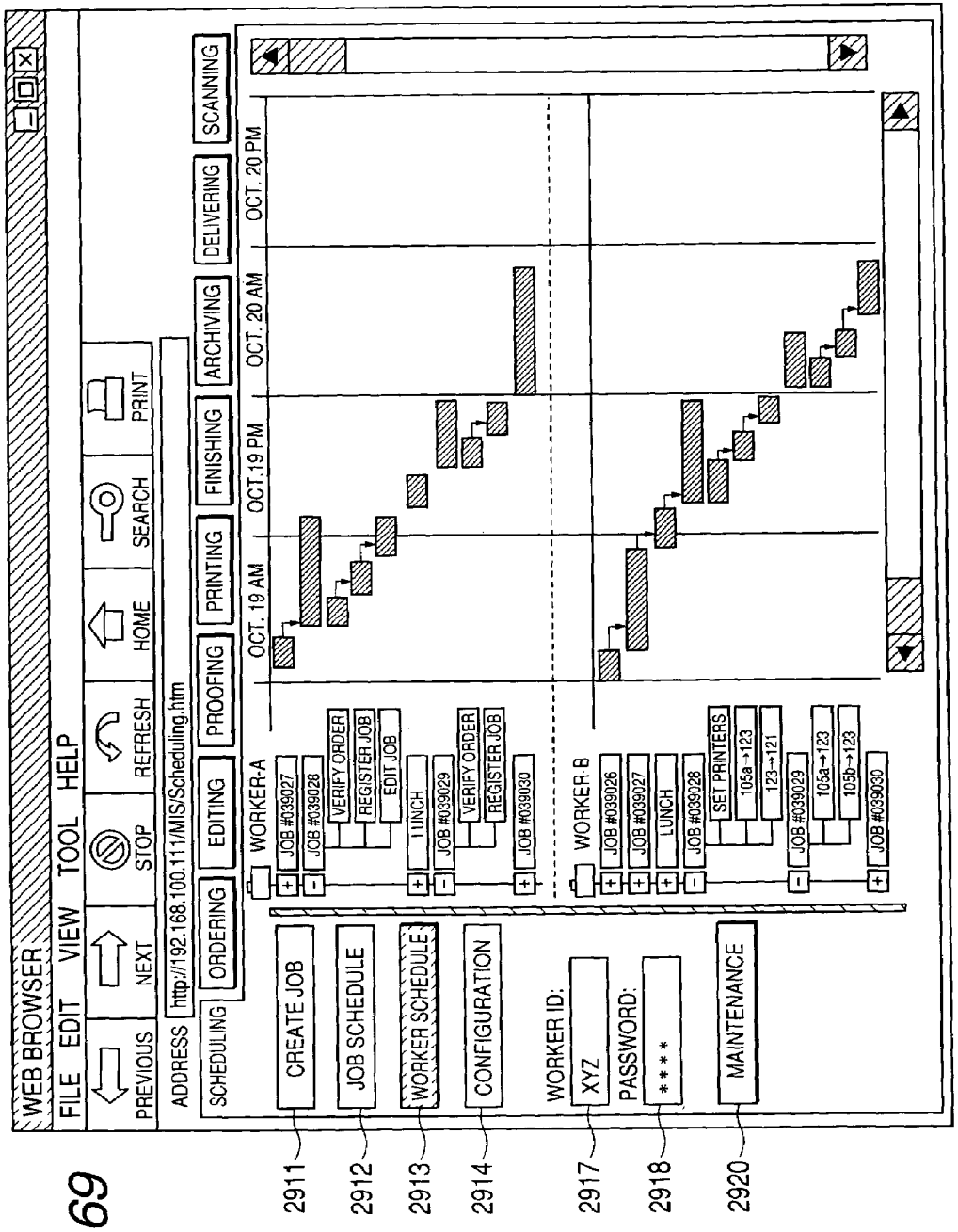
FIG. 69 shows a worker job schedule screen provided by the process control manager.

FIG. 69 shows a worker job schedule screen provided by the process control manager 111.

In FIG. 69, the job schedule screen is a time schedule of the work seen from the standpoint of the worker. Reference numeral 2919 denotes a worker schedule key. The worker schedule key 2919 is newly provided to the screens shown in FIGS. 63 through 67. By clicking (pointing by a pointing device (not shown) and the like) worker schedule key 2919, the job schedule screen in FIG. 69 is displayed.

The job schedule screen of the worker is managed worker by worker. When a worker ID is inputted in a worker ID input column 2917 and the password is inputted in a password input column 2918, the schedule of the worker is displayed together with the schedule of workers who work/near the worker.

For example, if a worker A and a worker B work under those working circumstances, and the worker A works mainly in a prepress section and the worker B works mainly in a postpress section, the operation process is allotted to the worker A and the worker B by the process control manager 111 in accordance with the roles of each worker. For example, the schedule is made as shown in FIG. 69.

In addition, under those working circumstances, when a worker C is also in charge of the same postpress section as the worker B, the job is allocated by the process control manager 111 so that the worker B and the worker C is not in charge of the same work, in other words, so that the worker B and the worker C each handle the different jobs.

In addition, each worker does respective work allotted to him in accordance with the instruction by the process control manager 111. As a result, the whole system operates in high efficiency.

<Scheduling of the Maintenance>

Next, an operation will be explained in which the timing at which the warning message is displayed is dynamically scheduled by predicting the timing at which the maintenance of the printer device is required in accordance with the state of the document reception and the state of order reception of the job.

Figure 70:
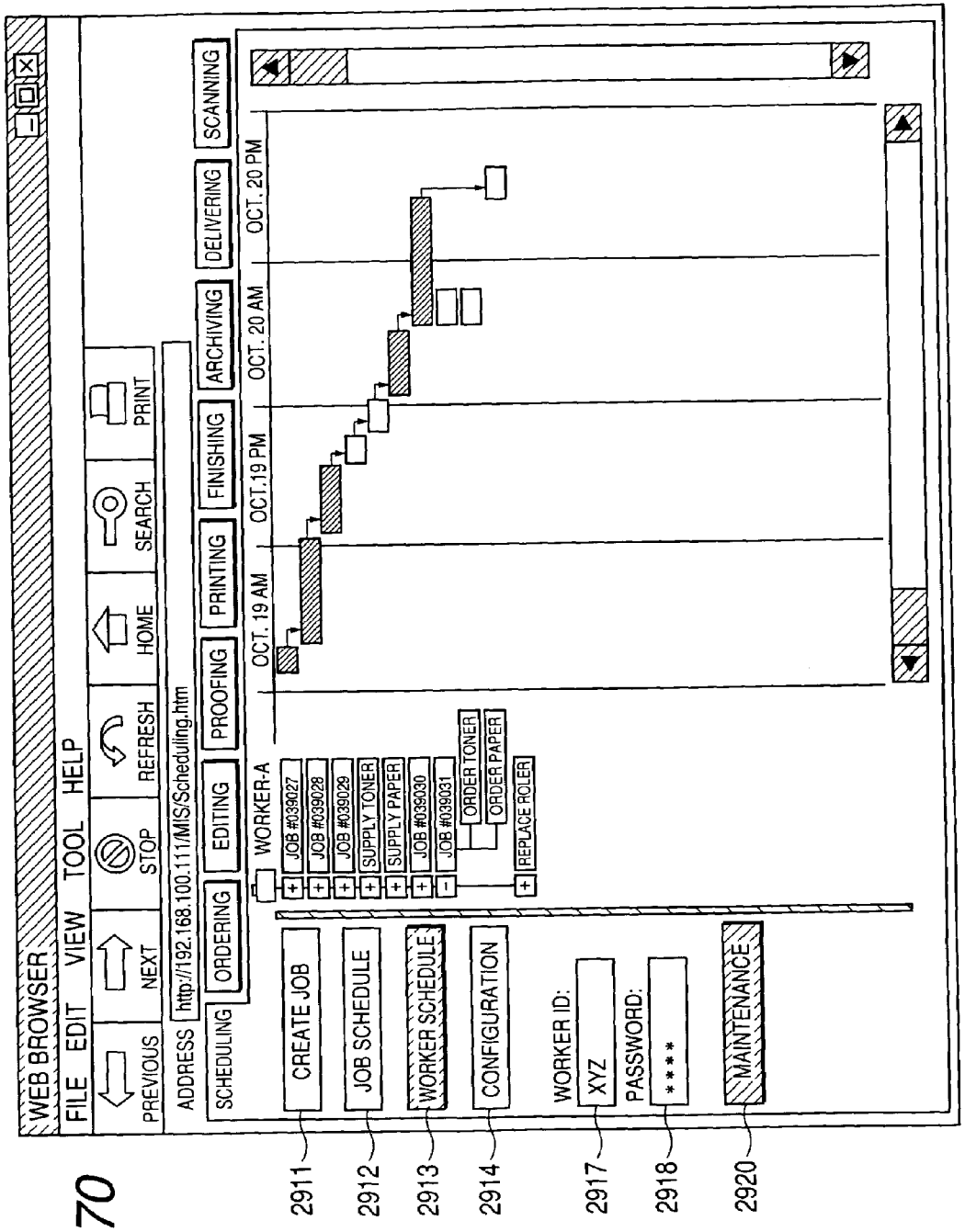
FIG. 70 shows a maintenance schedule screen.

FIG. 70 shows the maintenance schedule screen of the worker provided by the process control manager 111.

In FIG. 70, reference numeral 2920 denotes a maintenance key. By clicking the maintenance key 2920, the maintenance schedule screen related to the maintenance of the worker is displayed.

In the worker maintenance schedule screen, an example is shown in which: the replenishment of the toner and the paper sheet is carried out after each of the job of the job ID #039027, the job ID #039028, and the job ID #039029 is ended; the job of the job ID #039030 is carried out; order placing of the toner bottle and the paper sheet is carried out during the job of the job ID #039031; and the roller replacement is carried out after the job ID #039031 is ended.

Figure 71:
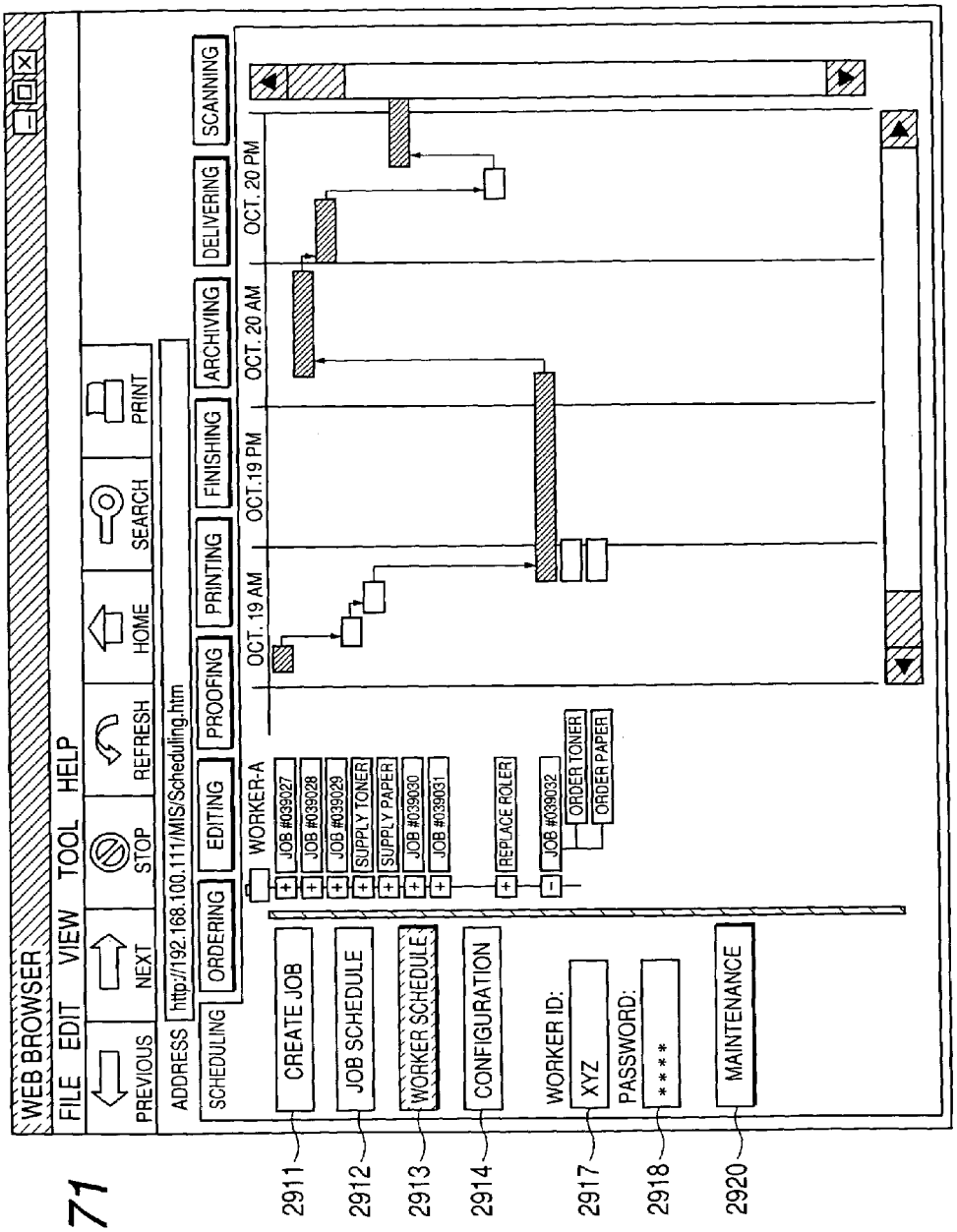
FIG. 71 shows the maintenance schedule screen after an urgent job is inputted.

FIG. 71 shows the schedule screen in a case where a long job of the job ID #039032 having a large number of prints is urgently inputted after the job of the job ID #039027 is ended.

In FIG. 71, at the time of reception of the job of the job ID #039032 is inputted, the process control manager 111 analyzes the content of all the inputted jobs, computes again the timing at which each maintenance is necessary, and displays the result of the rescheduling on the scheduling screen.

As a result, the maintenance related to the replenishment of the toner and the replenishment of the paper sheet are scheduled to be carried out before the job of the job ID #039032 is performed. In the same way, the maintenance related to the order placing of the toner bottle and the order placing of the paper sheet is scheduled to be carried out in parallel to the job of the job ID #039032, and the maintenance related to the roller replacement is scheduled to be carried out after the job of the job ID #039029 is ended.

<Message Display Processing in Accordance with the State of Document Reception and the State of Order Reception>

Next, a flow from a determination of the event to be notified to the operator up to the display of the warning message on the UI 300 at each of the display timings based on the state of document reception and the state of order reception is explained.

In this embodiment, the exhaustion degree table and the potential value table of each of the printer devices stored in the HDD 12003 of the message manager 120 are updated every time a new job is received or the order of a new job is received. Here, the explanation is made as to the message display processing before the job is started.

<Message Display Processing Before the Job is Started>

Figure 72:
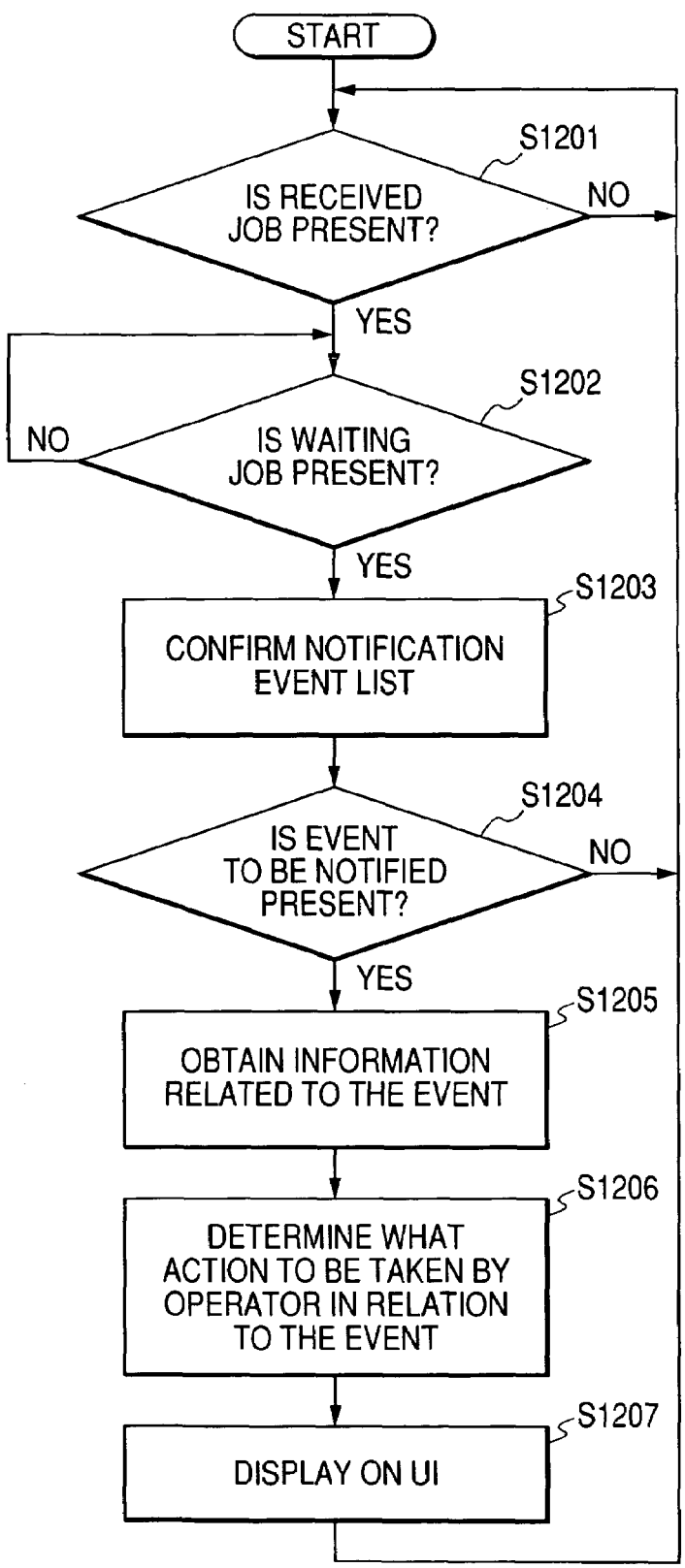
FIG. 72 is a flow chart showing the warning message display processing before the job is started.

FIG. 72 is a flow chart showing the warning message display processing before the job is started.

In FIG. 72, the message controller 12002 of the message manager 120, first, checks whether or not the job which is received is present (step S1201). The message controller 12002 repeats the processing of the step S1201 until the received job appears. When it is confirmed that the received job is present, the message controller 12002, next, checks whether or not the waiting job is present (step S1202). The message controller 12002 repeats the processing of the step S1202 until the waiting job appears.

When it is confirmed that the waiting job is present, the message controller 12002 confirms whether or not the flag indicating the event to be notified before the job is started is set in the flag table (step S1203 and step S1204). When the flag indicating that the event to be notified before the job is started is set in the flag table, the processing shifts to the step 1205. When the flag indicating that the event to be notified before the job is started is not set in the flag table, the warning message display sequence is ended.

Next, the message controller 12002 obtains the information on the event from the HDD 12003 (step S1205). For example, when the event of the replenishment of the paper sheet (remaining amount is 0) is selected, the message controller 12002 reads the remaining amount of the paper sheet of the applicable printer device from the exhaustion table stored in the HDD 12003. Further, the message controller 12002 computes an amount of consumption of the paper sheet of the applicable printer device expected by printing the job currently received therefrom.

Next, the message controller 12002 determines what to be done by the operator in relation to the event (step S1206). For example, when the event of the replenishment of the paper sheet (remaining amount is 0) is selected, the message controller 12002 determines whether or not the remaining amount of the paper sheet is below 0 as a result of subtraction of the expected paper sheet consumption amount of the received job, from a paper sheet remaining amount value read from the exhaustion degree table. Then, the message controller 12002, when the remaining amount of the paper sheet is below 0, determines to display the warning message that the replenishment of the paper sheet is necessary, and when the remaining amount of the paper sheet is not below 0, determines to display no warning message or the message indicating OK.

Finally, the message controller 12002 displays the warning message on the UI 300 in accordance with the content determined in the step S1206 (step S1207). When the processing proceeds to the step S1207, the processing returns to the step S1201 and the wait for the job to be received; and the message controller 12002 repeats the processing just as described above every time the received job appears. That is, the message controller 12002 determines whether or not the remaining amount of the consumables reaches the predetermined amount, in accordance with the reception (input) of the image forming job by the order receiving and original receiving manager 112.

In the flow chart as shown in FIG. 72, the explanation is made as to the control over the received job by the message manager 120. In this regard, by substituting the received job for the inputted job, it becomes possible to perform the control in accordance with the state of the reception of the order in the similar operation flow.

As is described above, in this embodiment, it is possible to display the warning message indicating that the maintenance by the operator is necessary for each maintenance item of the printer device configuring the image forming system, in accordance with the state of reception of the job and the state of reception of the order, on the UI at each display timing desired by the operator, thereby making it possible to notify the maintenance time at the appropriate timing in accordance with the convenience to the operator. Note that the maintenance item includes the replenishment of the consumables such as the paper sheet; toner; and staple; and replacement of the maintenance parts such as the photosensitive drum; roller; and motor.

Other Embodiments

In the first through the third embodiments, the configuration is described with an example in which the warning message related to the maintenance is displayed and outputted. However, the present invention is not limited to this configuration. Another configuration may also be adopted in which both a display output of the warning message and a voice output of the warning message are used. Further, still another configuration may also be adopted in which only the voice output of the warning message is carried out. That is, a form of notification may be determined arbitrarily as long as the warning can be notified to the operator.

In the first through the third embodiments, the configuration is described with an example in which a printing system of the printer device is the electrophotographic process (laser beam system); however, the present invention is not limited to this configuration. In other words, the present invention is applicable to systems other than the electrophotographic process (laser beam system) such as the electrophotographic process (an LED system), the ink jet system, an electrostatic system, the thermal transfer system, and other print systems.

In the first, the second, and the third embodiments, the image forming system having the configuration shown in FIG. 1 is described as an example; however, the present invention is not limited to this configuration. The type and number of the post-treatment device (the cutting machine 121; the saddle stitch bookbinding machine 122; the wrapping bookbinding machine 123; the paper sheet folding machine 124; the inserting machine 125; and the gathering machine 126) can be properly changed in accordance with the form of the printing product produced by the image forming system.

In the first, the second, and the third embodiments, the image forming system configured by a plurality of printer devices (the color MFP 104a, the color MFP 104b, the monochrome MFP 105a, the monochrome MFP 105b, and the monochrome MFP 105c), the message manager 120, the process control manager 111, and the like is explained. However, a configuration may also be applicable in which the above embodiment is implemented by a single printer device. In other words, the configuration may be applicable in which the detection of the information related to the remaining amount of the consumables of the printer device, the report related to the remaining amount of the consumables performed by the message manager 120 in the above embodiment, and the setting of the prescribed timing at which the report related to the remaining amount of the consumables performed by the message manager 120 in the above embodiment are implemented in the printer device. For example, by installing in the color MFP 104a the functions of: the message manager 120; the order receiving and original receiving manager 112; the print manager 115; the process control manager 111; and the post-treating manager 116 as shown in FIG. 1, it becomes possible to implement the above embodiment by a single printer device.

In the above-mentioned first embodiment, the example shown in FIGS. 50 through 54 is mentioned as the warning message displayed on display maintenance cause selection screen for each display timing; however, the present invention is not limited to this configuration. For example, if an icon is displayed together with the warning message (that is, for example, the icon indicating the paper sheet is displayed together with the warning message of the replenishment of the paper sheet; the icon indicating the toner bottle is displayed together with the warning message of the replenishment of the toner; and the like) on the display maintenance cause selection screen, it becomes possible to improve the visibility of the operator.

The present invention can be achieved by supplying a program of software which implements the function of the above embodiment to the computer or the CPU and by reading and executing the supplied program by the computer or the CPU.

In this case, the above program is directly supplied from the storage medium in which the program is stored, otherwise, the above program is supplied by downloading from: other computer or data base (not shown) connected to the Internet, commercial network, a local area network, and the like.

The form of the above program may be the form such as an object code, a program code executed by the interpreter, script data supplied to an operating system (OS).

In addition, the present invention may also be implemented by supplying the storage medium storing the program of the software which implements the function of the above embodiment and by reading and executing the program stored in the storage medium of the computer.

In this case, the program code itself read from the storage medium implements the function of each embodiment described above, and the storage medium which stores the program code configures the present invention.

The storage medium which stores the program code is: for example, a ROM; a RAM; an NV-RAM; a floppy (registered trademark) disk; a hard disk; an optical disk (registered trademark); a magnetooptical disk; a CD-ROM; an MO; a CD-R; a CD-RW; a DVD-ROM; a DVD-RAM; a DVD-RW; a DVD+RW; a magnetic tape; or a nonvolatile memory.

The function of the above embodiment can also be implemented not only by executing the program code read from the computer but also by carrying out a part of or the whole part of the actual processing by the OS which operates on the computer on the basis of the instruction from the program code.

Further, the present invention can be implemented by downloading the program of the software which implements the above embodiment from the data base or the web site on the network via a communication program, and by reading and executing the program.

The above program can also be supplied by connecting to the web site on the Internet by using the browser of the client computer, and by downloading the computer program itself or a compressed file including an automatic installation function from the web site to the storage medium such as a hard disk.

In addition, the above program can also be supplied by distributing the storage medium such as a CD-ROM which stores the program code after encryption thereof, by having the user who is qualified for a prescribed condition download key information for decoding the encryption from the web site via the Internet, and by executing and installing the encrypted program code in the computer by using the key information.

The function of the above embodiment can also be implemented by dividing the program code into a plurality of files and by downloading each file thus divided from different web page. That is, a WWW server for having a plurality of users download the program file for implementing a function processing of the present invention also configures the present invention.

In addition, the function of the above embodiment can also be implemented by execution of a part of or the whole part of the actual processing by the CPU, the MPU, or the like provided to a function expansion board inserted in the computer or a function expansion unit connected to the computer on the basis of the instruction from the program, after the program read from the storage medium is written into the memory provided to the function expansion board or the function expansion unit.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-237248 filed on Aug. 17, 2004, which is hereby incorporated by reference herein.

What is claimed is:

1. An image forming system for forming an image by using a plurality of consumables, comprising:
an image forming apparatus;
a receiving unit configured to receive information related to a remaining amount of the plurality of consumables from the image forming apparatus;
a reporting unit configured to make a report in relation to a remaining amount of at least one of the plurality of consumables; and
a setting unit configured to set a prescribed timing for performing the report by the reporting unit,
wherein the reporting unit, in a case where the receiving unit receives the information indicating that the remaining amount of a first consumable related to the plurality of consumables reaches a first prescribed amount, makes a report in relation to the remaining amount of the first consumable and a second consumable, in accordance with occurrence of the prescribed timing set by the setting unit.

2. An image forming system according to claim 1, wherein the reporting unit, in a case where the receiving unit receives the information indicating that the remaining amount of the first consumable reaches the first prescribed amount and the remaining amount of the second consumable related to the plurality of consumables reaches a second prescribed amount, makes a report in relation to the remaining amount of the first consumable and the second consumable, in accordance with occurrence of the prescribed timing set by the setting unit.

3. An image forming system according to claim 1, wherein the setting unit sets the prescribed timing to at least one of a timing at which power is turned on to the image forming apparatus and a timing at which the power is turned off to the image forming apparatus.

4. An image forming system according to claim 1, wherein:
the image forming apparatus executes an image forming job for forming the image over a plurality of pages; and
the setting unit sets the prescribed timing to at least one of a timing before the image forming job is started by the image forming apparatus and a timing at which the image forming job is ended by the image forming apparatus.

5. An image forming system according to claim 1, further comprising a plurality of image forming apparatuses;
wherein the reporting unit makes the report in relation to the remaining amount of at least one of the plurality of consumables related to the plurality of image forming apparatuses.

6. An image forming system according to claim 1, further comprising a selection unit configured to cause the setting unit to make a selection of the first consumable and the second consumable the report on which is to be made, from among the plurality of consumables.

7. An image forming system according to claim 6, wherein:
the setting unit sets the prescribed timing to a plurality of different timings; and
the selection unit selects the consumable the report on which is to be made at each of the plurality of different timings.

8. An image forming system according to claim 1, further comprising a display unit configured to display the report made by the reporting unit in relation to the remaining amount of at least one of the plurality of consumables.

9. An image forming system according to claim 1, further comprising a determination unit configured to determine whether or not one of the remaining amount of the first consumable and the remaining amount of the second consumable reaches the prescribed amount by execution by the image forming apparatus of an image forming job for forming the image over a plurality of pages,
wherein the reporting unit makes the report in relation to the remaining amount of the consumable which has been determined to reach the prescribed amount, in a case where the determination unit determines that one of the remaining amount of the first consumable and the remaining amount of the second consumable reaches the prescribed amount.

10. An image forming system according to claim 1, wherein:
the remaining amount of the first consumable is the remaining amount related to the first consumable installed in the image forming apparatus; and
the remaining amount of the second consumable is the remaining amount related to the second consumable installed in the image forming apparatus.

11. An image forming system according to claim 9, further comprising a job management unit configured to manage the image forming job to be executed by the image forming system,
wherein the determination unit determines whether or not one of the remaining amount of the first consumable and the remaining amount of the second consumable reaches the prescribed amount by the execution by the image forming apparatus of the image forming job managed by the job management unit.

12. An image forming system according to claim 11, wherein the determination unit determines whether or not one of the remaining amount of the first consumable and the remaining amount of the second consumable reaches the prescribed amount, in response to reception by the job management unit of a new image forming job.

13. An image forming system according to claim 1, wherein:
the remaining amount of the first consumable is an inventory of the first consumable;
the remaining amount of the second consumable is an inventory of the second consumable; and
the reporting unit makes a report in relation to the inventory of the first consumable and the second consumable, in a case where the receiving unit receives information indicating that the inventory of the first consumable reaches the first prescribed amount and the inventory of the second consumable reaches a second prescribed amount, in accordance with the occurrence of the prescribed timing set by the setting unit.

14. An image forming system according to claim 13, further comprising a delivery management unit configured to manage information on delivery time of the first consumable and the second consumable,
wherein the reporting unit makes a report in relation to the inventory of the first consumable and the second consumable, in a case where the receiving unit receives the information indicating that the inventory of the first consumable reaches the first prescribed amount and the inventory of the second consumable reaches the second prescribed amount and where the delivery time managed by the delivery management unit is after a prescribed time, in accordance with the occurrence of the prescribed timing set by the setting unit.

15. An image forming system according to claim 1, wherein:
the image forming apparatus comprises a paper sheet supply unit configured to supply the paper sheet for forming the image thereon,
wherein at least one of the plurality of consumables is the paper sheet supplied by the paper sheet supply unit.

16. An image forming system according to claim 15, wherein:
the image forming apparatus comprises an image forming unit configured to form the image on the paper sheet using a developer,
wherein at least one of the plurality of consumables is the developer for forming the image on the paper sheet by the image forming unit.

17. An image forming system according to claim 15, wherein:
the image forming apparatus comprises a staple device for joining a plurality of paper sheets one to another by performing a staple processing using a joining member to the plurality of paper sheets on which the image is formed;
at least one of the plurality of consumables is the joining member used by the staple device.

18. An image forming apparatus for forming an image by using a plurality of consumables, the apparatus comprising:
a detecting unit configured to detect information related to a remaining amount of the plurality of consumables;
a reporting unit configured to make a report in relation to a remaining amount of at least one of the plurality of consumables; and
a setting unit configured to set a prescribed timing for performing the report by the reporting unit,
wherein the reporting unit, in a case where the detecting unit detects that the remaining amount of a first consumable related to the plurality of consumables reaches a first prescribed amount, makes a report in relation to the remaining amount of the first consumable and a second consumable, in accordance with occurrence of the prescribed timing set by the setting unit.

19. An image forming apparatus according to claim 18, wherein the reporting unit, in a case where the receiving unit receives the information indicating that the remaining amount of the first consumable reaches the first prescribed amount and the remaining amount of the second consumable related to the plurality of consumables reaches a second prescribed amount, makes a report in relation to the remaining amount of the first consumable and the second consumable, in accordance with occurrence of the prescribed timing set by the setting unit.

20. An image forming apparatus according to claim 18, wherein the setting unit sets the prescribed timing to at least one of a timing at which power is turned on to the image forming apparatus and a timing at which the power is turned off to the image forming apparatus.

21. An image forming apparatus according to claim 18, which executes an image forming job for forming the image over a plurality of pages,
wherein the setting unit sets the prescribed timing to at least one of a timing before the image forming job is started by the image forming apparatus and a timing at which the image forming job is ended by the image forming apparatus.

22. An image forming apparatus according to claim 18, further comprising a selection unit configured to cause the setting unit to make a selection of the first consumable and the second consumable the report on which is to be made, from among the plurality of consumables.

23. An image forming apparatus according to claim 22, wherein:
the setting unit sets the prescribed timing to a plurality of different timings; and
the selection unit selects the consumable the report on which is to be made at each of the plurality of different timings.

24. An image forming apparatus according to claim 18, further comprising a display unit configured to display the report made by the reporting unit in relation to the remaining amount of at least one of the plurality of consumables.

25. An image forming apparatus according to claim 18, further comprising a determination unit configured to determine whether or not one of the remaining amount of the first consumable and the remaining amount of the second consumable reaches the prescribed amount by execution by the image forming apparatus of the image forming job for forming the image over a plurality of pages,
wherein the reporting unit makes the report in relation to the remaining amount of the consumable which has been determined to reach the prescribed amount, in a case where the determination unit determines that one of the remaining amount of the first consumable and the remaining amount of the second consumable reaches the prescribed amount.

26. An image forming apparatus according to claim 18, wherein:
the remaining amount of the first consumable is the remaining amount related to the first consumable installed in the image forming apparatus; and
the remaining amount of the second consumable is the remaining amount related to the second consumable installed in the image forming apparatus.

27. An image forming apparatus according to claim 18, further comprising:
a management unit configured to manage an image forming job to be executed by the image forming apparatus; and
a determination unit configured to determine whether or not one of the remaining amount of the first consumable and the remaining amount of the second consumable reaches the prescribed amount, by execution by the management unit of a plurality of image forming jobs managed by the management unit,
wherein the reporting unit, in a case where the determination unit determines that one of the remaining amount of the first consumable and the remaining amount of the second consumable reaches the prescribed amount, makes the report in relation to the remaining amount of the consumable which has been determined to reach the prescribed amount.

28. An image forming apparatus according to claim 27, wherein the determination unit determines whether or not one of the remaining amount of the first consumable and the remaining amount of the second consumable reaches the prescribed amount, in response to reception by the job management unit of a new image forming job.

29. An image forming apparatus according to claim 18, wherein:
the remaining amount of the first consumable is an inventory of the first consumable;
the remaining amount of the second consumable is an inventory of the second consumable; and
the reporting unit makes a report in relation to the inventory of the first consumable and the second consumable, in a case where the detecting unit detects that the inventory of the first consumable reaches the first prescribed amount and the inventory of the second consumable reaches a second prescribed amount, in accordance with the occurrence of the prescribed timing set by the setting unit.

30. An image forming apparatus according to claim 29, wherein the reporting unit makes a report in relation to the inventory of the first consumable and the second consumable, in a case where the receiving unit receives the information indicating that the inventory of the first consumable reaches the first prescribed amount and the inventory of the second consumable reaches the second prescribed amount and where delivery time of the first consumable and the second consumable is after a prescribed time, in accordance with the occurrence of the prescribed timing set by the setting unit.

31. An image forming apparatus according to claim 18, further comprising a paper sheet supply unit configured to supply the paper sheet for forming the image thereon, wherein at least one of the plurality of consumables is the paper sheet supplied by the paper sheet supply unit.

32. An image forming apparatus according to claim 31, further comprising an image forming unit configured to form the image on the paper sheet using a developer, wherein at least one of the plurality of consumables is the developer for forming the image on the paper sheet by the image forming unit.

* * * * *